(12) United States Patent
Maruyama et al.

(10) Patent No.: US 8,507,145 B2
(45) Date of Patent: Aug. 13, 2013

(54) FUEL CELL AND METHOD OF PRODUCING THE FUEL CELL

(75) Inventors: Mari Maruyama, Setagaya-ku (JP); Takayuki Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 945 days.

(21) Appl. No.: 12/191,023

(22) Filed: Aug. 13, 2008

(65) Prior Publication Data

US 2009/0047566 A1 Feb. 19, 2009

(30) Foreign Application Priority Data

Aug. 13, 2007 (JP) ................................. 2007-211010
Aug. 13, 2007 (JP) ................................. 2007-211011

(51) Int. Cl.
*H01M 2/38* (2006.01)
(52) U.S. Cl.
USPC .......................................................... 429/454
(58) Field of Classification Search
USPC .......................................................... 429/34
See application file for complete search history.

(56) References Cited

U.S. PATENT DOCUMENTS 4,608,320 A * 8/1986 Mochizuki et al. ........... 428/629
8,039,169 B2 10/2011 Dan

FOREIGN PATENT DOCUMENTS

| JP | 5-36425 | | 2/1993 |
| JP | 05036425 A | * | 2/1993 |
| JP | 9-115525 | | 5/1997 |
| JP | 09115525 A | * | 5/1997 |
| JP | 2002-280023 | | 9/2002 |
| JP | 2002-289215 | | 10/2002 |
| JP | 2005-259684 | | 9/2005 |
| JP | 2005259684 A | * | 9/2005 |
| JP | 2005-327499 | | 11/2005 |
| JP | 2006-236600 | | 9/2006 |
| JP | 2007-179926 | | 7/2007 |

OTHER PUBLICATIONS

Japanese Office Action for Application No. 2007-211011, 4 pages, dated Aug. 21, 2012.

* cited by examiner

*Primary Examiner* — Ula C Ruddock
*Assistant Examiner* — Daniel Gatewood
(74) *Attorney, Agent, or Firm* — Nelson Mullins Riley & Scarborough LLP; Anthony A. Laurentano

(57) ABSTRACT

A fuel cell includes an electrolyte electrode assembly and separators. A first protection layer is formed on a surface of an anode of the electrolyte electrode assembly facing the separator for preventing the anode from being exposed to an exhaust gas. A second protection layer is formed on a surface of the separator facing the anode for preventing the separator from being exposed to the exhaust gas. The first protection layer and the second protection layer tightly contact each other in part so as to form a space as a fuel gas channel for supplying a fuel gas to the anode. Alternatively, a protection layer is formed on an end surface of the separator facing the anode for preventing the separator from being exposed to the exhaust gas.

17 Claims, 41 Drawing Sheets

⇨ OXYGEN-CONTAINING GAS
⇨ FUEL GAS
⇨ EXHAUST GAS

- - ▶ FUEL GAS
——▶ OXYGEN-CONTAINING GAS

← OXYGEN-CONTAINING GAS
← FUEL GAS

⇨ OXYGEN-CONTAINING GAS
⇨ FUEL GAS
⇨ EXHAUST GAS

← OXYGEN-CONTAINING GAS
← FUEL GAS

FUEL CELL AND METHOD OF PRODUCING THE FUEL CELL

BACKGROUND OF THE INVENTION

1. Field of the Invention

The present invention relates to a fuel cell in which a fuel gas is supplied from a central region to an outer region of an anode, an oxygen-containing gas is supplied along a cathode, and an exhaust gas as mixture of the fuel gas and the oxygen-containing gas after consumption is discharged to the outside from an outer region of an electrolyte electrode assembly. Further, the present invention relates to a method of producing the fuel cell.

2. Description of the Related Art

Solid oxide fuel cells (SOFC) employ an electrolyte of ion-conductive solid oxide such as stabilized zirconia. The electrolyte is interposed between an anode and a cathode to form an electrolyte electrode assembly (MEA). The electrolyte electrode assembly is interposed between a pair of separators (bipolar plates). In use, a predetermined number of the separators and the electrolyte electrode assemblies are stacked together to form a fuel cell stack.

In some of the fuel cells of this type, no seals are provided for the separators, and the fuel cell stack is placed in a container. In the structure, a fuel gas supplied to the anode and an oxygen-containing gas supplied to the cathode are discharged from an outer end of the separator after power generation reaction. Therefore, the fuel gas containing fuel which has not been consumed in the reaction and the air are mixed together to induce combustion around the outer region of the separator. The mixed gas is discharged to the outside of the container as an exhaust gas.

During power generation, the flow rate of the supplied air is larger than the flow rate of the supplied fuel gas. Therefore, the remaining oxygen is present in the exhaust gas. Further, the fuel gas containing fuel which has not been consumed in the reaction is present at the anode, and water vapor is generated at the anode due to the power generation reaction. Therefore, the end surface of the separator facing the anode is exposed to the reducing atmosphere while being exposed to the oxygen flowing around to the anode from the cathode and the water vapor. That is, a reducing atmosphere, an oxidizing atmosphere, and a water vapor oxidizing atmosphere are present around the end surface of the separator facing the anode.

For example, the anode is made of cermet material of Ni—Zr (nickel-zirconium) or the like. The material in the outer end of the anode is oxidized to NiO. NiO has a high electrical resistance, and prevents electrical conductance. The MEA is damaged easily by the local volume change (expansion or contraction) due to the oxidation/reduction reaction.

Further, in general, the separator is made of iron alloy such as stainless steel. Therefore, Fe oxides or Cr oxides are produced on the surface of the separator due to oxidation or water vapor oxidation. Thus, electrical conductivity of the separator is lowered. Further, problems such as increase in pressure loss in the fuel gas, non-uniform flow of the fuel gas, peeling of oxides, dispersion of peeled oxides into the fuel cell and increase in the contact resistance between the separator and the electrolyte electrode assembly occur.

In a proposed technique disclosed in Japanese Laid-Open Patent Publication No. 05-036425, a nickel plating layer is provided on a fuel-electrode-side surface of the separator of heat resistant alloy by a wet plating process to prevent oxidation of elements in the heat resistant alloy, and to prevent increase in the electrical resistance.

Further, in a technique disclosed in Japanese Laid-Open Patent Publication No. 2006-236600, ferrite stainless steel containing aluminum is adopted as material of a separator to prevent water vapor oxidation of the separator. An alumina film is formed on a surface of the separator using the aluminum as a source.

Further, techniques of forming an oxide film on the surface a metal separator is disclosed in Japanese Laid-Open Patent Publication No. 2002-289215 and Japanese Laid-Open Patent Publication No. 2005-327499. The oxide film is derived from the metal separator. Further, silver plating is provided on the oxide film.

In the above techniques, a film or a layer is formed on the separator. In another proposed technique, a protection plate is interposed between the metal separator and the anode (e.g., see Japanese Laid-Open Patent Publication No. 2005-259684).

Further, Japanese Laid-Open Patent Publication No. 09-115525 discloses a technique of forming electroless plating on a fuel electrode comprising cermet of nickel and material chiefly containing nickel and zirconia, and forming a nickel plating film on a surface of the fuel electrode to reduce the contact resistance at contact points for improving power generation efficiency.

In the conventional technique disclosed in Japanese Laid-Open Patent Publication No. 05-036425, the nickel plating layer undesirably undergoes water vapor oxidation to become a nickel oxide layer. The nickel oxide is a p-type semiconductor. Since electrons do not move actively, if a large amount of nickel oxide is present, the power generation performance of the fuel cell may be degraded undesirably.

Further, in the conventional technique of forming a known alumina film as an insulator as disclosed in Japanese Laid-Open Patent Publication No. 2006-236600, the internal resistance of the fuel cell increases, and the current collecting performance of the separator is lowered undesirably.

Further, in the conventional technique of performing silver plating as disclosed in Japanese Laid-Open Patent Publication No. 2002-289215 and Japanese Laid-Open Patent Publication No. 2005-327499, and in the conventional technique of performing nickel plating as disclosed in Japanese Laid-Open Patent Publication No. 09-115525, the cost required for the plating process is high.

Further, in the conventional technique disclosed in Japanese Laid-Open Patent Publication No. 2005-259684, since the protection plate is interposed between the separator and the anode, the thickness in the stacking direction of the fuel cell becomes large disadvantageously.

Moreover, in any of the above conventional techniques, anti-corrosion property of the separator in the environment where the three atmospheres, i.e., the reducing atmosphere, the oxidizing atmosphere, and the water vapor oxidizing atmosphere are present is not taken into consideration. Further, by the oxide film generated on the surface of the separator, current collection performance of the separator is lowered, the fuel electrode (anode) and the separator do not contact each other sufficiently tightly, and increase in the contact resistance occur disadvantageously. However, no solutions for the problems or disadvantages have been proposed.

SUMMARY OF THE INVENTION

A general object of the present invention is to provide a fuel cell in which the thickness of stacked fuel cells in a stacking direction does not become large even in the case where three atmospheres (a reducing atmosphere, an oxidizing atmosphere, and a water vapor oxidizing atmosphere) are present.

A main object of the present invention is to provide a fuel cell which makes it possible to achieve the desired current collection performance even in the presence of the three atmospheres, and prevent degradation of power generation performance in the fuel cell.

Another object of the present invention is to provide a fuel cell which makes it possible to avoid the influence of an exhaust gas discharged to the outside from an outer end of an electrolyte electrode assembly of the fuel cell as much as possible.

Still another object of the present invention is to provide a fuel cell which achieves tight contact between an electrolyte electrode assembly and separators sandwiching the electrolyte electrode assembly.

Still another object of the present invention is to provide a method of producing the fuel cell.

According to an aspect of the present invention, a fuel cell comprising an electrolyte electrode assembly and separators sandwiching the electrolyte electrode assembly is provided. The electrolyte electrode assembly includes an anode, a cathode, and an electrolyte interposed between the anode and the cathode. A fuel gas is supplied from a central region to an outer region of the anode, an oxygen-containing gas is supplied along the cathode, and an exhaust gas as mixture of the fuel gas and the oxygen-containing gas after consumption is discharged to the outside from an outer region of the electrolyte electrode assembly.

The fuel cell further comprises a first protection layer formed on a surface of the anode facing the separator for preventing the anode from being exposed to the exhaust gas; and a second protection layer formed on a surface of the separator facing the anode for preventing the separator from being exposed to the exhaust gas. The first protection layer and the second protection layer tightly contact each other in part so as to form a space as a fuel gas channel for supplying the fuel gas to the anode, between the first protection layer and the second protection layer.

Preferably, a plurality of protrusions are formed on the surface of the separator facing the anode, and the second protection layer formed on the protrusions tightly contacts the first protection layer formed on the anode to form the space between the second protection layer and the first protection layer, between the protrusions.

Further, preferably, a plurality of protrusions are formed on the surface of the separator facing the anode, and the protrusions penetrate into the first protection layer formed on the anode to form the space between the second protection layer and the first protection layer, between the protrusions.

Further, preferably, the first protection layer formed on the anode has a thickness in a range of 1 to 100 μm.

Further, preferably, the first protection layer and the second protection layer are made of metal having an electrical conductivity of 1.0 S/cm at 700° C. or cermet compound of the metal, and the thickness of the first protection layer is equal to or greater than the thickness of the second protection layer.

Further, preferably, pores are formed in the first protection layer by reduction reaction.

Further, preferably, pore forming material is added to the first protection layer to form pores in the first protection layer.

Further, preferably, the separator comprises a sandwiching section for sandwiching the electrolyte electrode assembly, a bridge connected to the sandwiching section, and a fuel gas supply section connected to the bridge. A fuel gas supply channel is formed in the bridge for supplying the fuel gas to the central region of the anode. A fuel gas supply passage for supplying the fuel gas to the fuel gas supply channel extends through the fuel gas supply section.

Further, preferably, the separator comprises a metal plate.

According to another aspect of the present invention, a method of producing a fuel cell comprising an electrolyte electrode assembly and separators sandwiching the electrolyte electrode assembly is provided. The electrolyte electrode assembly includes an anode, a cathode, and an electrolyte interposed between the anode and the cathode. A fuel gas is supplied from a central region to an outer region of the anode, an oxygen-containing gas is supplied along the cathode, and an exhaust gas as mixture of the fuel gas and the oxygen-containing gas after consumption is discharged to the outside from an outer region of the electrolyte electrode assembly.

The method comprises the steps of forming a first protection layer on a surface of the anode facing the separator for preventing the anode from being exposed to the exhaust gas; forming a second protection layer formed on a surface of the separator facing the anode for preventing the separator from being exposed to the exhaust gas; and placing the first protection layer and the second protection layer to tightly contact each other in part so as to form a space as a fuel gas channel for supplying the fuel gas to the anode, between the first protection layer and the second protection layer.

Further, preferably, the second protection layer is formed on the separator by electroless plating.

According to still another aspect of the present invention, a fuel cell comprising an electrolyte electrode assembly and separators sandwiching the electrolyte electrode assembly is provided. The electrolyte electrode assembly includes an anode, a cathode, and an electrolyte interposed between the anode and the cathode. A fuel gas is supplied from a central region to an outer region of the anode, an oxygen-containing gas is supplied along the cathode, and an exhaust gas as mixture of the fuel gas and the oxygen-containing gas after consumption is discharged to the outside from an outer region of the electrolyte electrode assembly.

Each of the separators is made of iron alloy containing Cr, and a protection layer is formed on an end surface of the separator facing the anode for preventing the separator from being exposed to the exhaust gas.

The protection layer includes a mixture layer containing Ni and Fe on one side facing the separator and a chromium rich layer chiefly containing Cr on the other side facing the anode; and the mixture layer is a gradient layer having composition ratios of Ni and Fe changing relative to each other in the direction from the separator to the anode.

By providing the protection layer having the above structure on the separator, it is possible to shield the separator from the reducing atmosphere and the oxidizing atmosphere. Stated otherwise, even in an environment where both of the reducing atmosphere and the oxidizing atmosphere are provided, it is possible to prevent corrosion of the separator. Accordingly, for example, it is possible to prevent increase in the contact resistance between the separator and the anode, increase in pressure loss in the fuel gas, and non-uniform flow in the fuel gas, peeling of iron (Fe) oxides, and dispersion of peeled iron oxides into the fuel cell.

Further, since the outermost layer of the separator is the chromium rich layer, even if Cr in the chromium rich layer is oxidized to produce chromium oxides, electrons move actively in comparison with the case where nickel oxides are produced. Since the chromium rich layer is thin, the contact resistance between the separator and the anode, and the internal resistance of the fuel cell do not increase significantly. Further, the current collection performance of the separator is not lowered.

Further, since no silver plating is required, cost reduction is achieved. Moreover, since no protection plates need to be provided between components, the thickness of the fuel cell does not become large.

Preferably, the mixture layer is a gradient layer chiefly containing nickel and/or nickel oxide on a side facing the chromium rich layer, and chiefly containing iron and/or iron oxide on a side facing the separator. In the structure, the surface layer of the protection layer contains only a small amount of iron components. Generation of Fe oxide (rust) hardly occurs. Therefore, occurrence of the above problems can be avoided further easily.

For example, the protection layer is obtained by heating a Ni-containing film formed on the separator at 550° C. to 850° C.

Further, in order to reliably shield the separator from the reducing atmosphere, the oxidizing atmosphere, and the water vapor oxidizing atmosphere to avoid corrosion of the separator, and prevent increase in the contact resistance between the separator and the anode as much as possible, the protection layer preferably has a thickness in a range of 1 to 100 μm.

Further, preferably, the separator contains 12% to 30% by weight of Cr. In this case, it becomes possible to easily obtain the protection layer having the chromium rich layer.

Preferably, the anode is made of Ni—Zr cermet containing nickel and zirconium. In the structure, nickel components diffused from the mixture layer through the chromium layer and nickel components in the anode are blended with each other. As a result, the anode and the separator contact each other further tightly through the protect layer. Thus, heat expansion (or heat contraction) of the anode is suppressed by heat expansion (or heat contraction) of the separator, and vice versa. Accordingly, the electrolyte electrode assemblies are not damaged due to thermal deformation.

Water vapor produced during power generation may be mixed in the exhaust gas. In this case, three atmospheres, i.e., the reducing atmosphere, the oxidizing atmosphere, and the water vapor oxidizing atmosphere are present around the separator. Even in the severe environment, significant corrosion does not occur in the separator having the protection layer. That is, according to the present invention, even in the presence of three atmospheres, i.e., the reducing atmosphere, the oxidizing atmosphere, and the water vapor oxidizing atmosphere, it is possible to prevent increase in the contact resistance between the separator and the anode, increase in pressure loss in the fuel gas, and non-uniform flow in the fuel gas, peeling of iron (Fe) oxides, and dispersion of peeled iron oxides into the fuel cell.

According to still another aspect of the present invention, a method of producing a fuel cell comprising an electrolyte electrode assembly and separators sandwiching the electrolyte electrode assembly is provided. The electrolyte electrode assembly includes an anode, a cathode, and an electrolyte interposed between the anode and the cathode. A fuel gas is supplied from a central region to an outer region of the anode, an oxygen-containing gas is supplied along the cathode, and an exhaust gas as mixture of the fuel gas and the oxygen-containing gas after consumption is discharged to the outside from an outer region of the electrolyte electrode assembly.

The method comprises the steps of: selecting iron alloy containing Cr as the separator; forming a Ni-containing film on an end surface of the separator side facing the anode; and heating the Ni-containing film at 550° C. to 850° C. to form a protection layer for preventing the separator from being exposed to the exhaust gas. The protection layer includes a mixture layer containing Ni and Fe on one side facing the separator and a chromium rich layer chiefly containing Cr on the other side facing the anode. The mixture layer is a gradient layer having composition ratios of Ni and Fe changing relative to each other in the direction from the separator to the anode.

By the protection layer formed in the above steps, even in the presence of the three atmospheres, i.e., the reducing atmosphere, the oxidizing atmosphere, and the water vapor oxidizing atmosphere, it is possible to reliably shield the separator from these atmospheres. As a result, increase in the contact resistance between the separator and the anode is prevented as much as possible.

The separators should be heated after the electrolyte electrode assembly is sandwiched between the separators. Alternatively, the separators may be heated before the electrolyte electrode assembly is sandwiched between the separators. That is, the separators may be heated before assembling the fuel cell, or after assembling the fuel cell. In the case where the separators are heated after the fuel cell is assembled, the separators may be heated at the time of warming up the fuel cell to a predetermined operating temperature.

It should be noted that the "exhaust gas" in the present invention means any of, or any combination of at least two of (1) the fuel gas which was supplied to the anode for power generation reaction, but still contains some unreacted fuel after used in power generation reaction, (2) the hot reactant gas produced by combustion of the fuel gas and the oxygen-containing gas that are unconsumed after power generation reaction, (3) the water vapor produced in the power generation reaction, and (4) the oxygen-containing gas flowing around from the cathode to the anode.

As described above, in the present invention, since the first protection layer and the second protection layer are provided on the anode and the separator, respectively, or since the protection layer is formed on the end surface of the separator facing the anode, the separator is shielded from the reducing atmosphere, the oxidizing atmosphere, and the water vapor oxidizing atmosphere. Thus, even if the oxygen-containing gas in the exhaust gas flows around to the separator, and even in the presence of the water vapor, oxidation (corrosion) of the separator does not occur. That is, improvement in anti-oxidation (anti-corrosion) property of the separator is achieved. Further, since formation, dispersion or deposition of oxidized films due to oxidation or water vapor oxidation is suppressed, the fuel gas flows smoothly, and increase in pressure loss in the fuel gas is avoided.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, a fuel cell according to the present invention and a method of producing the fuel cell will be described in conjunction with preferred embodiments, with reference to the drawings.

Firstly, a first embodiment in which a first protection layer and a second protection layer are formed on an anode and a separator, respectively, will be described.

Figure 1:
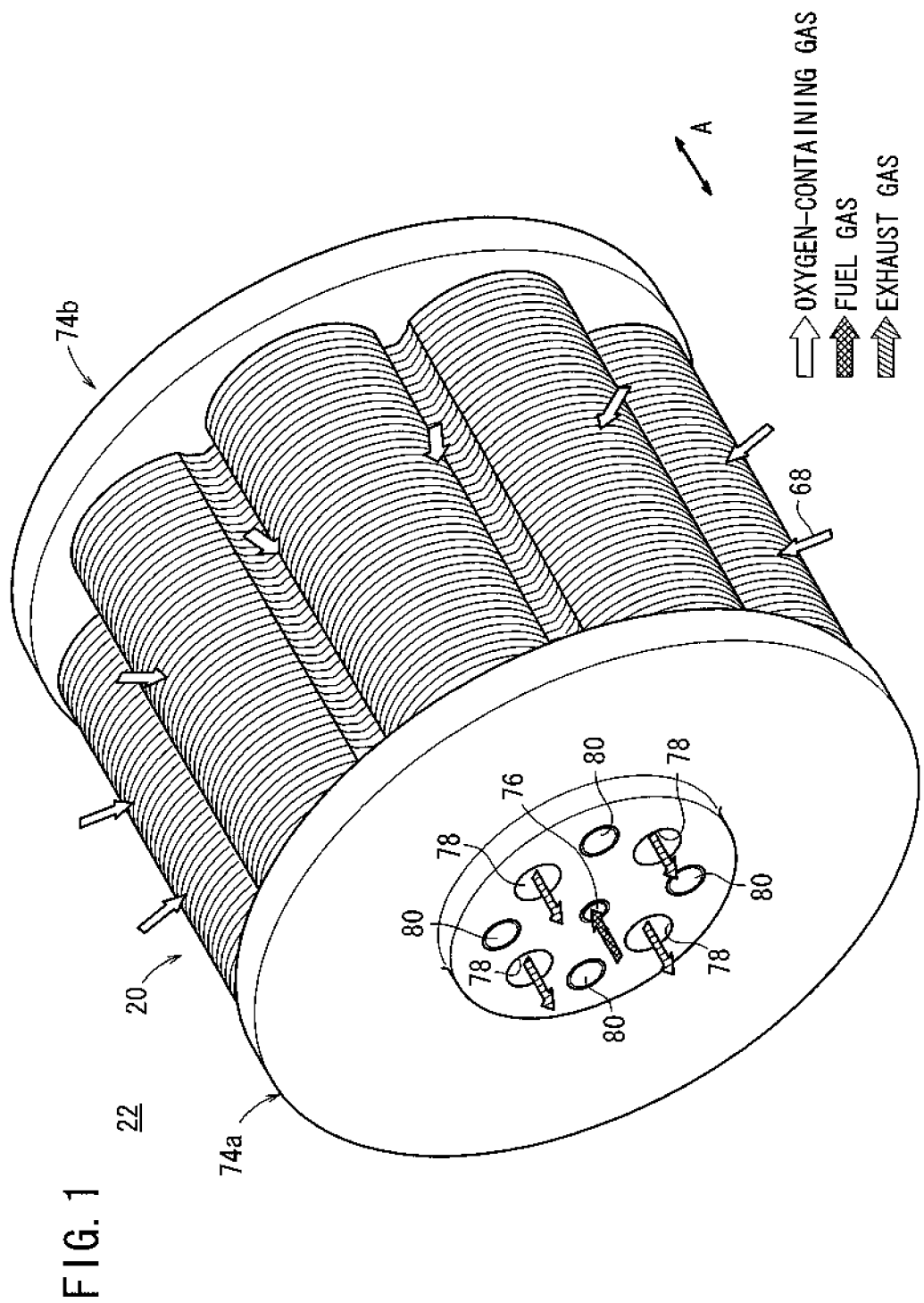
FIG. 1 is a perspective view schematically showing a fuel cell stack formed by stacking a plurality of fuel cells according to a first embodiment of the present invention.

FIG. 1 is a perspective view schematically showing a fuel cell stack 22 formed by stacking a plurality of fuel cells 20 according to a first embodiment of the present invention in a direction indicated by an arrow A.

Figure 2:
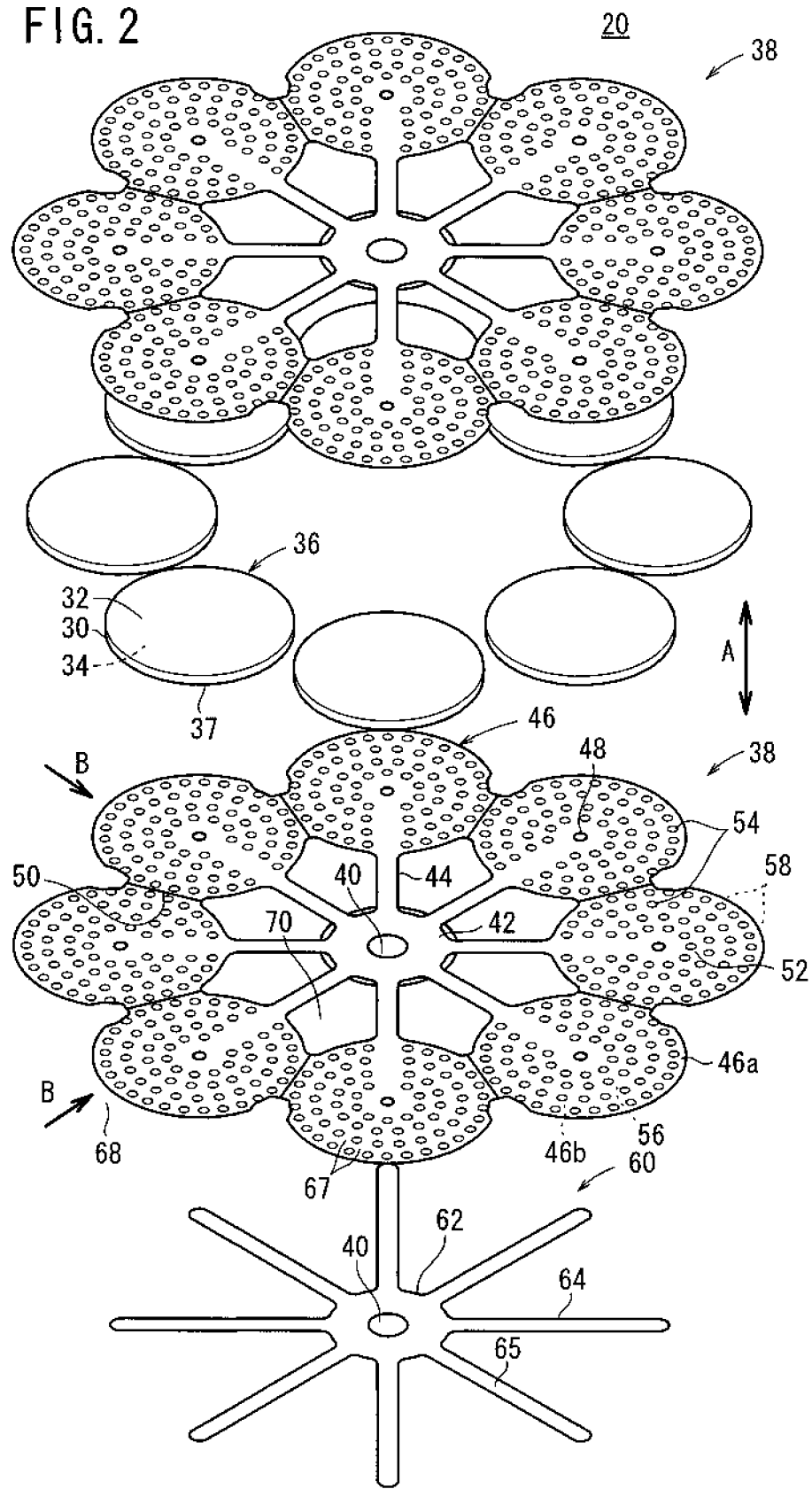
FIG. 2 is an exploded perspective view showing the fuel cell.
Figure 3:
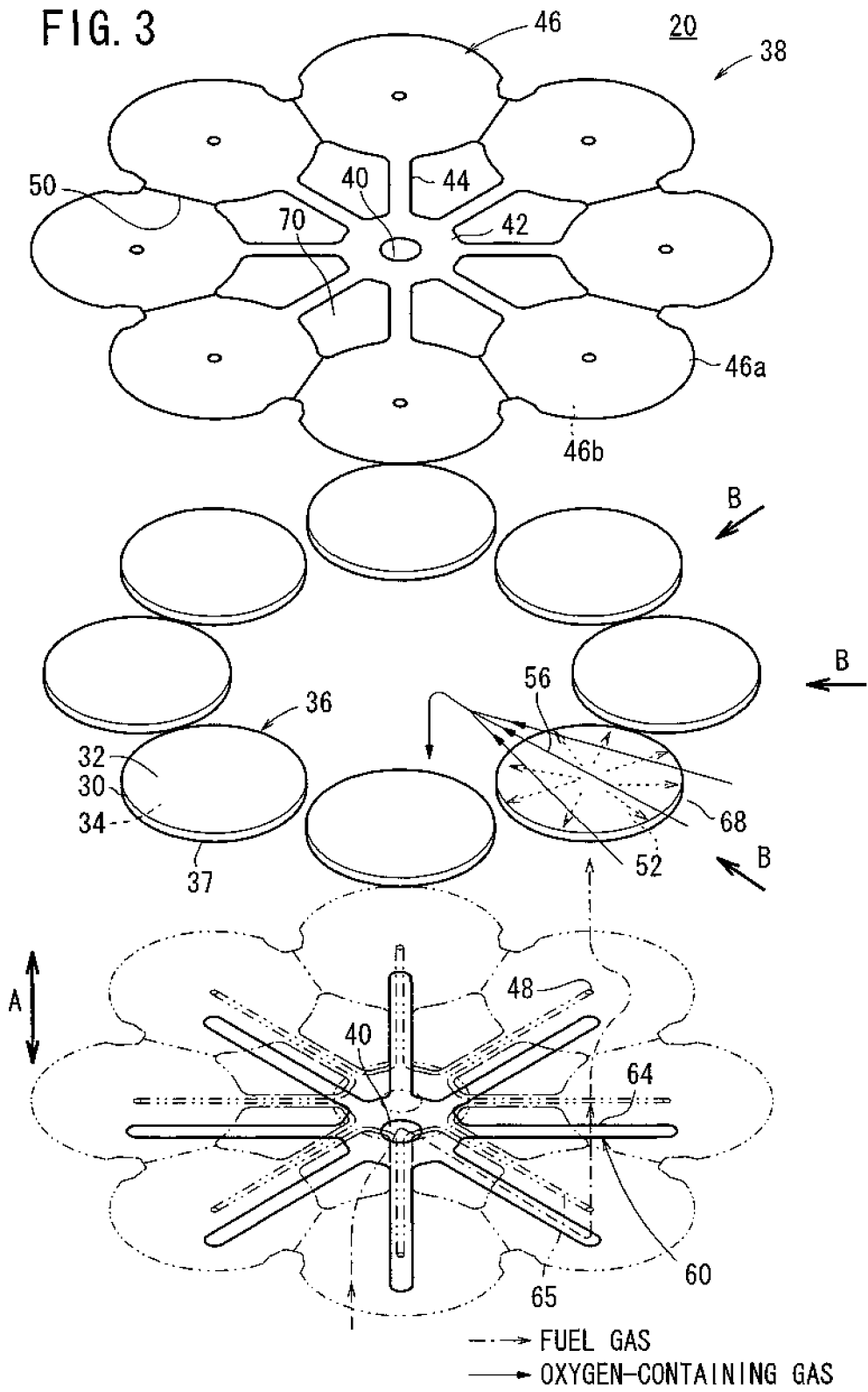
FIG. 3 is a partial exploded perspective view showing gas flows in the fuel cell.

The fuel cell 20 is a solid oxide fuel cell (SOFC) used in various applications, including stationary and mobile applications. For example, the fuel cell 20 is mounted on a vehicle. As shown in FIGS. 2 and 3, the fuel cell 20 includes electrolyte electrode assemblies 36. Each of the electrolyte electrode assembly 36 includes a cathode 32, an anode 34, and an electrolyte (electrolyte plate) 30 interposed between the cathode 32 and the anode 34. For example, the electrolyte 30 is made of ion-conductive solid oxide such as stabilized zirconia. The electrolyte electrode assembly 36 has a circular disk shape.

The electrolyte electrode assembly 36 in the first embodiment may be a support membrane type electrolyte electrode assembly formed by using one of the electrodes as a base plate, stacking the electrolyte on the one of the electrodes, and stacking the other electrode on the electrolyte. Alternatively, the electrolyte electrode assembly 36 may be a self-assembled type membrane formed by using the electrolyte as a base plate, and stacking the electrodes on both sides of the electrolyte on the base plate. Further, intermediate layers may be inserted between the electrolyte and the electrodes. In the following description, it is assumed that no intermediate layers are provided in the embodiment.

Figure 4:
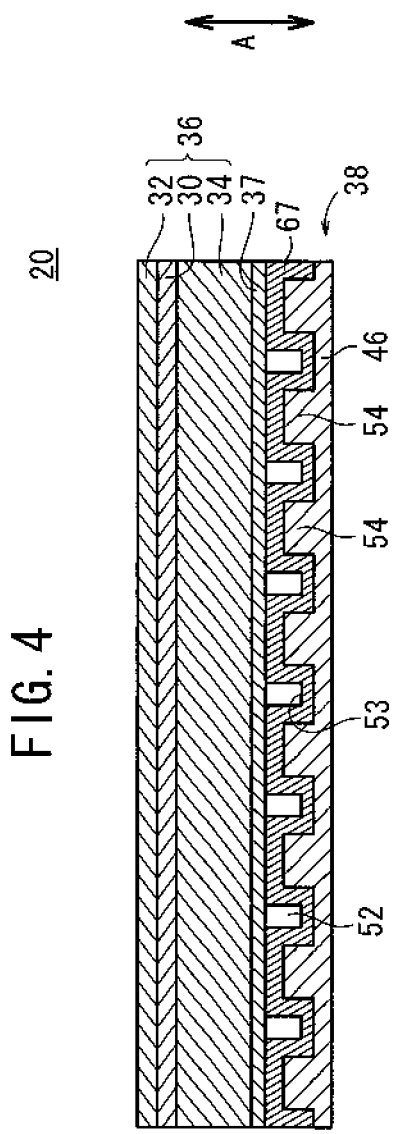
FIG. 4 is a cross sectional view showing an electrolyte electrode assembly and a separator of the fuel cell.

For example, the anode 34 is made of Ni—Zr cermet material. As shown in FIG. 4, the anode 34 is thick in the stacking direction indicated by the arrow A in comparison with the cathode 32. Using the anode 34 as a base plate, the electrolyte 30 is stacked on the anode 34, and the cathode 32 is stacked on the electrolyte 30 to form the support membrane type electrolyte electrode assembly 36. A first protection layer 37 is formed on a surface of the anode 34 facing a separator 38 as described later. The first protection layer 37 prevents the anode 34 from being exposed to the exhaust gas.

The first protection layer 37 is a coating layer made of metal having an electrical conductivity of 1.0 S/cm at 700° C. or cermet compound of the metal. As the metal, for example, Ni (nickel), Ag (silver), Co (cobalt), Pd (palladium), or Pt (platinum) is adopted. The first protection layer 37 has a thickness in a range of 1 to 100 μm. Pores are formed by, e.g., inducing reduction of Ni, from NiO to Ni to cause volume contraction. Alternatively, in order to form the pores, organic pore forming material such as carbon or resin may be added beforehand.

In the case of using cermet material such as Ni-YSZ (yttria stabilized zirconia), Ni-SSZ (scandia stabilized zirconia), Ni-SDC (samarium doped ceria), or Ni-GDC (gadolinium doped ceria), the first protection layer 37 has a metal ratio of 80% by weight or more.

In the first embodiment, as described above, the first protection layer 37 is a nickel current collecting layer.

For example, the separator 38 is a metal plate of Fe alloy or the like. As shown in FIG. 2, a fuel gas supply section 42 is provided at the center of the separator 38, and a fuel gas supply passage 40 extends through the fuel gas supply section 42 for supplying a fuel gas in the stacking direction indicated by the arrow A. A plurality of bridges 44 extend radially outwardly from the fuel gas supply section 42 at equal angles (intervals). Each of the bridges 44 is integral with a sandwiching section 46 having a circular disk shape.

The sandwiching section 46 and the electrolyte electrode assembly 36 have substantially the same size. A fuel gas inlet 48 for supplying the fuel gas is formed at the center of the sandwiching section 46, or at an upstream position deviated from the center of the sandwiching section 46 in the flow direction of the oxygen-containing gas. The adjacent sandwiching sections 46 are separated from each other by a slit 50.

Figure 5:
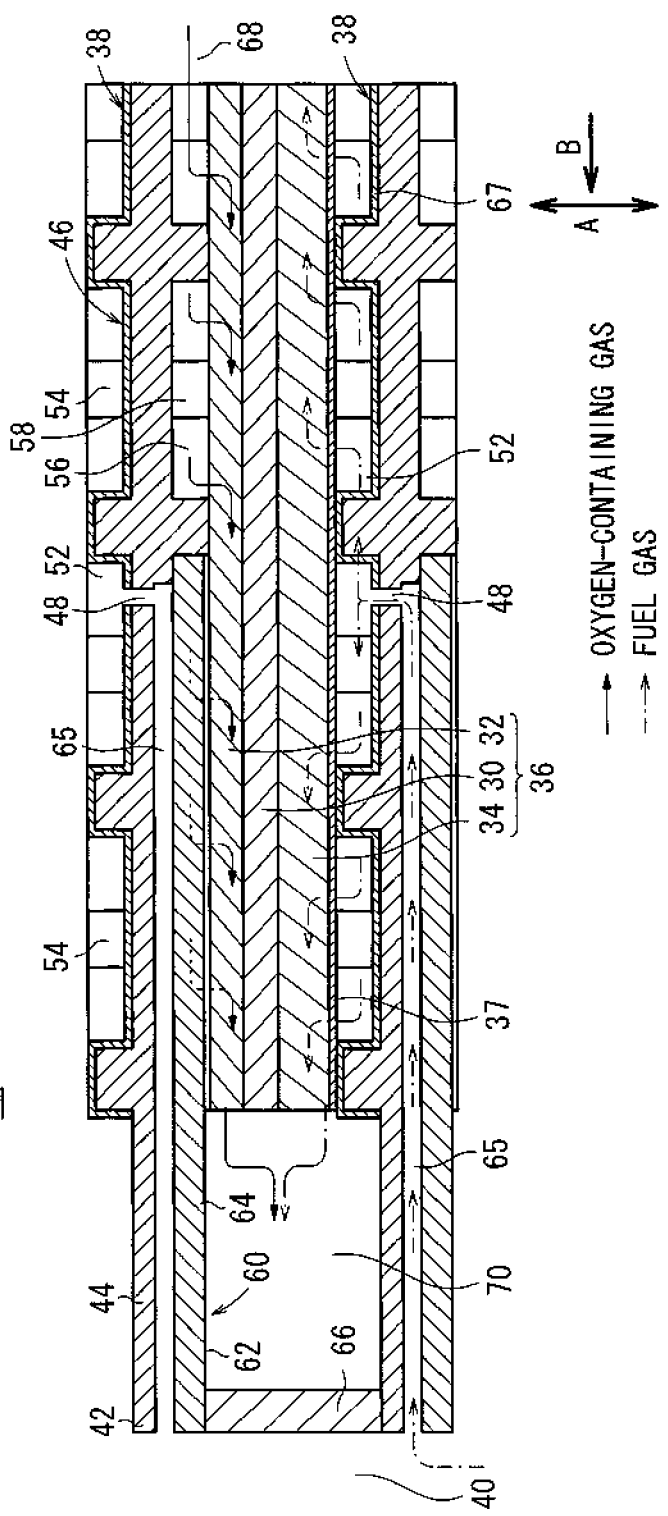
FIG. 5 is a cross sectional view schematically showing operation of the fuel cell.

As shown in FIGS. 2 and 5, each of the sandwiching sections 46 has a plurality of protrusions 54 on its surface 46a which contacts the anode 34. The protrusions 54 form a fuel gas channel 52 for supplying the fuel gas along an electrode surface of the anode 34. Further, each of the sandwiching sections 46 has a plurality of protrusions 58 on its surface 46b which contacts the cathode 32. The protrusions 58 form an oxygen-containing gas channel 56 for supplying the oxygen-containing gas along an electrode surface of the cathode 32.

A channel lid member 60 is fixed to a surface of the separator 38 facing the cathode 32, e.g., by brazing or laser welding. The channel lid member 60 has a flat shape. A fuel gas supply section 62 is provided at the center of the channel lid member 60. The fuel gas supply passage 40 extends through the fuel gas supply section 62. Eight bridges 64 extend radially from the fuel gas supply section 62. Each of the bridges 64 is fixed to the separator 38 over the surfaces of the bridge 44 to the sandwiching section 46 to cover the fuel gas inlet 48. Thus, a fuel gas supply channel 65 connecting the fuel gas supply passage 40 to the fuel gas inlet 48 is formed between the bridges 44, 64.

As shown in FIGS. 4 and 5, a second protection layer 67 is formed on a surface of the separator 38 facing the anode 34. The second protection layer 67 prevents the separator 38 from being exposed to the exhaust gas. The second protection layer 67 has the same structure as the first protection layer 37. Therefore, the detailed description of the second protection layer 67 is omitted.

The first protection layer 37 and the second protection layer 67 tightly contact each other in part so as to form a space 53 between the first protection layer 37 and the second protection layer 67 (see FIG. 4). The space 53 forms a fuel gas channel 52 for supplying the fuel gas to the anode 34.

As shown in FIG. 5, an insulating seal 66 for sealing the fuel gas supply passage 40 is provided in each space between the separators 38. In the fuel cell 20, an oxygen-containing gas supply channel 68 for supplying the oxygen-containing gas in the stacking direction indicated by the arrow A is formed around the sandwiching sections 46, and exhaust gas channels 70 for discharging the consumed fuel gas and oxygen-containing gas are formed in spaces around the fuel gas supply section 42.

As shown in FIG. 1, end plates 74a, 74b are provided at opposite ends of the fuel cells 20 in the stacking direction. The end plate 74a has a substantially circular disk shape. A hole 76 corresponding to the fuel gas supply passage 40 is formed at the center of the end plate 74a. A plurality of holes 78 are formed corresponding to the exhaust gas channels 70 around the hole 76. Components between the end plates 74a, 74b are stacked together in the direction indicated by the arrow A by bolts (not shown) screwed into screw holes 80.

Next, the method of producing the fuel cell 20 according to the first embodiment will be described below.

Firstly, a production step of forming the first protection layer 37 on the surface of the anode 34 of the electrolyte electrode assembly 36 facing the separator 38 is performed.

Specifically, paste containing 55% by weight of NiO is provided on the surface of the anode 34 by screen printing. Using an air firing furnace, at the temperature of 800° C. to 1400° C., a burning process is performed for 1 to 4 hours. At this time, pore forming material is added to the paste as necessary. After firing, the NiO layer has a large number of pores. In particular, in the case where the thickness of the first protection layer 37 is large, the pore forming material needs to be added to increase the porosity. In the first embodiment, as an example, although the case of using screen printing has been described as a method of forming the first protection layer 37 on the separator 38, alternatively, any of welding injection, sputtering methods, PLD (pulsed laser deposition) methods, and plating may be used.

By the burning process, the first protection layer 37 having a thickness in a range of 1 to 100 μm, preferably in a range of 2 to 10 μm is formed on the surface of the anode 34. In order to prevent aggregation of Ni particles, for example, cermet material of Ni-8YSZ or the like may be used. In this case, preferably, the nickel ratio in the first protection layer 37 is 80% by weight or more.

On the other hand, the second protection layer 67 is formed at least on the surface of the sandwiching section 46 facing the anode 34, e.g., by electroless plating. As necessary, masking is applied to the surface of the circular disk shaped sandwiching section 46 where the protrusions 54 are provided. For example, this masking is carried out using a tape or paraffin.

Next, a degreasing process and a passivation film removing process are applied to the separator 38 using xylene or the like (combination of several acid and alkali chemicals may be used). Thus, nickel electroplating of a thin film is applied to the surface of the activated surface of the separator 38 (nickel strike plating). The electroplating layer is provided to ensure that a plating layer in the subsequent process is tightly applied to the separator 38 (to improve adhesion of the plating layer). Preferably, the thickness of the electroplating layer is 1 μm or less.

After the electroplating layer of nickel is formed on the separator 38, nickel electroless plating is applied to the separator 38. Preferably, the nickel electroless plating layer has a thickness of 5 μm or less. At this time, elements chiefly added to the nickel bath used for plating are P (phosphorous), W (tungsten), B (boron), or Co (cobalt) or the like. The nickel concentration in the nickel bath is 80 wt % or more.

Further, after the plating process is applied to the separator 38, the separator 38 is washed using water. Then, a firing (baking) process for one hour, at the temperature of 130° C. is applied to the separator 38. This firing process is performed to improve adhesion of the plating layer. After the firing process, a composite tissue of amorphous and crystal is obtained. In this manner, the second protection layer 67 is formed on the separator 38.

After the electrolyte electrode assembly 36 is placed on each of the sandwiching sections 46 of the separator 38, partially the second protection layer 67 tightly contacts the first protection layer 37 formed on the anode 34 to cover the protrusions 54 of each of the sandwiching sections 46. The space 53 between the first protection layer 37 and the second protection layer 67 forms the fuel gas channel 52 (see FIG. 4).

Operation of the fuel cell stack 22 including the fuel cells 20 as produced above will be described.

As shown in FIG. 1, a fuel gas such as a hydrogen-containing gas is supplied to the hole 76 of the end plate 74a, and an oxygen-containing gas (hereinafter also referred to as the air) is supplied to the oxygen-containing gas supply channel 68 provided around the fuel cell 20.

As shown in FIG. 5, the fuel gas from the fuel gas supply section 42 flows along the fuel gas supply channels 65 in the bridges 44, and flows into the fuel gas channels 52 formed by the protrusions 54 from the fuel gas inlets 48 of the sandwiching sections 46. The fuel gas inlets 48 are formed at substantially the central positions of the anodes 34 of the electrolyte electrode assemblies 36. Thus, in each of the electrolyte electrode assemblies 36, the fuel gas is supplied from the fuel gas inlet 48 to substantially the central position of the anode 34, and flows outwardly toward the outer end of the anode 34 along the fuel gas channel 52.

The oxygen-containing gas flows into a space between the outer circumferential edge of the electrolyte electrode assembly 36 and the outer circumferential edge of the sandwiching section 46 in the direction indicated by the arrow B, and flows toward the oxygen-containing gas channel 56. In the oxygen-containing gas channel 56, the oxygen-containing gas flows from the outer circumferential edge (outer circumferential region of the separator 38) to the other outer circumferential edge (central region of the separator 38), i.e., from one end to the other end of the cathode 32 of the electrolyte electrode assembly 36.

Thus, in the electrolyte electrode assembly 36, the fuel gas flows from the central portion to the outer circumferential side on the electrode surface of the anode 34, and the oxygen-containing gas flows in one direction indicated by the arrow B on the electrode surface of the cathode 32. At this time, oxide ions flow through the electrolyte 30 toward the anode 34 for generating electricity by electrochemical reactions. The exhaust gas discharged from the outer end of each of the electrolyte electrode assemblies 36 flows through the exhaust gas channels 70 in the stacking direction, and then the exhaust gas is discharged from the fuel cell stack 22.

At this time, normally, the oxygen-containing gas, i.e., the air is supplied to the electrolyte electrode assemblies 36 excessively. Before, after, and during combustion of the air and the unconsumed fuel gas, the oxygen remaining in the air is present outside the electrolyte electrode assemblies 36. The air containing the remaining oxygen flows around from the cathode 32 to the anode 34. Further, at the anode 34, water vapor is produced in the power generation reaction. After power generation reaction, the fuel gas still contains some fuel which was not consumed in the reaction. In the presence of the hot exhaust gas containing the oxygen, the water vapor, and the fuel gas after power generation reaction, outer ends of the electrolyte electrode assemblies 36 and the separator 38 are in a severe environment where oxidation, water vapor oxidation, and reduction occur concurrently. The outer end of the electrolyte electrode assembly 36, in particular, the outer end of the anode 34 and the outer end of the separator 38 are exposed to the exhaust gas. Oxidation and water vapor oxidation occur easily, and reduction reaction may occur concurrently at the outer end of the anode 34 and the outer end of the separator 38.

In the first embodiment, as shown in FIGS. 4 and 5, since the first protection layer 37 and the second protection layer 67 are provided on the anode 34 and the separator 38, respectively, even if the oxygen-containing gas in the exhaust gas flows around the outer end of the electrolyte electrode assembly 36 so as to flow into the outer ends of the anode 34 and the separator 38, and even in the presence of the water vapor, the anode 34 and the separator 38 are not oxidized or water vapor oxidized.

Thus, improvement in the anti-oxidation performance of the anode 34 and the separator 38 is achieved, and sediment is not generated or scattered due to oxidation or water vapor oxidation. Accordingly, the fuel gas flows smoothly along the fuel gas channel 52.

Further, the first protection layer 37 formed on the anode 34 and the second protection layer 67 formed on the sandwiching section 46 of the separator 38 are combined together to effectively improve rigidity. The first protection layer 37 and the second protection layer 67 are made of the same material, and have the same heat expansion coefficient.

Thus, when heat is applied to the first protection layer 37 and the second protection layer 67, the first protection layer 37 and the second protection layer 67 are deformed in the same fashion. As a result, the electrolyte electrode assembly 36 is not damaged easily. Since the anode 34 and the separator 38 contact tightly, the current collecting characteristics are improved, and it becomes possible to effectively reduce the contact resistance advantageously.

Figure 6:
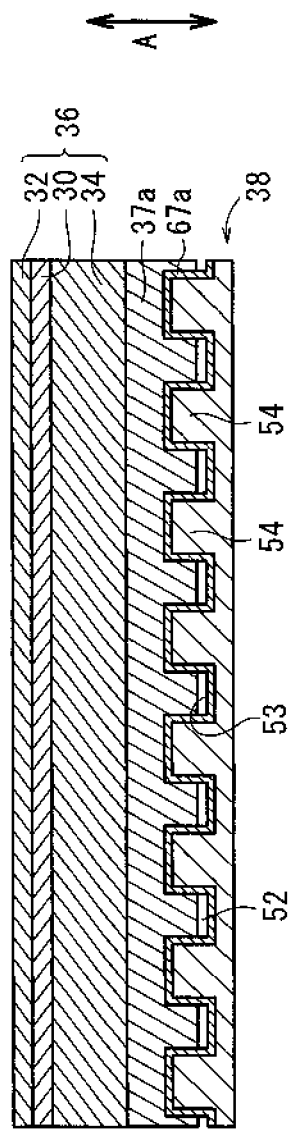
FIG. 6 is a cross sectional view schematically showing a fuel cell according to a first modified example of the first embodiment.

FIG. 6 is a cross sectional view schematically showing a fuel cell according to a first modified example of the first embodiment. In the first modified example, a first protection layer 37a and a second protection layer 67a are adopted instead of the first protection layer 37 and the second protection layer 67 of the fuel cell 20.

Specifically, in the first modified example, the first protection layer 37a is formed on the surface of the anode 34 facing the separator 38, and the second protection layer 67a is formed on the surface of the separator 38 facing the anode 34.

The first protection layer 37a is relatively thick. At the time of warming up the system (at the initial stage of operation), the protrusions 54 of the separator 38 penetrate into the first protection layer 37a. Because both of the first protection layer 37a and the second protection layer 67a contain nickel, nickel in these layers 37a, 67a is blended easily.

Thus, in the first modified example, since the protrusions 54 of the separator 38 penetrate into, and contact the first protection layer 37a on the anode 34 tightly, relative movement between the protrusions 54 and the first protection layer 37a is suppressed. Accordingly, it is becomes advantageously possible to reliably prevent damages or the like in the electrolyte electrode assembly 36 due to deformation by heat.

It should be noted that it is difficult to form the first protection layers 37, 37a and the second protection layers 67, 67a as a thin film having the thickness of less than 1 μm. In addition, if the film thickness is too small, the desired effect of suppressing oxidation cannot be obtained. Therefore, preferably, the film thickness is 1 μm or more.

If the film thickness is too large, the electrical resistance and the contact resistance become large. Therefore, losses in electrical conductance and electrical collection become large. Further, the coating layer is peeled off easily at the interface due to the difference between the heat expansion coefficients. It becomes difficult to reliably form the coating layer while preventing formation of pin holes or the like, and the cost becomes high disadvantageously. Therefore, preferably, an upper limit of the film thickness needs to be determined as necessary. In particular, it is preferable that the first protection layers 37, 37a have a thickness of 100 μm or less.

Figure 7:
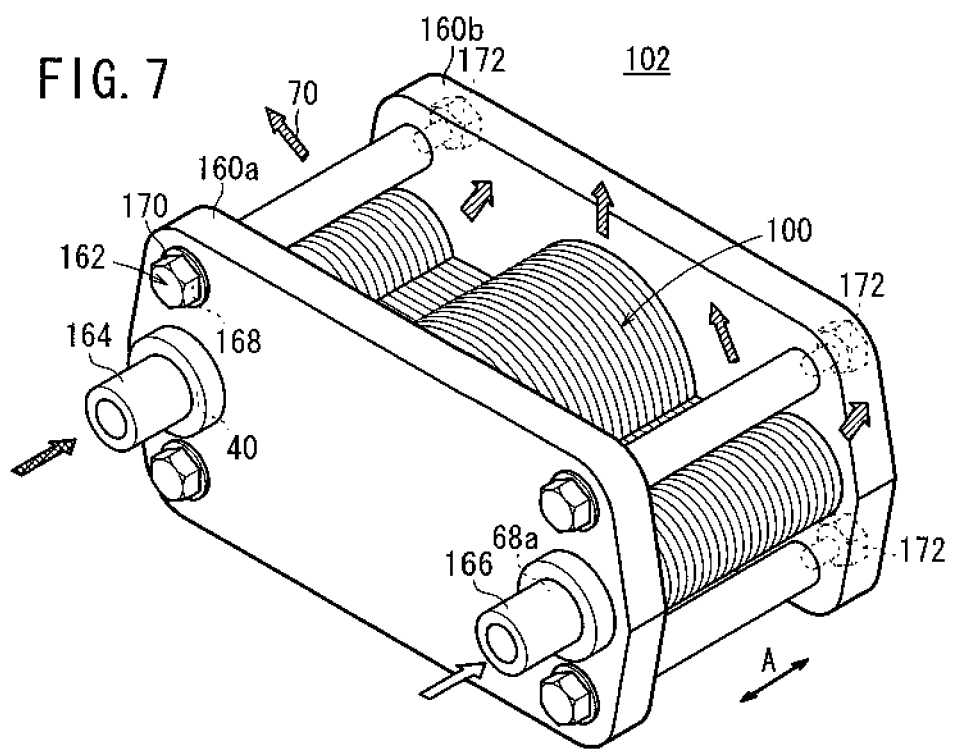
FIG. 7 is a perspective view schematically showing a fuel cell stack formed by stacking a plurality of fuel cells according to a second modified example of the first embodiment.

FIG. 7 is a perspective view schematically showing a fuel cell stack 102 formed by stacking a plurality of fuel cells 100 according to a second modified example of the first embodiment. The constituent elements that are identical to those of the fuel cell 20 according to the first embodiment are labeled with the same reference numeral, and description thereof will be omitted. Also in third to fifth modified example as described later, the constituent elements that are identical to those of the fuel cell 20 according to the first embodiment are labeled with the same reference numeral, and description thereof will be omitted.

Figure 8:
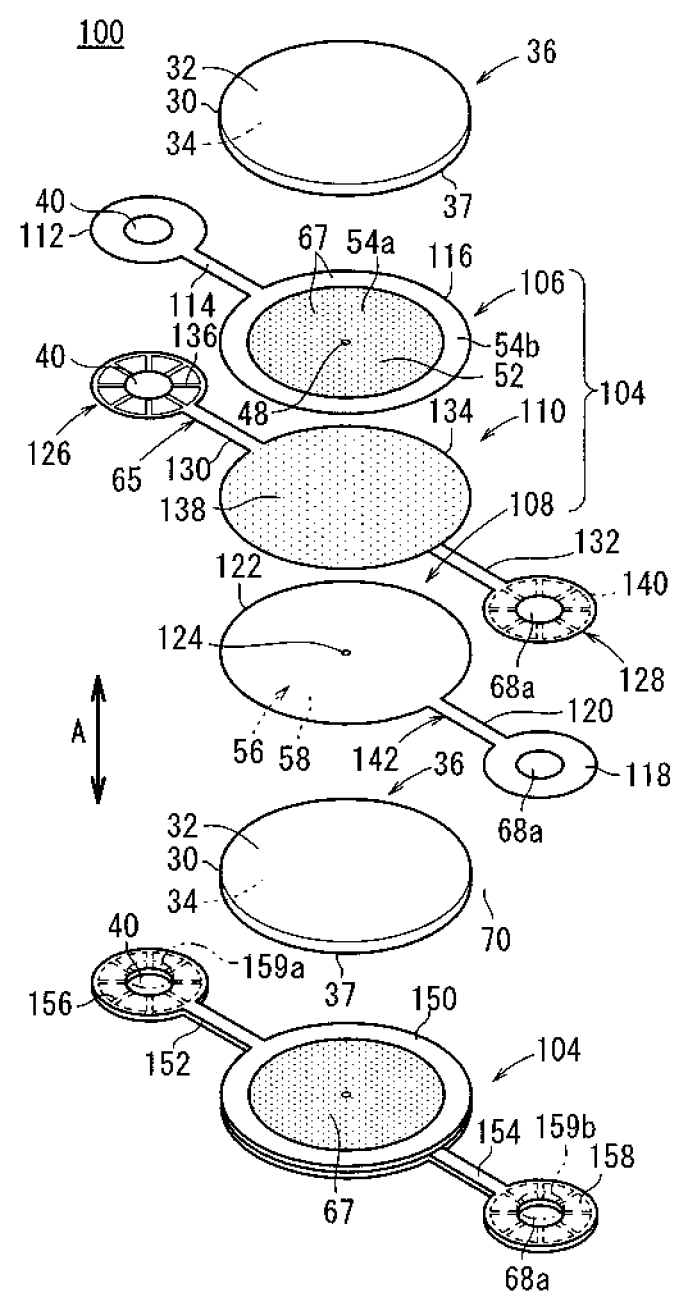
FIG. 8 is an exploded perspective view showing the fuel cell.
Figure 9:
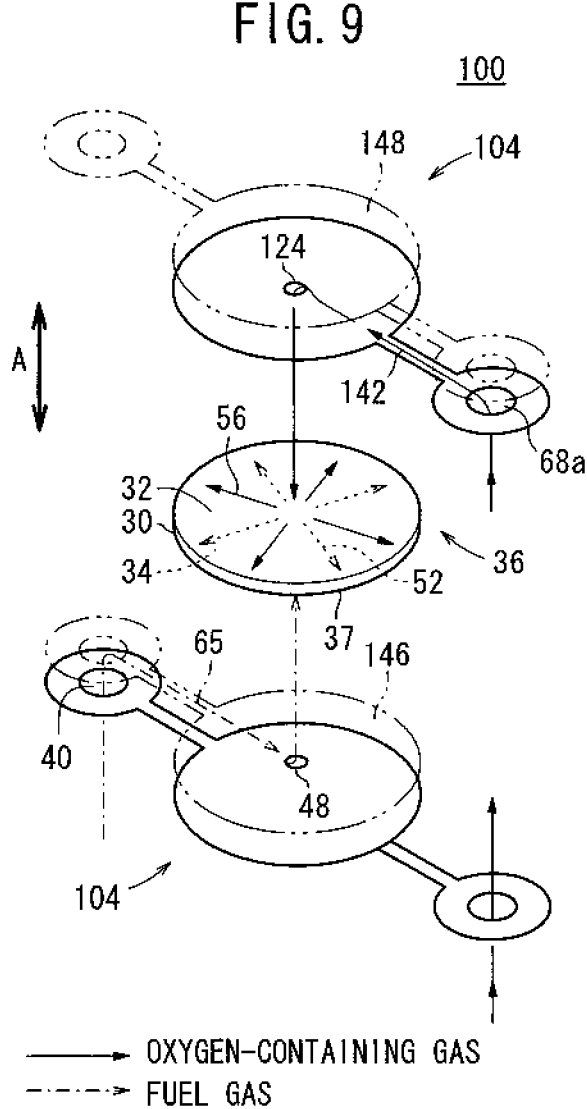
FIG. 9 is a partial exploded perspective view showing gas flows in the fuel cell.

As shown in FIGS. 8 and 9, the fuel cell 100 includes a single electrolyte electrode assembly 36 and a pair of separators 104 sandwiching the electrolyte electrode assembly 36. The separator 104 includes first and second plates 106, 108, and a third plate 110 interposed between the first and second plates 106, 108. For example, the first to third plates 106, 108, 110 are metal plates of, e.g., stainless alloy. The first plate 106 and the second plate 108 are joined to both surfaces of the third plate 110 by brazing, for example.

A shown in FIG. 8, the first plate 106 has a first fuel gas supply section 112. A first fuel gas supply passage 40 extends through the first fuel gas supply section 112 for supplying a fuel gas in the stacking direction indicated by the arrow A. The first fuel gas supply section 112 is integral with a first sandwiching section 116 having a relatively large diameter through a narrow first bridge 114. The size of the first sandwiching section 116 and the size of the anode 34 of the electrolyte electrode assembly 36 are substantially the same.

A large number of protrusions 54a are formed on a surface of the first sandwiching section 116 which contacts the anode 34, in a central region adjacent to an outer circumferential region. A substantially ring shaped protrusion 54b is provided on the outer circumferential region of the first sandwiching section 116. The protrusions 54a and the substantially ring shaped protrusion 54b jointly function as a current collector.

A fuel gas inlet 48 is provided at the center of the first sandwiching section 116 for supplying the fuel gas toward substantially the central region of the anode 34. The protrusions 54a may be formed by making a plurality of recesses in a surface which is in the same plane with the surface of the substantially ring shaped protrusion 54b. A second protection layer 67 is formed on a surface of the first sandwiching section 116 facing the anode 34 to cover the protrusions 54a and the substantially ring shaped protrusions 54b.

The second plate 108 has a first oxygen-containing gas supply section 118, and an oxygen-containing gas supply passage 68a for supplying an oxygen-containing gas in the stacking direction indicated by the arrow A extends through the first oxygen-containing gas supply section 118. The first oxygen-containing gas supply section 118 is integral with a second sandwiching section 122 having a relatively large diameter through a narrow second bridge 120.

Figure 10:
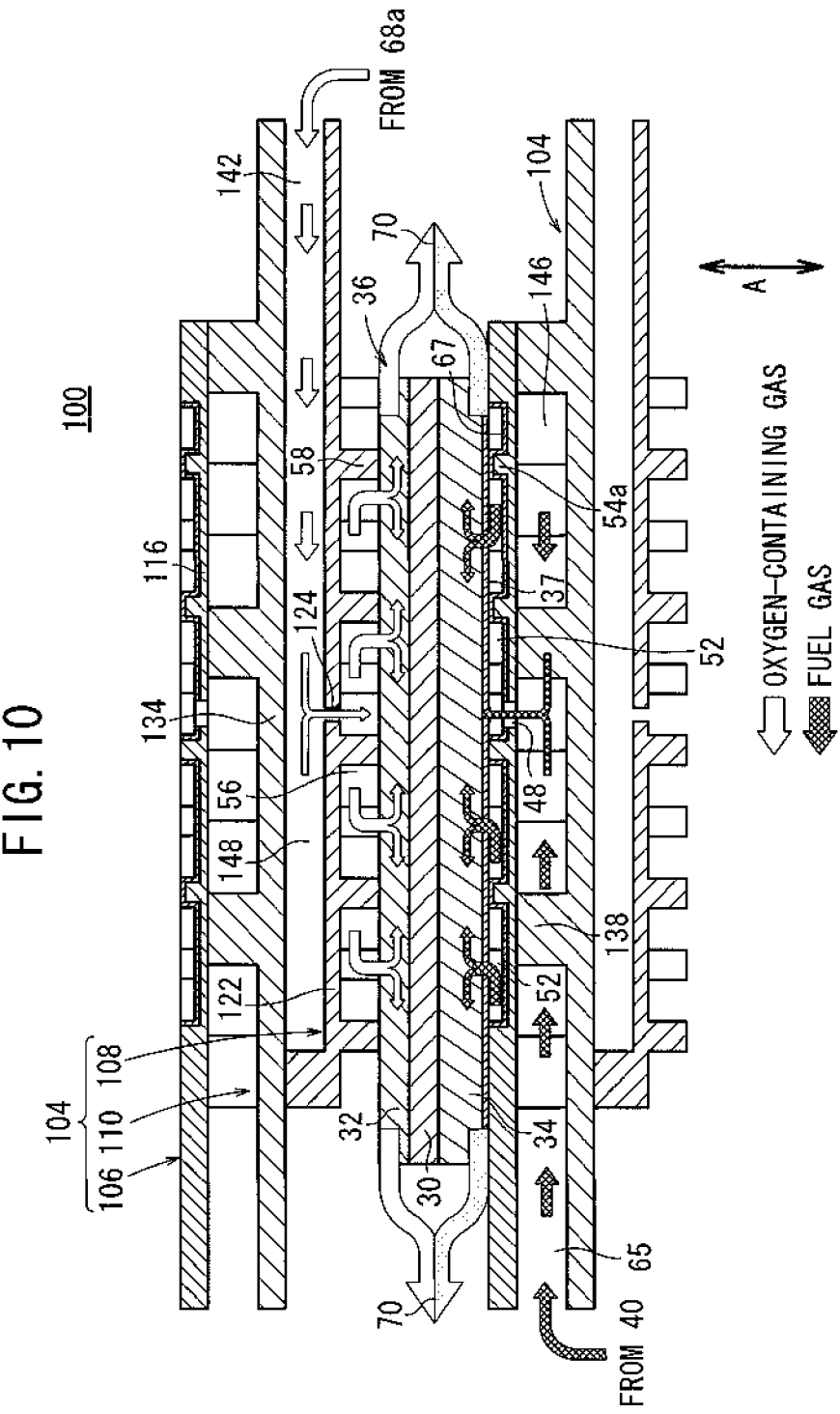
FIG. 10 is a cross sectional view showing an electrolyte electrode assembly and a separator of the fuel cell.

A plurality of second protrusions 58 forming the oxygen-containing gas channel 56 are formed over the entire surface of the second sandwiching section 122 which contacts the cathode 32 of the electrolyte electrode assembly 36 (see FIG. 10). An oxygen-containing gas inlet 124 for supplying the oxygen-containing gas toward substantially the central region of the cathode 32 is formed at the center of the second sandwiching section 122.

The third plate 110 has a second fuel gas supply section 126 and a second oxygen-containing gas supply section 128. The fuel gas supply passage 40 extends through the second fuel gas supply section 126 and the oxygen-containing gas supply passage 68a extends through the second oxygen-containing gas supply section 128. The second fuel gas supply section 126 and the second oxygen-containing gas supply section 128 are integral with third sandwiching sections 134 having a relatively large diameter through narrow third and fourth bridges 130, 132. The diameter of the third sandwiching section 134 is the same as the diameters of the first and second sandwiching sections 116, 122.

A channel 136 including a plurality of slits is formed on the second fuel gas supply section 126. The channel 136 is connected to the fuel gas supply passage 40. The slits of the channel 136 are formed radially on a surface of the third plate 110 facing the first plate 106. A fuel gas supply channel 65 is formed between the third bridge 130, and the third sandwiching section 134. The fuel gas supply passage 40 is connected to the fuel gas supply channel 65 through the channel 136. A plurality of protrusions 138 are formed in the third sandwiching section 134. The protrusions 138 form part of the fuel gas supply channel 65.

A channel 140 including a plurality of slits is formed on the second oxygen-containing gas supply section 128. The channel 140 is connected to the oxygen-containing gas supply passage 68a. The slits of the channel 140 are formed radially on a surface of the third plate 110 which contacts the second plate 108. The oxygen-containing gas supply passage 68a is connected to the oxygen-containing gas supply channel 142 of the third sandwiching section 134 through the channel 140. The oxygen-containing gas supply channel 142 is closed by the outer edge of the third sandwiching section 134.

The first plate 106 is joined to one surface of the third plate 110 by brazing to form the fuel gas supply channel 65 connected to the fuel gas supply passage 40 between the first and third plates 106, 110. The fuel gas supply channel 65 is provided between the first and third sandwiching sections 116, 134, over the electrode surface of the anode 34. The first sandwiching section 116 is provided between the fuel gas supply channel 65 and the anode 34. When the fuel gas is supplied to the fuel gas supply channel 65, the first sandwiching section 116 tightly contacts the anode 34 under pressure. That is, the fuel gas supply channel 65 forms a fuel gas pressure chamber 146 (see FIG. 10). An exhaust gas channel 70 for discharging the fuel gas and the oxygen-containing gas used in the power generation reaction is provided around the electrolyte electrode assembly 36.

The second plate 108 is joined to the third plate 110 by brazing to form the oxygen-containing gas supply channel 142 connected to the oxygen-containing gas supply passage 68a between the second and third plates 108, 110. The oxygen-containing gas supply channel 142 is provided between the second and third sandwiching sections 122, 134, over the electrode surface of the cathode 32. The second sandwiching section 122 is provided between the oxygen-containing gas supply channel 142 and the cathode 32. When the oxygen-containing gas is supplied to the oxygen-containing gas supply channel 142, the second sandwiching section 122 tightly contacts the cathode 32 under pressure. That is, the oxygen-containing gas supply channel 142 forms an oxygen-containing gas pressure chamber 148 (see FIG. 10).

In the separator 104, the first sandwiching section 116 of the first plate 106, the second sandwiching section 122 of the second plate 108, and the third sandwiching section 134 of the third plate 110 are joined together to form a sandwiching section 150 having a circular disk shape. The sandwiching section 150 is connected to a bridge 152 formed by joining the first and third bridges 114, 130 together, and a bridge 154 formed by joining second and the fourth bridges 120, 132 together.

The bridge 152 is connected to a fuel gas supply section 156 formed by joining the first fuel gas supply section 112 and the second fuel gas supply section 126. The bridge 154 is connected to the oxygen-containing gas supply section 158 formed by joining the first oxygen-containing gas supply section 118 and the second oxygen-containing gas supply section 128.

As shown in FIG. 8, insulating seals 159a for sealing the fuel gas supply passage 40, and insulating seals 159b for sealing the oxygen-containing gas supply passage 68a are provided between the separators 104. For example, the insulating seals 159a, 159b are made of mica material, or ceramic material.

As shown in FIG. 7, the fuel cell stack 102 includes a plurality of fuel cells 100 stacked together, and end plates 160a, 160b provided at opposite ends in the stacking direction. The end plate 160a or the end plate 160b is electrically insulated from tightening means 162. The end plate 160a is connected to a first pipe 164 communicating with the fuel gas supply passage 40 of the fuel cells 100, and a second pipe 166 communicating with the oxygen-containing gas supply passage 68a of the fuel cells 100. The tightening means 162 is provided at positions adjacent to gas fuel gas supply passage 40 and the oxygen-containing gas supply passage 68a, and spaced from the electrolyte electrode assemblies 36. The tightening means 162 applies a tightening force to the electrolyte electrode assemblies 36 and the separators 104 stacked in the direction indicated by the arrow A.

The tightening means 162 includes bolt holes 168 formed in the end plate 160a, 160b, at positions on both sides of the fuel gas supply passage 40 and on both sides of the oxygen-containing gas supply passage 68a. Tightening bolts 170 are inserted into the bolt holes 168, and tip ends of the tightening bolts are screwed into nuts 172 to tighten components of the fuel cell stack 102 together.

Operation of the fuel cell stack 102 will be described below.

As shown in FIG. 7, the fuel gas is supplied from the first pipe 164 connected to the end plate 160a and the oxygen-containing gas is supplied from the second pipe 166 connected to the end plate 160a. The fuel gas flows into the fuel gas supply passage 40, and the oxygen-containing gas flows into the oxygen-containing gas supply passage 68a.

As shown in FIG. 10, the fuel gas supplied to the fuel gas supply passage 40 flows in the stacking direction indicated by the arrow A, and the fuel gas is supplied to the fuel gas supply channel 65 in the separator 104 of each fuel cell 100. The fuel gas flows along the fuel gas supply channel 65 into the fuel gas pressure chamber 146 formed between the first and third sandwiching sections 116, 134. The fuel gas moves between the protrusions 138, and flows into the fuel gas inlet 48 formed at the center of the first sandwiching section 116.

The fuel gas inlet 48 is provided at a position corresponding to the central position of the anode 34 in each of the electrolyte electrode assemblies 36. Therefore, the fuel gas from the fuel gas inlet 48 is supplied to the fuel gas channel 52, and flows from the central region of the anode 34 toward the outer circumferential region of the anode 34.

The oxygen-containing gas supplied to the oxygen-containing gas supply passage 68a flows along the oxygen-containing gas supply channel 142 in the separator 104, and the oxygen-containing gas is supplied into the oxygen-containing gas pressure chamber 148 formed between the second and third sandwiching sections 122, 134. Then, the oxygen-containing gas flows into the oxygen-containing gas inlet 124 formed at the center of the second sandwiching section 122.

The oxygen-containing gas inlet 124 is provided at a position corresponding to the central position of the cathode 32 in each of the electrolyte electrode assemblies 36. Therefore, the oxygen-containing gas from the oxygen-containing gas inlet 124 is supplied to the oxygen-containing gas channel 56, and flows from the central region of the cathode 32 toward the outer circumferential region of the cathode 32.

Thus, in each of the electrolyte electrode assemblies 36, the fuel gas is supplied from the central region of the anode 34 to the outer circumferential region of the anode 34, and the oxygen-containing gas is supplied from the central region of the cathode 32 to the outer circumferential region of the cathode 32 for generating electricity. The fuel gas and the oxygen-containing gas used in the power generation are discharged as the exhaust gas from the outer circumferential region of the sandwiching section 150.

In the second modified example, as shown in FIG. 10, the first protection layer 37 is formed on the anode 34, and the second protection layer 67 is formed on the first sandwiching section 116 of the first plate 106 of the separator 38. In the second modified example, the same advantages as in the case of the first embodiment are obtained.

Figure 11:
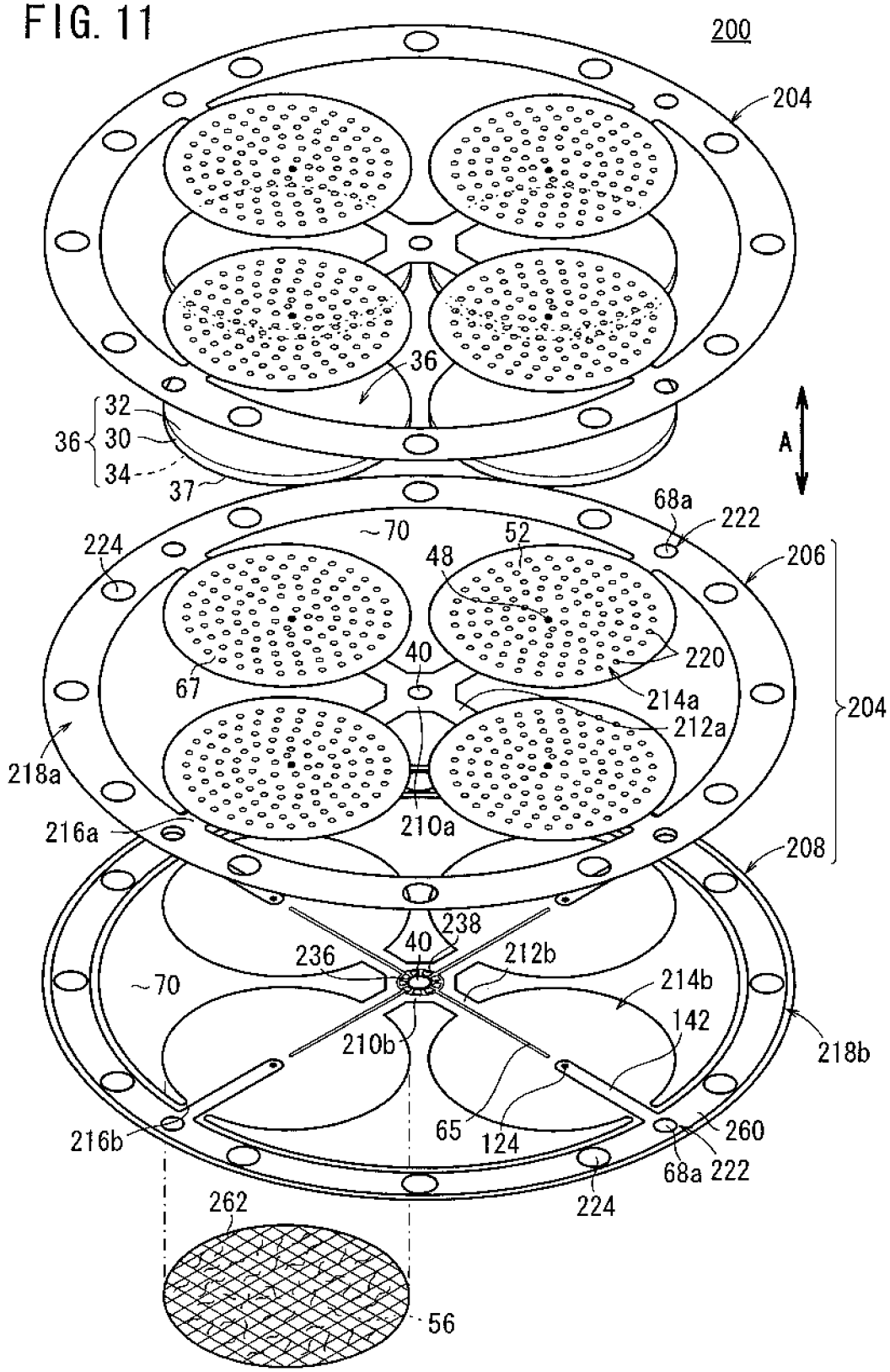
FIG. 11 is an exploded perspective view showing a fuel cell according to a third modified example of the first embodiment.

FIG. 11 is an exploded perspective view showing a fuel cell 200 according to a third modified example of the first embodiment.

As shown in FIG. 11, the fuel cell 200 includes a plurality of, e.g., four electrolyte electrode assemblies 36 and a pair of separators 204 sandwiching the electrolyte electrode assemblies 36. Specifically, the four electrolyte electrode assemblies 36 are provided around a fuel gas supply passage 40 extending through the center of the separators 204, at predetermined intervals (angles) along a virtual circle concentrically with the fuel gas supply passage 40.

Each of the separators 204 includes a first plate 206 a second plate 208. For example, the first and second plates 206, 208 are metal plates of, e.g., stainless alloy. For example, the first plate 206 and the second plate 208 are joined to each other by diffusion bonding, laser welding, or brazing. Instead of the metal plates, for example, carbon plates may be used as the first plate 206 and the second plate 208 (description regarding the method of joining the first plate 206 and the second plate 208 is omitted).

Figure 12:
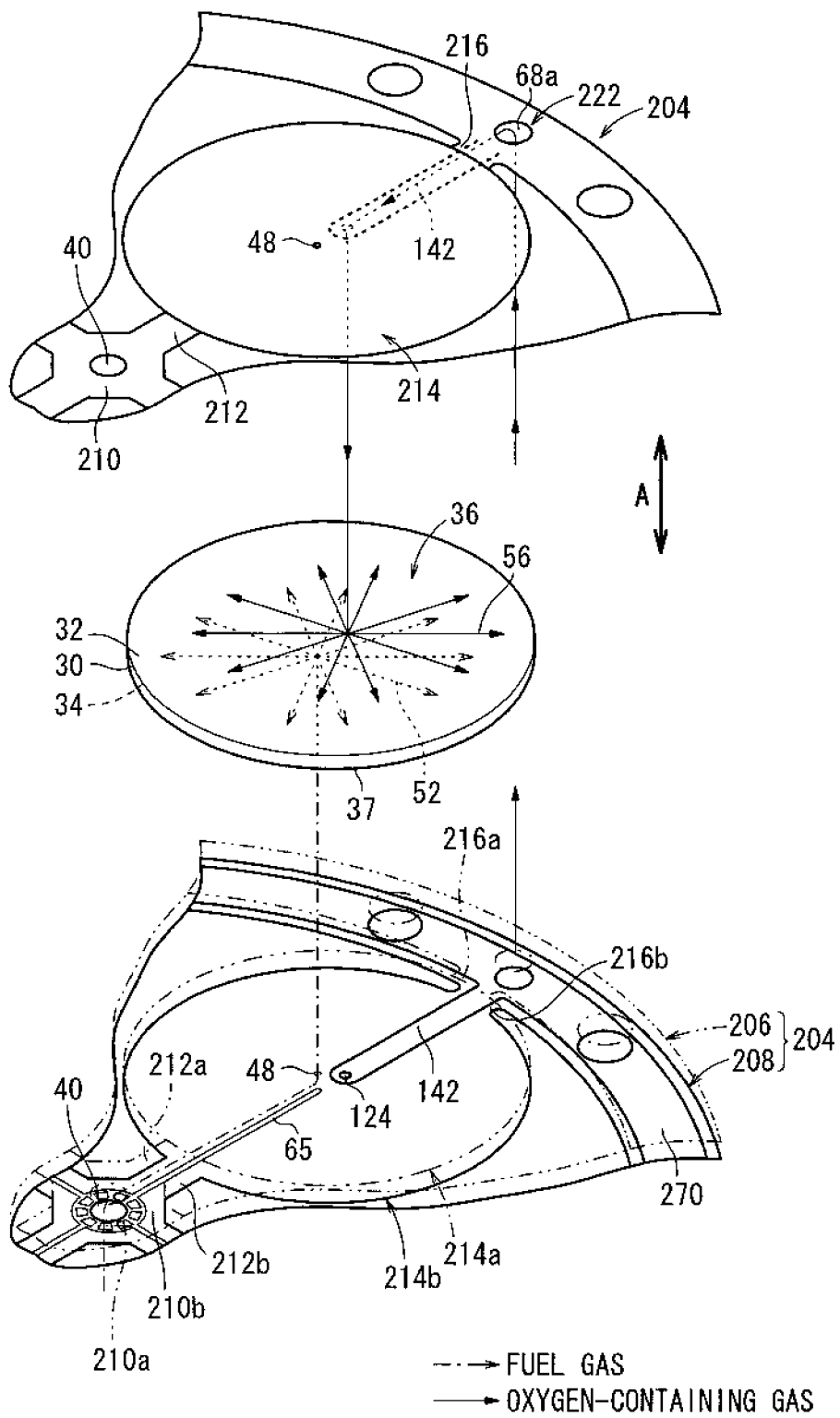
FIG. 12 is a partial exploded perspective view showing gas flows of the fuel cell.

As shown in FIGS. 11 and 12, a first fuel gas supply section 210a is formed at the center of the first plate 206. The fuel gas supply passage 40 extends through the first fuel gas supply section 210a, for supplying a fuel gas in the stacking direction indicated by the arrow A. Four first bridges 212a extend radially outwardly from the first fuel gas supply section 210a at equal intervals. The first fuel gas supply section 210a is integral with first sandwiching sections 214a each having a relatively large diameter. The first sandwiching section 214a and the electrolyte electrode assembly 36 have substantially the same size. The first sandwiching sections 214a are integral with an annular first case unit 218a through short second bridges 216a.

Each of the first sandwiching sections 214a has a plurality of protrusions 220 on a surface which contacts the anode 34. The protrusions 220 form a fuel gas channel 52 for supplying the fuel gas along an electrode surface of the anode 34. The protrusions 220 function as a current collector. A fuel gas inlet 48 for supplying the fuel gas is formed at substantially the center of the first sandwiching section 214a, at a position deviated toward the fuel gas supply passage 40 for supplying the fuel gas toward the substantially central region of the anode 34. A second protection layer 67 is provided on a surface of the first sandwiching section 214a which contacts the anode 34, to cover the protrusions 220.

The first case unit 218a includes an oxygen-containing gas supply sections 222. The oxygen-containing gas supply passages 142 extend through the oxygen-containing gas supply sections 222 in the stacking direction, for supplying an oxygen-containing gas to oxygen-containing gas supply channels 142. A plurality of bolt insertion holes 224 are formed in the first case unit 218a at predetermined intervals (angles). The fuel gas supply passage 40, the first bridge 212a, the first sandwiching section 214a, the second bridge 216a, and the oxygen-containing gas supply passage 68a are arranged in a straight line along the separator surface.

Figure 13:
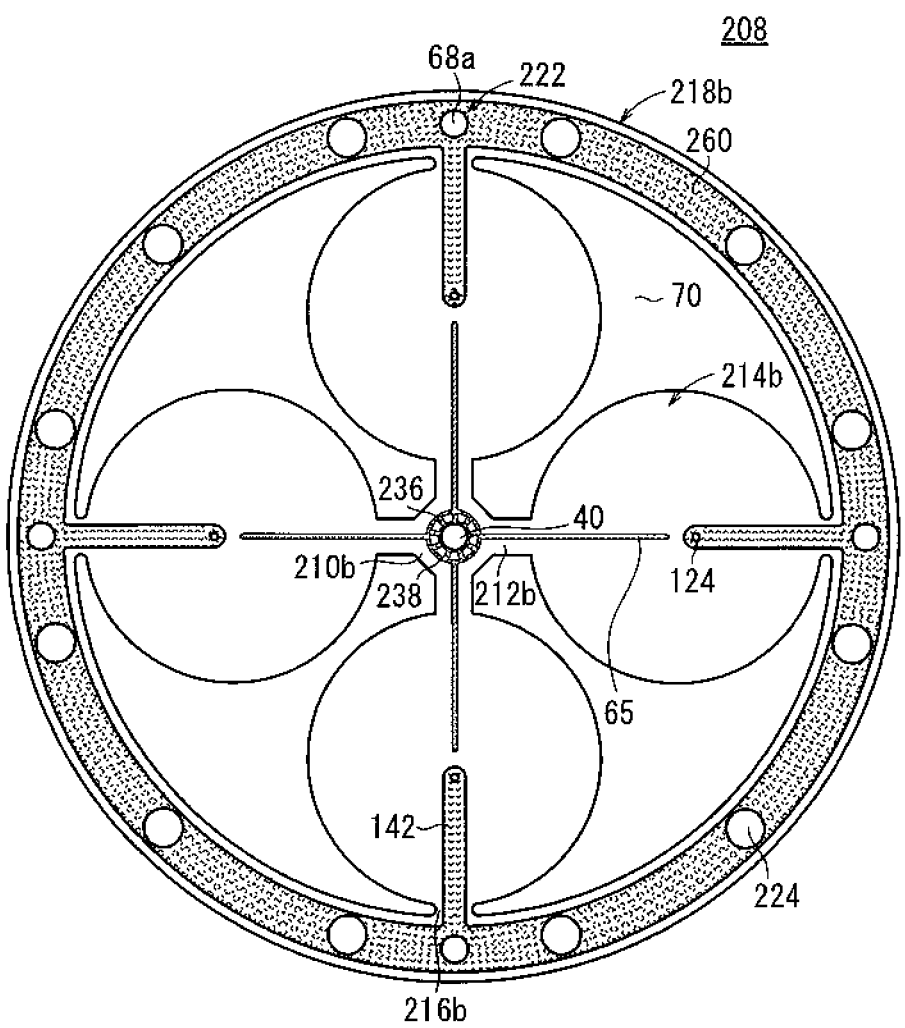
FIG. 13 is a view showing a second plate of a separator.

As shown in FIGS. 11 and 13, a second fuel gas supply section 210b is formed at the center of the second plate 208, and the fuel gas supply passage 40 extends through the center of the second fuel gas supply section 210b. Four first bridges 212b extend radially outwardly from the second fuel gas supply section 210b at predetermined intervals (angles), and the second fuel gas supply section 210b is integral with the second sandwiching sections 214b each having a relatively large diameter through the four first bridges 212b. As in the case of the first sandwiching section 214a, the second sandwiching section 214b and the electrolyte electrode assembly 36 have substantially the same size. The second sandwiching sections 214b are integral with an annular second case unit 218b through short second bridges 216b.

A plurality of grooves 236 connected to the fuel gas supply passage 40 are formed radially around the fuel gas supply passage 40, on a surface of the second fuel gas supply section 210b which is joined to the first fuel gas supply section 210a. The grooves 236 are connected to a circular groove 238, and the circular groove 238 is connected to four fuel gas supply channels 65. Each of the fuel gas supply channels 65 extends from the first bridge 212b to a position near substantially the center of the second sandwiching section 214b, and terminates at a position corresponding to the fuel gas inlet 48 of the first plate 206.

The second case unit 218b includes oxygen-containing gas supply sections 222 and bolt insertion holes 224. The oxygen-containing gas supply passages 68a extend through the oxygen-containing gas supply sections 222 in the stacking direction. The second case unit 218b has a filling chamber 260 on a surface joined to the first case unit 218a, and the filling chamber 260 is filled with the oxygen-containing gas supplied from the oxygen-containing gas supply passages 68a.

The filling chamber 260 is connected to the oxygen-containing gas supply channels 142. Each of the oxygen-containing gas supply channels 142 extends from the second bridge 216b to a position near substantially the center of the second sandwiching section 214b, and the front end of the oxygen-containing gas supply channel 142 is connected to an oxygen-containing gas inlet 124 passing through the second sandwiching section 214b.

The first plate 206 has the protrusions 220 formed by, e.g., etching, and the second plate 208 has the grooves 236, the circular groove 238, the fuel gas supply channels 65, the filling chamber 260, and the oxygen-containing gas supply channels 142 formed by, e.g., etching.

In the separator 204, as shown in FIG. 12, the first sandwiching section 214a of the first plate 206 and the second sandwiching section 214b of the second plate 208 are joined together to form a sandwiching section 214 having a circular disk shape. The sandwiching section 214 is connected to a first bridge 212 formed by joining the first bridges 212a, 212b together, and a second bridge 216 formed by joining the second bridges 216a, 216b together.

The first bridge 212 is connected to a fuel gas supply section 210 formed by joining the first fuel gas supply section 210a and the second fuel gas supply section 210b together. The second bridge 216 is connected to the oxygen-containing gas supply section 222 formed by joining the first case unit 218a and the second case unit 218b together.

As shown in FIG. 11, a deformable elastic channel unit such as an electrically conductive felt member (electrically conductive nonwoven fabric such as metal felt) 262 is provided on a surface of the second plate 208 facing the cathode 32. The felt member 262 forms an oxygen-containing gas channel 56 between the second sandwiching section 214b and the cathode 32. Instead of the felt member 262, for example, a mesh member (electrically conductive fabric such as metal mesh), foamed metal, expanded metal, punching metal, or pressure embossed metal may be used. Exhaust gas channels 70 are provided around the electrolyte electrode assemblies 36 for discharging the fuel gas and the oxygen-containing gas after reaction as an exhaust gas.

Figure 14:
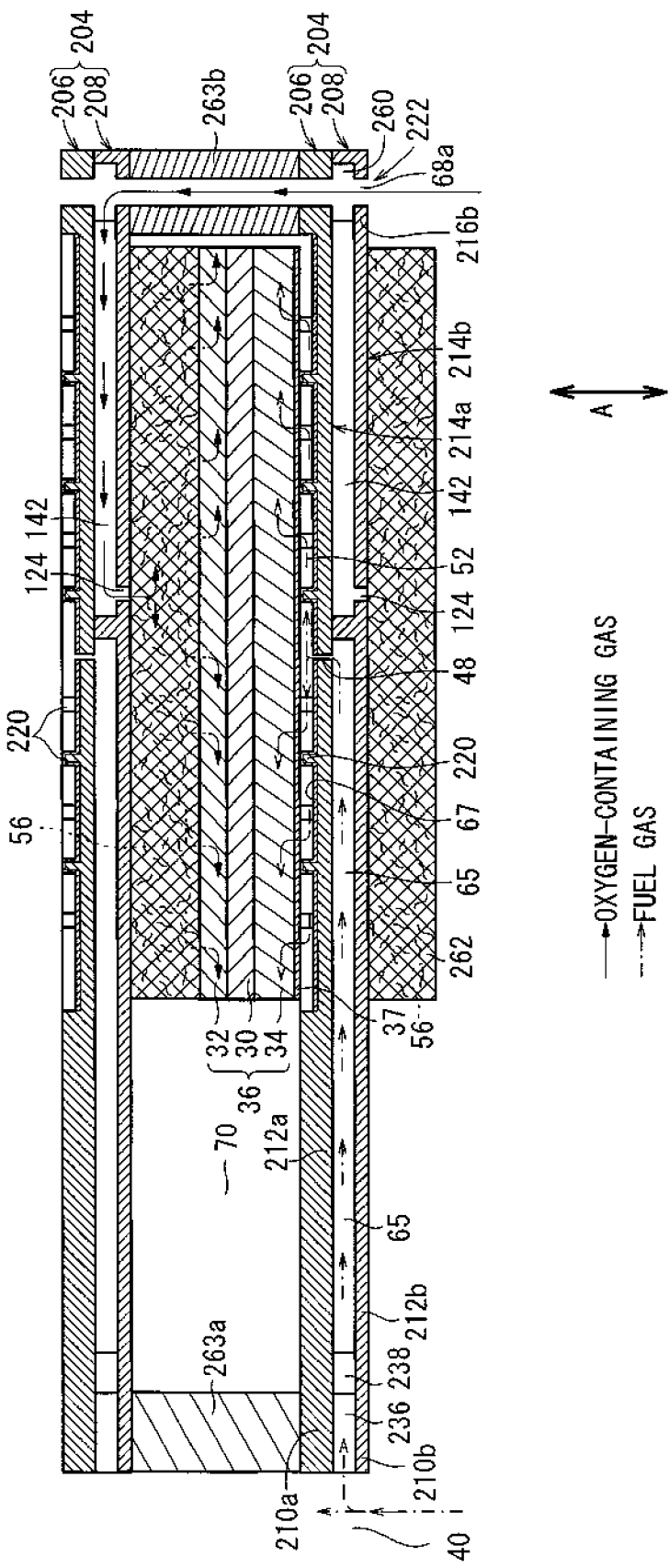
FIG. 14 is a cross sectional view schematically showing operation of the fuel cell.

As shown in FIG. 14, a first insulating seal 263a for sealing the fuel gas supply passage 40 and a second insulating seal 263b for sealing the oxygen-containing gas supply passage 68a are formed between the separators 204. The first insulating seal 263a and the second insulating seal 263b are made of materials such as crustal component material, glass material, and composite material of clay and plastic, for example, since these materials have good sealing performance, and are hard and not collapsed easily. Further, preferably, the second insulating seal 263b is a heat insulating member for preventing diffusion of heat energy.

Operation of the fuel cell 200 will be described below.

As shown in FIGS. 12 and 14, the fuel gas supplied to the fuel gas supply passage 40 flows in the stacking direction indicated by the arrow A, and the fuel gas is supplied from the grooves 236 to the fuel gas supply channels 65 through the circular groove 238 formed in the second plate 208 of the separator 204 of each fuel cell 200 (see FIG. 11). After the fuel gas flows along each fuel gas supply channel 65, the fuel gas flows through the fuel gas inlet 48 formed in the first plate 206 to the fuel gas channel 52.

The fuel gas inlet 48 is provided at substantially the central position of the anode 34 of each electrolyte electrode assembly 36. Thus, the fuel gas is supplied from the fuel gas inlet 48 to the anode 34, and flows along the fuel gas channel 52 from the substantially central region to the outer circumferential region of the anode 34.

The air supplied to the oxygen-containing gas supply passage 68a temporarily fills the filling chamber 260 provided between the first case unit 218a of the first plate 206 and the second case unit 218b of the second plate 208. The filling chamber 260 is connected to the oxygen-containing gas supply channel 142. The oxygen-containing gas moves toward the center of the sandwiching section 214 along each of the oxygen-containing gas supply channels 142.

The oxygen-containing gas inlet 124 is opened to a position near the center of the second sandwiching section 214b. The oxygen-containing gas inlet 124 is positioned at substantially the center of the cathode 32 of the electrolyte electrode assembly 36. Therefore, as shown in FIG. 14, the air is supplied from the oxygen-containing gas inlet 124 to the cathode 32. The oxygen-containing gas flows from the substantially central region to the outer circumferential region of the cathode 32 along the oxygen-containing gas channel 56 formed in the felt member 262.

Thus, in each of the electrolyte electrode assemblies 36, the fuel gas flows from substantially the central region to the outer circumferential region of the anode 34, and the air flows from the substantially central region to the outer circumferential region of the cathode 32 for generating electricity. The fuel gas and the air consumed in the power generation are discharged from the outer circumferential region of each of the electrolyte electrode assemblies 36, and flows through the exhaust gas channels 70.

Figure 15:
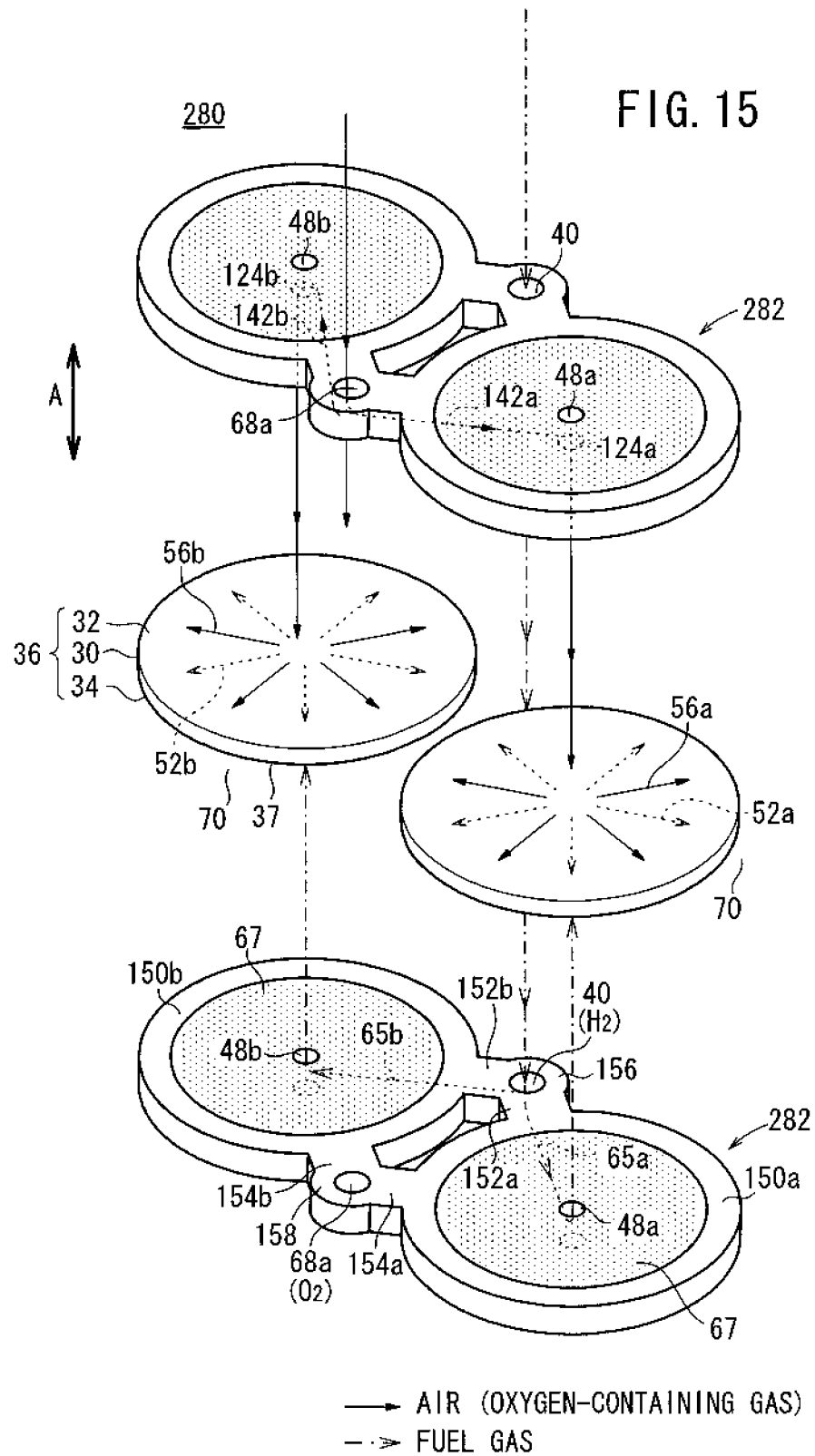
FIG. 15 is an exploded perspective view showing a fuel cell according to a fourth modified example of the first embodiment.

FIG. 15 is an exploded perspective view showing a fuel cell 280 according to a fourth modified embodiment of the present invention. The fuel cell 280 includes a pair of separators 282 sandwiching two electrolyte electrode assemblies 36. As in the case of the separator 104, the separator 282 is made up of three plates (not shown). As shown in FIG. 15, the separator 282 includes a first sandwiching section 150a having a circular shape and a second sandwiching sections 150b having a circular shape for sandwiching the electrolyte electrode assemblies 36, respectively.

The first sandwiching section 150a and the second sandwiching section 150b are connected to a fuel gas supply section 156 through bridges 152a, 152b, and connected to an oxygen-containing gas supply section 158 through bridges 154a, 154b. Fuel gas supply channels 65a, 65b are formed in the bridges 152a, 152b, and oxygen-containing gas supply channels 142a, 142b are formed in the bridges 154a, 154b.

A fuel gas channel 52a and an oxygen-containing gas channel 56a are formed between the electrolyte electrode assembly 36 and the first sandwiching sections 150a sandwiching the electrolyte electrode assembly 36. A fuel gas channel 52b and an oxygen-containing gas channel 56b are formed between the electrolyte electrode assembly 36 and the second sandwiching sections 150b sandwiching the electrolyte electrode assembly 36.

Second protection layers 67 are formed on surfaces of the first sandwiching section 150a and the second sandwiching section 150b facing the anodes 34. The second protection layers 67 tightly contact first protection layers 37 in part on the anodes 34 to form the fuel gas channels 52a, 52b.

In the fourth modified example, the same advantages as in the cases of the first embodiment and the above-described modified examples are obtained. The separators 282 sandwich the two electrolyte electrode assemblies 36. All of the fuel gas supply channels 65a, 65b for supplying the fuel gas to the electrolyte electrode assemblies 36 and the oxygen-containing gas supply channels 142a, 142b for supplying the oxygen-containing gas to the electrolyte electrode assemblies 36 have the same length. In the structure, the fuel gas and the oxygen-containing gas are distributed equally to each of the electrolyte electrode assemblies 36, and the power generation output is increased in each of the electrolyte electrode assemblies 36.

Figure 16:
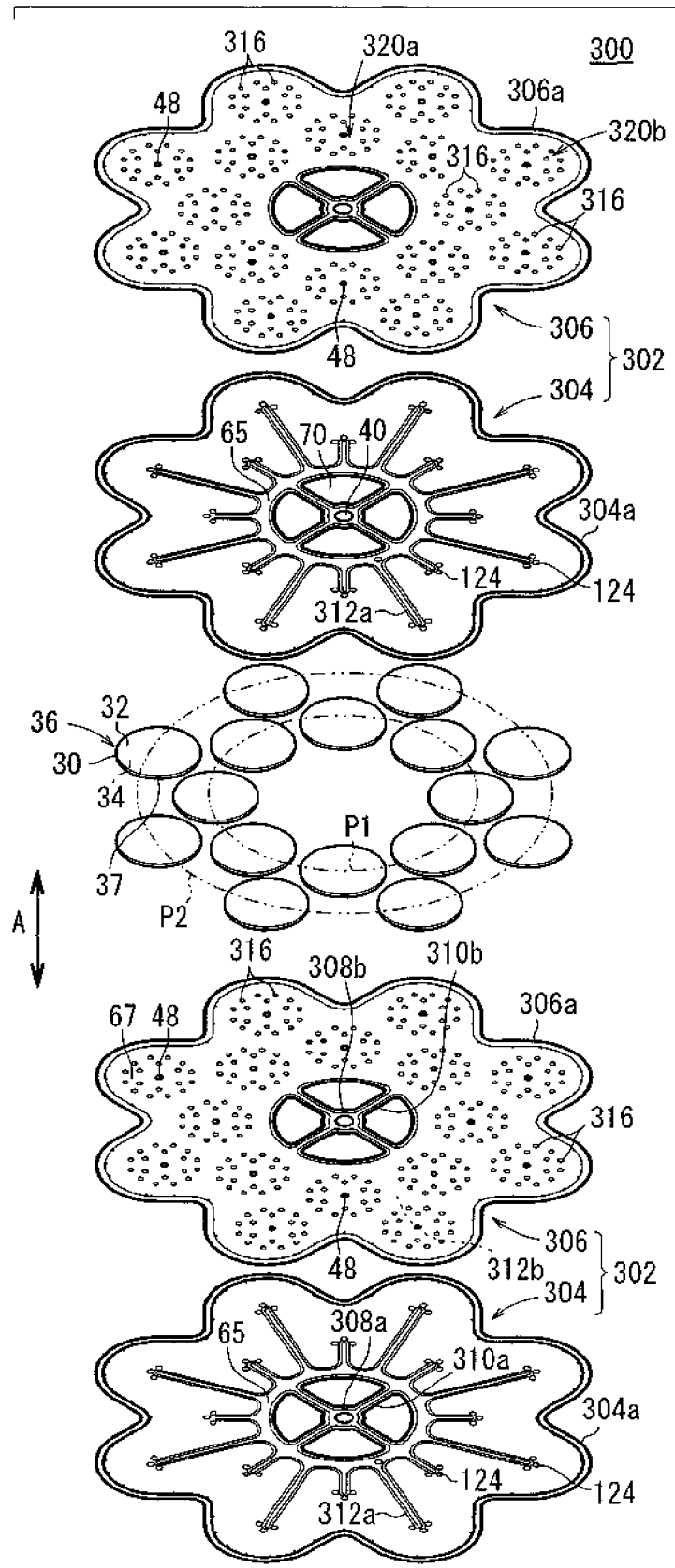
FIG. 16 is an exploded perspective view showing a fuel cell according to a fifth modified example of the first embodiment.

FIG. 16 is an exploded perspective view showing a fuel cell 300 according to a fifth modified example of the first embodiment.

A plurality of (e.g., 16) electrolyte electrode assemblies 36 are interposed between a pair of separators 302 to form the fuel cell 300. The electrolyte electrode assemblies 36 are arranged along a virtual inner circle P1 and a virtual outer circle P2 which are concentric with a fuel gas supply passage 40 extending through the center of the separators 302. The inner circle P1 passes through centers of eight inner electrolyte electrode assemblies 36, and the outer circle P2 passes through centers of eight outer electrolyte electrode assemblies 36.

Figure 17:
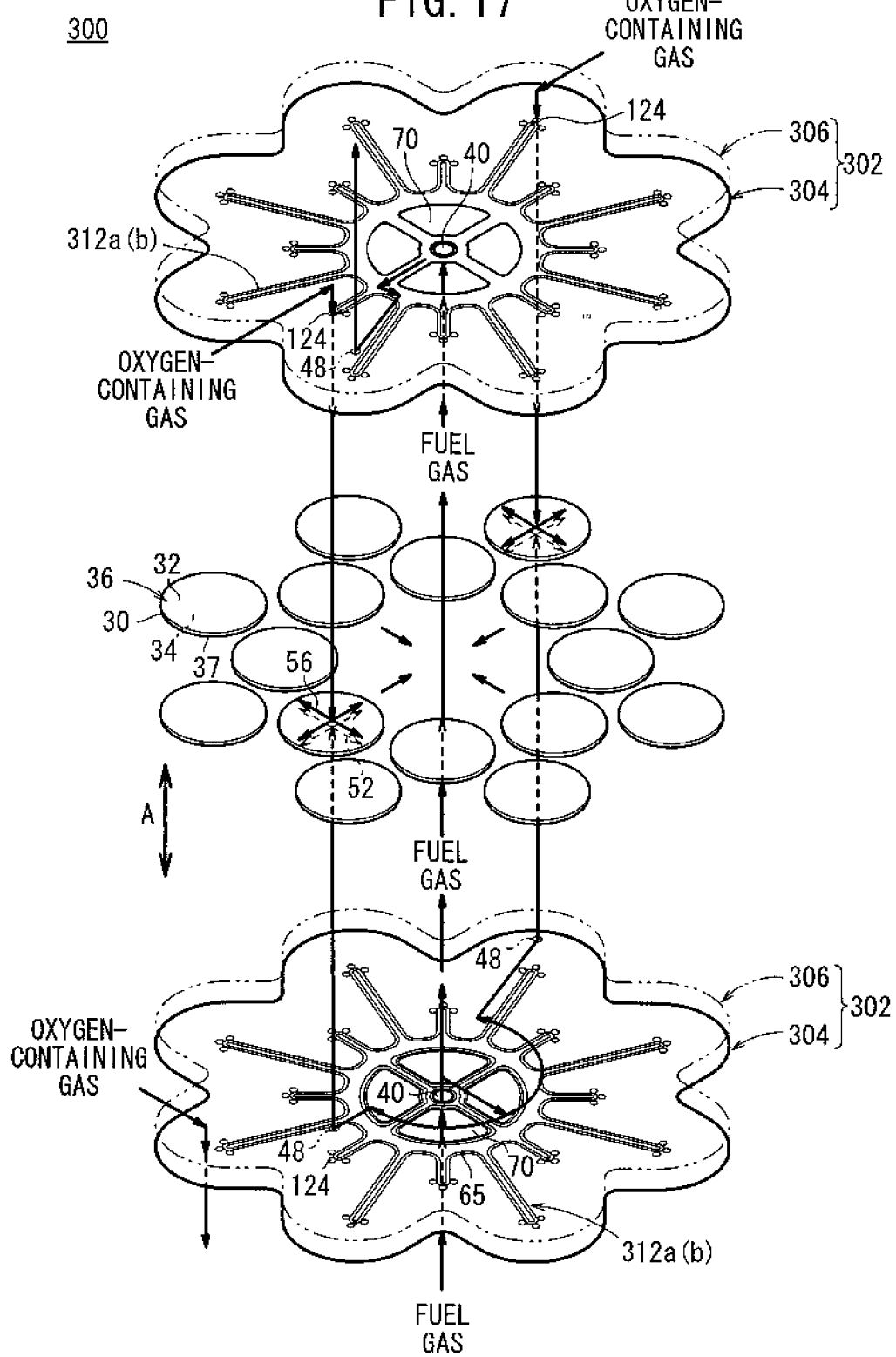
FIG. 17 is a partial exploded perspective view schematically showing gas flows of the fuel cell.

As shown in FIGS. 16 and 17, each of the separators 302 includes a plurality of, e.g., two plates 304, 306 which are stacked together. Each of the plates 304, 306 is formed of stainless alloy, for example. Curved sections 304a, 306a are formed on the plates 304, 306, respectively.

First and second fuel gas supply sections 308a, 308b are provided at the center of the plates 304, 306, and the fuel gas supply passage 40 extends through the first and second fuel gas supply sections 308a, 308b. Four first bridges 310a are connected to the first fuel gas supply section 308a, and four second bridges 310b are connected to the second fuel gas supply section 308b to form four exhaust gas channels 70.

Figure 18:
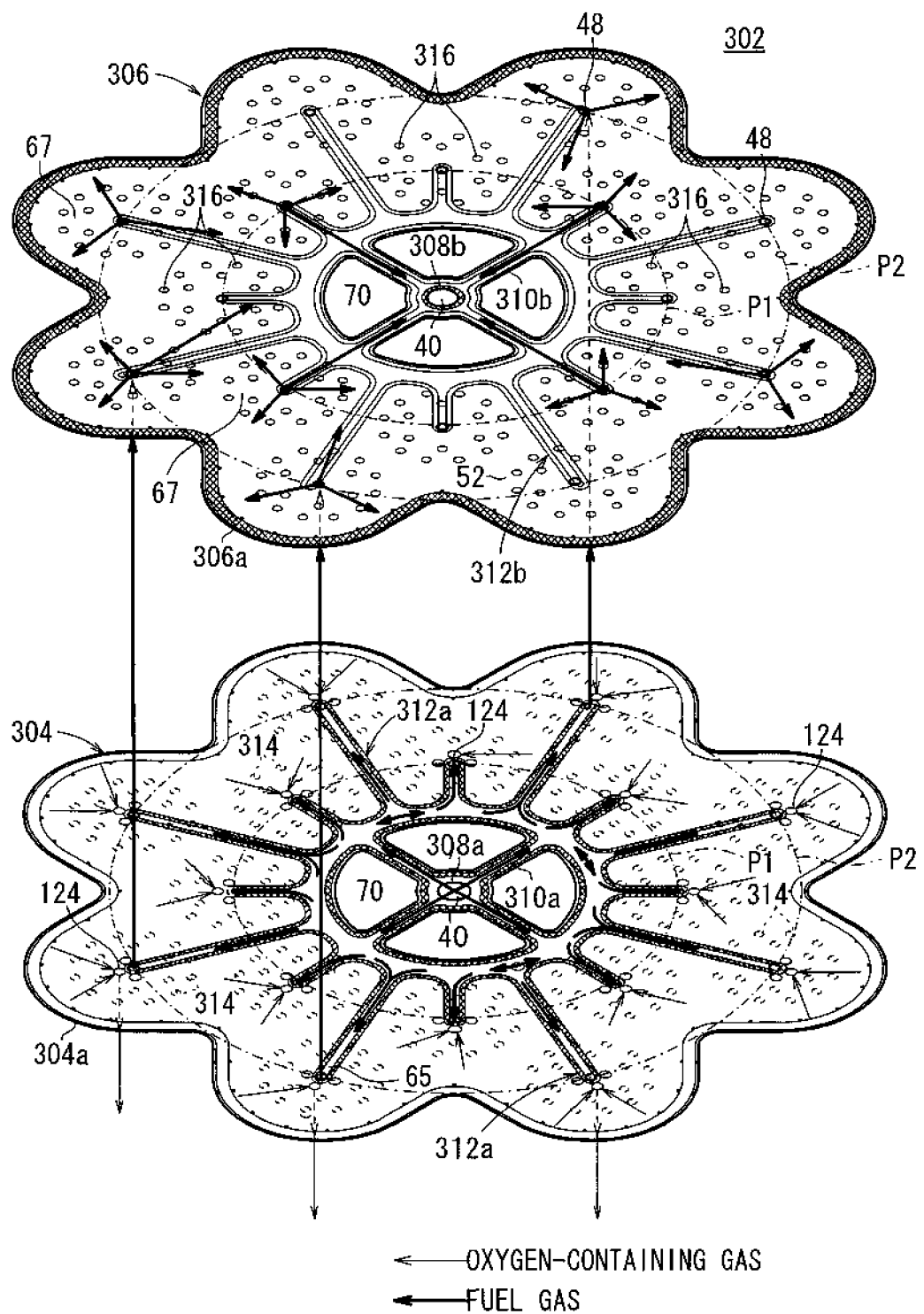
FIG. 18 is an exploded perspective view showing the separator.

As shown in FIGS. 16 and 18, the plates 304, 306 have ridges 312a, 312b extending radially around the fuel gas supply passage 40. A fuel gas supply channel 65 connected to the fuel gas supply passage 40 is formed between the ridges 312a, 312b.

As shown in FIG. 18, front ends of the ridges 312a, 312b are arranged along the inner circle P1 where the inner eight electrolyte electrode assemblies 36 are arranged, and along the outer circle P2 where the outer eight electrolyte electrode assemblies 36 are arranged.

Three oxygen-containing gas inlets 124 pass through the plate 304 at positions around the respective ends of the ridges 312a. First protrusions 314 are provided on the plate 304. The first protrusions 314 expand toward, and contact the electrolyte electrode assemblies 36 arranged along the inner circle P1 and the outer circle P2.

Second protrusions 316 are provided on the plate 306. The second protrusions 316 expand toward, and contact the electrolyte electrode assemblies 36 arranged along the inner circle P1 and the outer circle P2. The dimensions (height and diameter) of the second protrusion 316 are small in comparison with the first protrusion 314 (see FIG. 19). Fuel gas inlets 48 connected to the fuel gas supply channel 65 pass through the plate 306. The fuel gas supply channel 65 connects the fuel gas inlets 48 to the fuel gas channel 52.

The fuel gas supply channel 65 is provided between the ridge 312a of the plate 304 and the ridge 312b of the plate 304. Further, the oxygen-containing gas supply channel 142 is provided between the plate 304 and the plate 306 outside the ridges 312a, 312b. The oxygen-containing gas supply channel 142 is connected to the oxygen-containing gas channel 56 through the oxygen-containing gas inlets 124 formed in the plates 304.

In the separator 302, the first and second fuel gas supply sections 308a, 308b are joined together to form a single fuel gas supply section, and the first and second bridges 310a, 310b are joined together to form a single bridge.

In the surfaces of the separators 302, the eight sandwiching sections 320a sandwiching the eight electrolyte electrode assemblies 36 arranged along the inner circle P1 and the eight sandwiching sections 320b sandwiching the eight electrolyte electrode assemblies 36 arranged along the outer circle P2 are provided. Second protection layers 67 are formed at least on the surface of the separator 302 which has the sandwiching sections 320a, 320b and contacts the anode 34.

Figure 19:
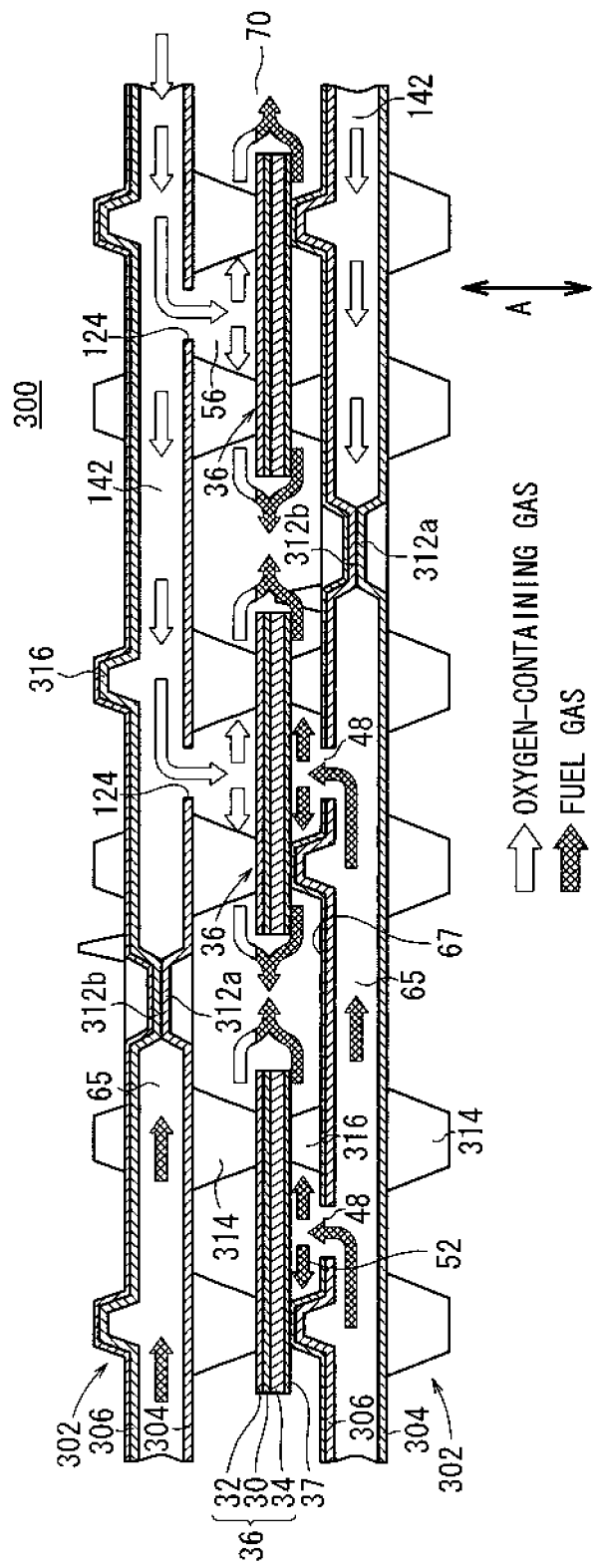
FIG. 19 is a cross sectional view schematically showing operation of the fuel cell.

The electrolyte electrode assemblies 36 are sandwiched between the plate 304 of one of the adjacent separators 302, and the plate 306 of the other of the adjacent separators 302. Specifically, as shown in FIG. 19, the first protrusions 314 and the second protrusions 316 are expanded from the plates 304, 306 on both sides of the electrolyte electrode assemblies 36. The electrolyte electrode assemblies 36 are sandwiched between the first protrusions 314 and the second protrusions 316.

A fuel gas channel 52 is formed between the electrolyte electrode assemblies 36 and the plate 306 of one of the adjacent separators 302. The fuel gas supply channel 65 is connected to the fuel gas channel 52 through the fuel gas inlet 48. An oxygen-containing gas channel 56 is formed between the electrolyte electrode assemblies 36 and the plate 304 of the other of the adjacent separators 302. The oxygen-containing gas supply channel 142 is connected to the oxygen-containing gas channel 56 through the oxygen-containing gas inlets 124.

Operation of the fuel cell 300 will be described.

As shown in FIGS. 17 and 19, the fuel gas flows along the fuel gas supply channel 65 formed between the ridges 312a, 312b, and the fuel gas is supplied into the fuel gas channel 52 through the fuel gas inlets 48. The fuel gas inlets 48 are provided at positions corresponding to the centers of the anodes 34 of the respective electrolyte electrode assemblies 36. In the fuel gas channel 52, the fuel gas flows outwardly from the center of the anode 34 of each of the electrolyte electrode assemblies 36.

The oxygen-containing gas supplied to the oxygen-containing gas supply channel 142 flows into the oxygen-containing gas inlets 56, and flows outwardly from the center of the cathode 32 of each of the electrolyte electrode assemblies 36 (see FIGS. 17 and 19).

Thus, in each of the electrolyte electrode assemblies 36, the fuel gas is supplied outwardly from the center of the anode 34, and the oxygen-containing gas is supplied outwardly from the center of the cathode 32. At this time, oxygen ions flow through the electrolyte 30 toward the anode 34 for generating electricity by electrochemical reactions.

The fuel gas and oxygen-containing gas after consumption in the reaction (exhaust gas) flow toward the outer circumferential region of each of the electrolyte electrode assemblies 36, and then, the fuel gas and the oxygen-containing gas flow into the central portion of the separators 302, and are discharged into the four exhaust gas channels 70 of the exhaust gas manifold. The exhaust gas is discharged from the exhaust gas channels 70 to the outside.

In the fifth modified example, the same advantages as in the cases of the first embodiment and the second to fourth modified examples are obtained. Further, the fuel gas paths from the first and second fuel gas supply sections 308a, 308b around the center of the separators 302 to the eight electrolyte electrode assemblies 36 arranged along the inner circle P1 have the same length, and the fuel gas paths from the first and second fuel gas supply sections 308a, 308b to the eight electrolyte electrode assemblies 36 arranged along the outer circle P2 have the same length. Therefore, the power generation state is uniform in each of the electrolyte electrode assemblies 36, and the desired power generation output is achieved efficiently.

Next, a second embodiment for forming a protection layer on an end surface of the separator facing the anode will be described. In the second embodiment and its modified examples, the constituent elements that are identical to those of the first embodiment are labeled with the same reference numeral, and description thereof will be omitted.

Figure 20:
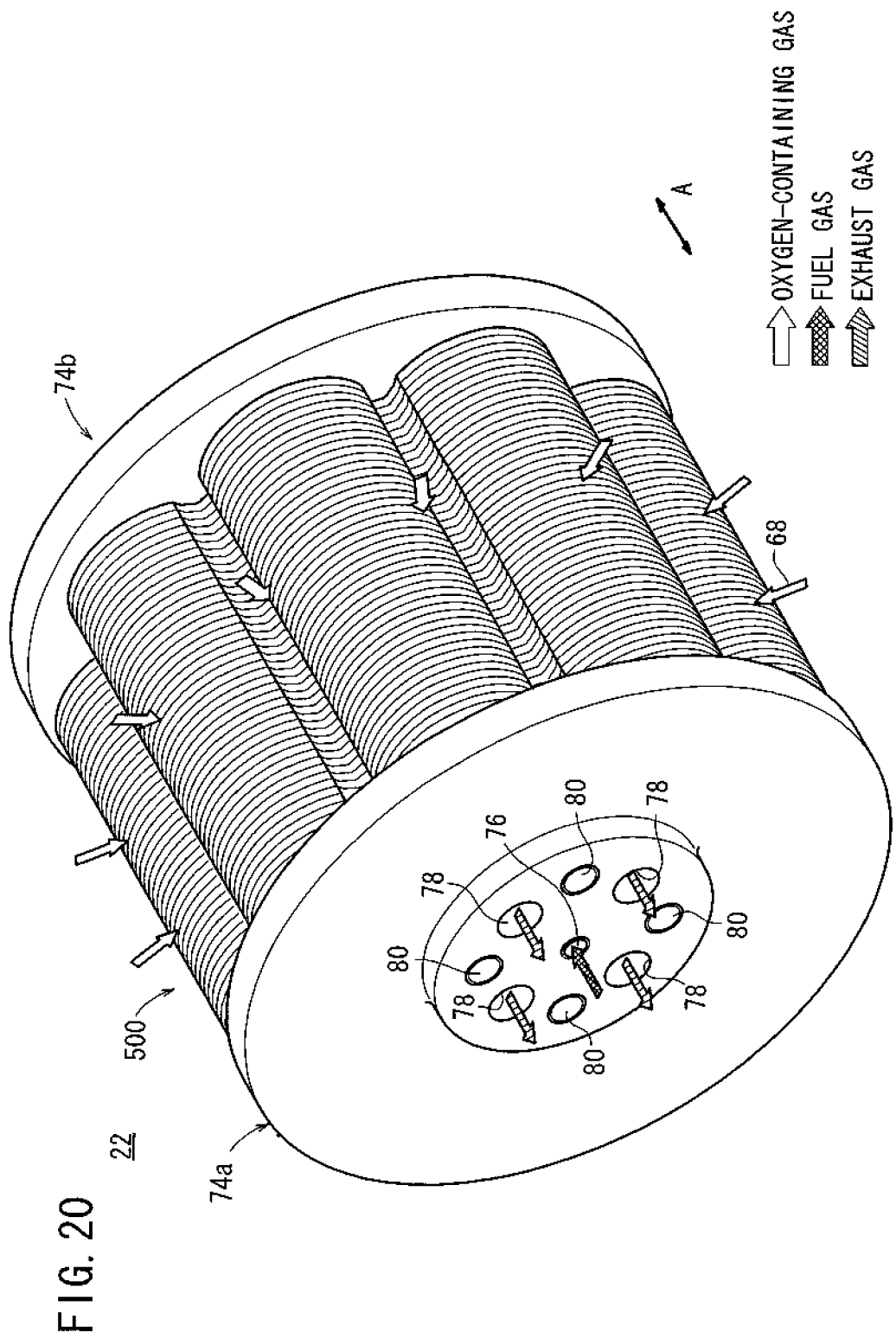
FIG. 20 is a perspective view schematically showing a fuel cell stack formed by stacking a plurality of fuel cells according to a second embodiment of the present invention.
Figure 21:
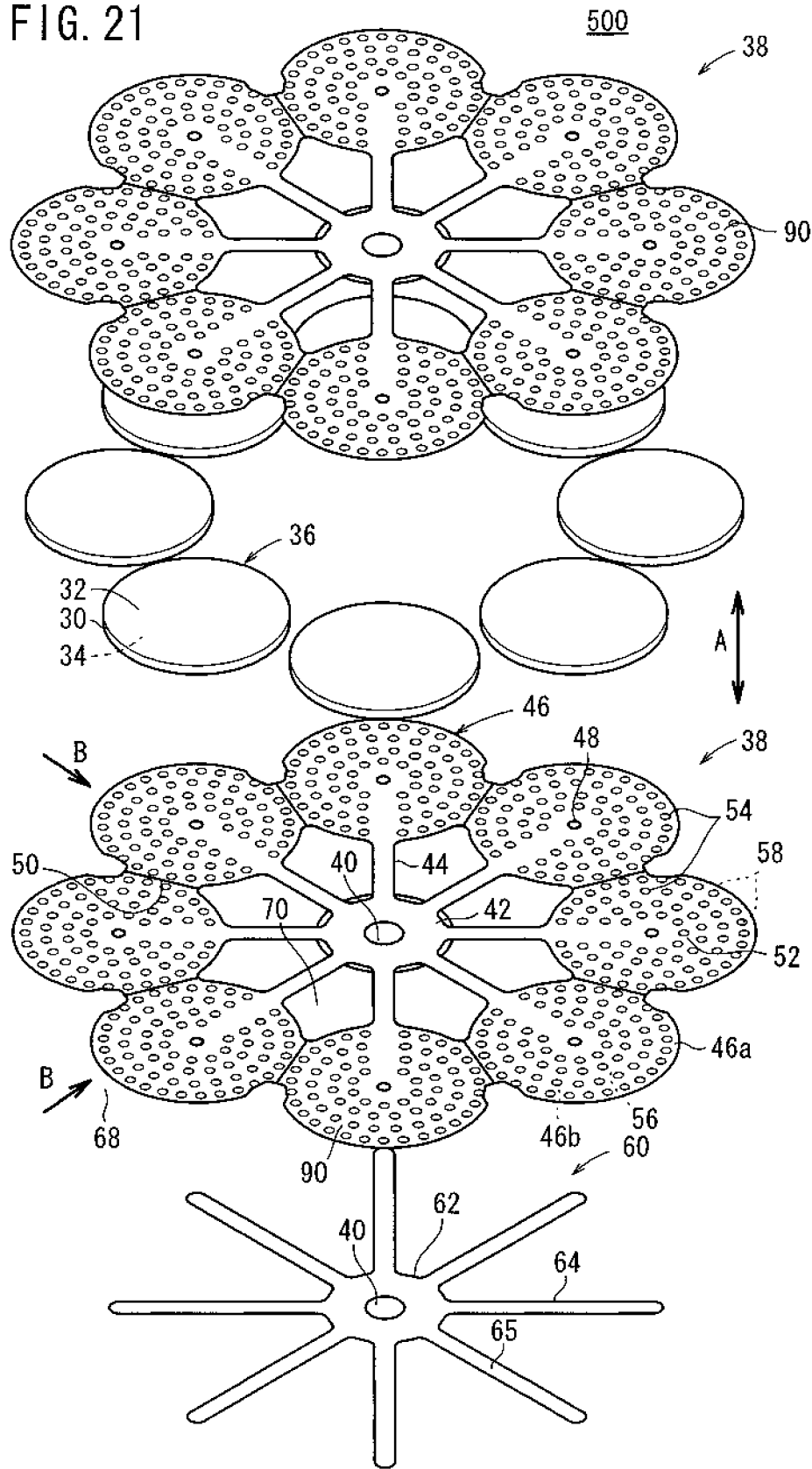
FIG. 21 is an exploded perspective view showing the fuel cell.
Figure 22:
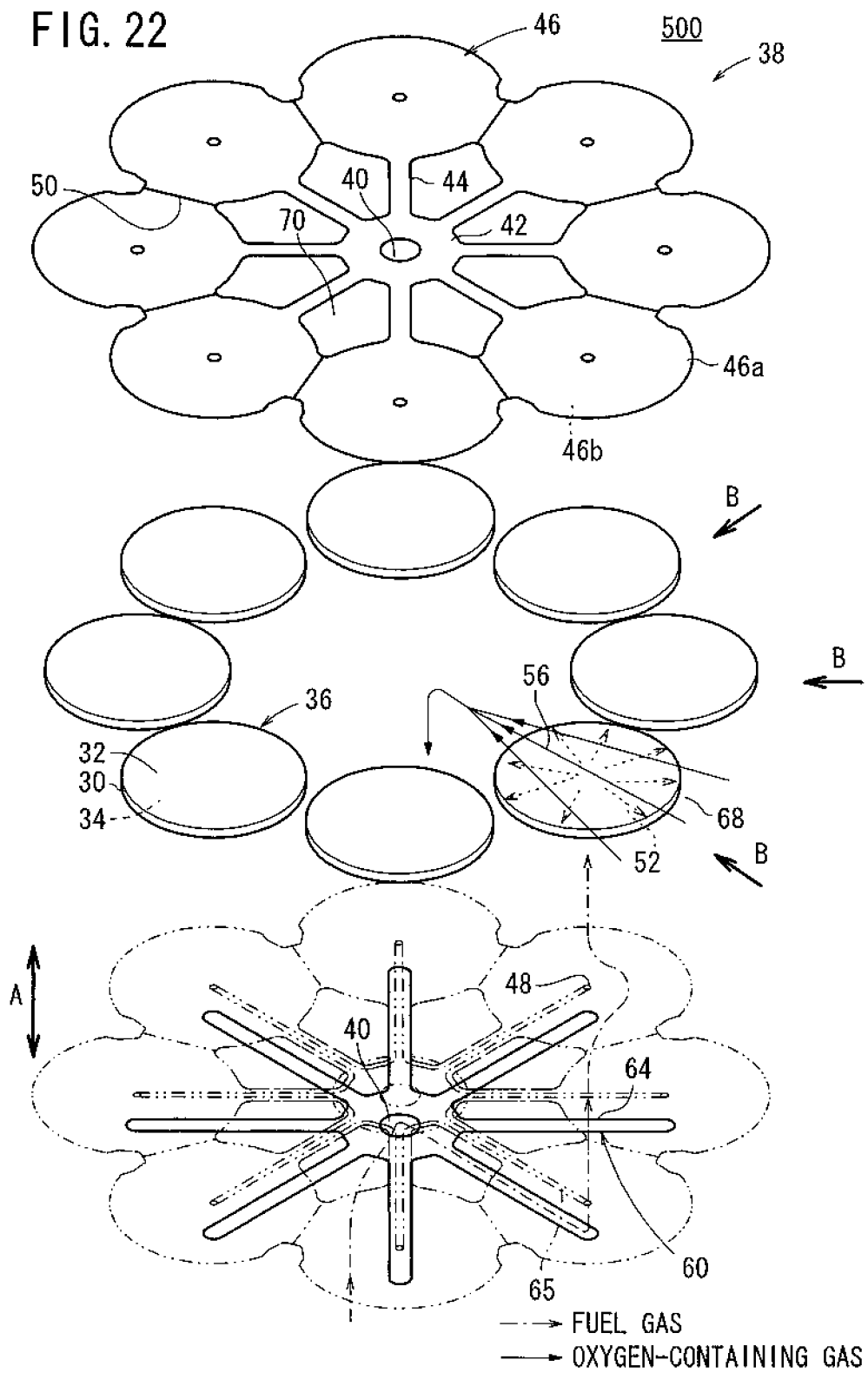
FIG. 22 is a partial exploded perspective view showing gas flows of the fuel cell.

FIG. 20 is a perspective view schematically showing a fuel cell stack 22 formed by stacking a plurality of fuel cells 500 according to the second embodiment of the present invention. FIG. 21 is an exploded perspective view showing the fuel cell 500. As in the case of the fuel cells 20 according to the first embodiment shown in FIG. 1, the fuel cells 500 are stacked in the direction indicated by the arrow A to form the fuel cell stack 22 (see FIG. 20). It is a matter of course that the fuel cell 500 is also used in various applications, including stationary and mobile applications, such as in-vehicle applications.

As shown in FIGS. 21 to 24, the fuel cell 500 according to the second embodiment has the same structure as the fuel cell 20 according to the first embodiment. That is, the fuel cell 500 includes electrolyte electrode assemblies 36, and each of the electrolyte electrode assemblies 36 includes a cathode 32, an anode 34, and an electrolyte 30 interposed between the cathode 32 and the anode 34. For example, the electrolyte 30 is made of ion-conductive solid oxide such as stabilized zirconia. Also in the second embodiment, the electrolyte electrode assembly 36 has a circular disk shape.

For example, the anode 34 is made of Ni—Zr cermet material. As shown in FIG. 4, the thickness of the anode 34 in the stacking direction indicated by the arrow A is larger than the thickness of the cathode 32. The electrolyte electrode assembly 36 in the second embodiment is a support membrane type electrolyte electrode assembly formed by using the anode 34 as a base plate, stacking the electrolyte 30 on the anode 34, and stacking the cathode 32 on the electrolyte 30.

The electrolyte electrode assembly 36 is sandwiched between a pair of separators 38 to form the fuel cell 500.

In the second embodiment, the separator 38 is made of Fe alloy containing 12 to 30 wt % of Cr. For example, the separator 38 is a metal plate made of any various stainless steels such as SUS304, SUS310S, SUS316, SUS316L, SUS317, SUS430, and SUS434.

Figure 23:
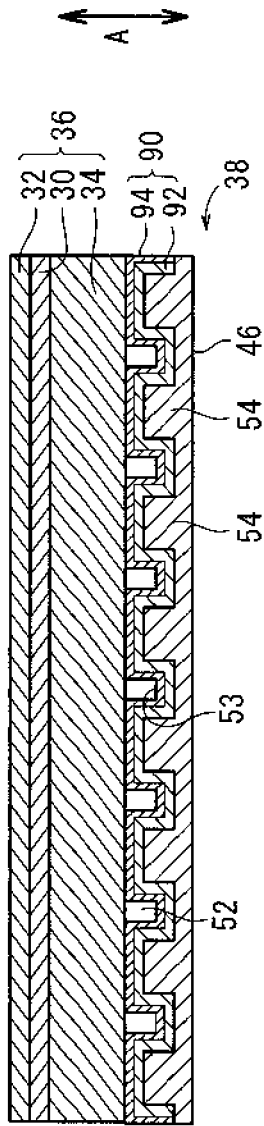
FIG. 23 is a cross sectional view showing an electrolyte electrode assembly and a separator of the fuel cell.
Figure 24:
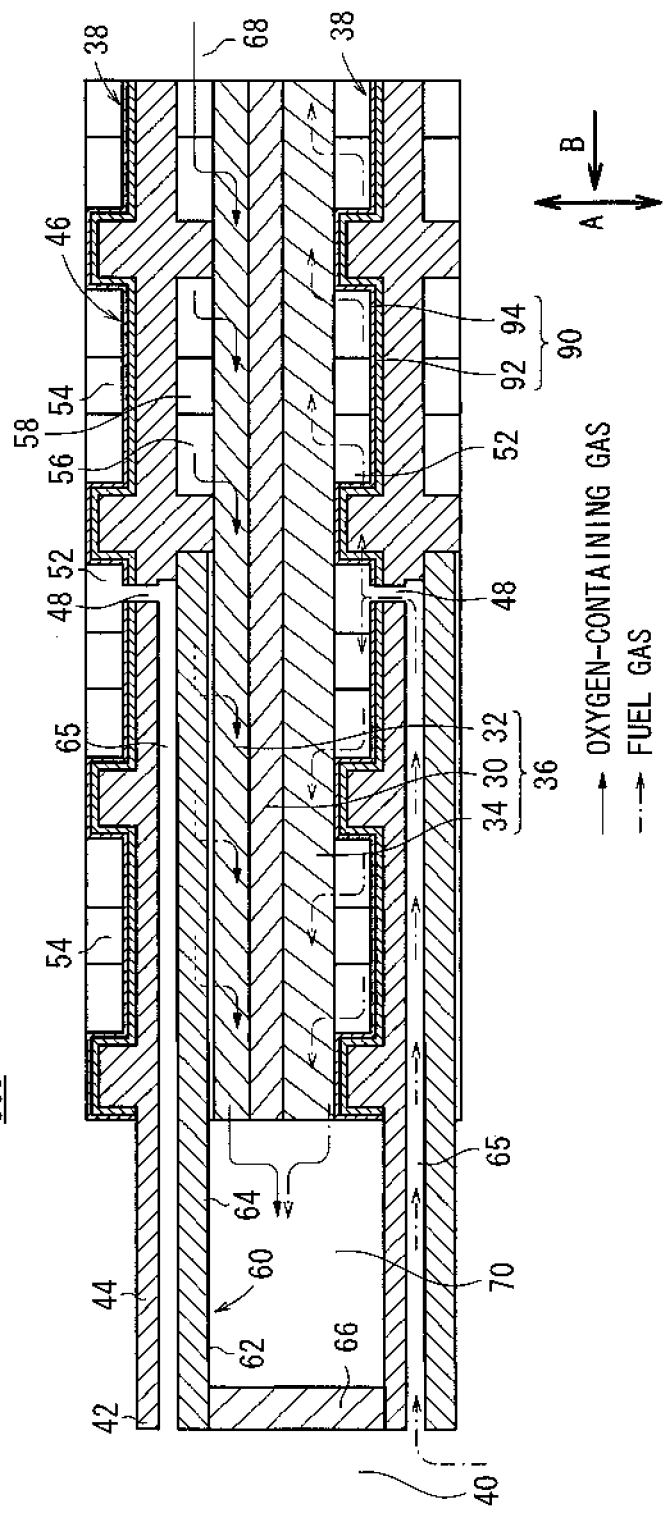
FIG. 24 is a cross sectional view schematically showing operation of the fuel cell.

As shown in FIGS. 23 and 24, a protection layer 90 is formed on an end surface of the separator 38 facing the anode 34. The protection layer 90 prevents the separator 38 from being exposed to the exhaust gas.

As shown in FIG. 23, the protection layer 90 has dual layer structure. Specifically, the protection layer 90 includes a mixture layer 92 containing Ni and Fe, and a chromium rich layer 94 chiefly containing Cr. The mixture layer 92 is provided on the separator 38 side, and the chromium rich layer 94 is provided on the anode 34 side.

Figure 25:
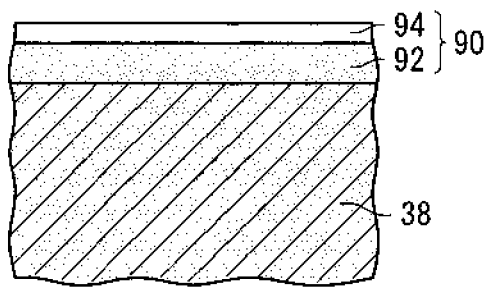
FIG. 25 is a profile in a depth direction showing concentration distribution of Ni in a protection layer and a separator.
Figure 26:
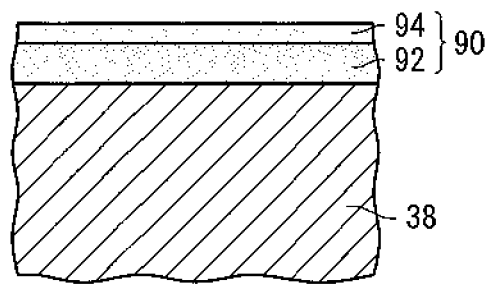
FIG. 26 is a profile in the depth direction showing concentration distribution of Fe in the protection layer and the separator.

The mixture layer 92 chiefly contains Ni, Fe, and oxides and/or composite oxides of Ni and Fe. As can be seen from profiles in the depth direction showing concentration distribution of Ni and Fe in FIGS. 25 and 26, the amount of Ni near the anode 34 is large, and the amount of Ni is decreased gradually from the anode 34 side to the separator 38 side. That is, if the amount of one of Fe and Ni becomes large, the amount of the other of Fe and Ni becomes small comparatively.

The chromium rich layer 94 on the mixture layer 92 chiefly contains Cr and its oxides (in particular, $Cr_2O_3$). Stated otherwise, Cr and its oxides as main components of the chromium rich layer 94 are produced using the element Cr as contained in the separator 38 as a source.

Figure 27:
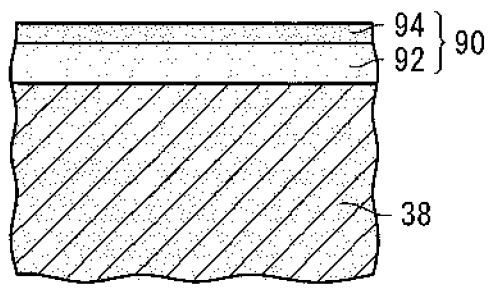
FIG. 27 is a profile in the depth direction showing concentration distribution of Cr in the protection layer and the separator.

FIG. 27 is a profile in the depth direction showing concentration distribution of Cr. As can be seen from FIG. 27, in the chromium rich layer 94, the concentration of Cr is the largest, and the main component of the chromium rich layer 94 is Cr. It should be noted that Cr in the separator 38 is an element of material (e.g., stainless steel) of the separator 38.

Preferably, the protection layer 90 having the above structure has a thickness in a range of 1 to 100 µm. If the thickness of the protection layer 90 is less than 1 µm, it may not be possible to effectively protect the separator 38 from oxidation or water vapor oxidation. If the thickness of the protection layer 90 is more than 100 µm, the protection layer 90 is peeled off from the separator 38 easily, and the resistance of the protection layer 90 becomes large. More preferably, the thickness of the protection layer 90 is in a range of 1 to 75 µm.

As long as the chromium rich layer 94 is provided, the thickness of the chromium rich layer 94 is not limited specially. That is, for example, the chromium rich layer 94 may be very thin having only a thickness of several nanometers. Further, it is sufficient that the chromium rich layer 94 has a thickness of 5 μm at most. Stated otherwise, preferably, the thickness of the chromium rich layer 94 is more than 0 and 5 μm or less.

When the separator 38 contacts the anode 34 under pressure through the protection layer 90, a space 53 as a fuel gas channel 52 for supplying a fuel gas to the anode 34 is formed (see FIG. 23).

As shown in FIG. 24, an insulating seal 66 for sealing the fuel gas supply passage 40 is provided in each space between the separators 38. In the fuel cell 500, an oxygen-containing gas supply channel 68 for supplying the oxygen-containing gas in the stacking direction indicated by the arrow A is formed around the sandwiching sections 46, and exhaust gas channels 70 for discharging the consumed fuel gas and oxygen-containing gas are formed in spaces around the fuel gas supply section 42.

The fuel cell 500 may be produced in the following manner.

Iron alloy containing 12% to 30% by weight of Cr, preferably, stainless steel noted above is selected as raw material to fabricate the separator 38, e.g., by press working.

Then, the protection layer 90 is provided on at least an end surface of the sandwiching section 46 of the separator 38 facing the anode 34 (end surface where the protrusions 54 are provided). As necessary, masking may be applied to the separator 38. For example, this masking is carried out using a tape or paraffin.

Next, a degreasing process and a passivation film removing process are applied to the separator 38 using xylene or the like (combination of several acid and alkali chemicals may be used). Thus, nickel electroplating layer of a thin film is applied to the surface of the activated surface of the separator 38 (nickel strike plating). The electroplating layer is provided to ensure that a plating layer in the subsequent process is tightly formed on the separator 38 (to improve adhesion of the plating layer). Preferably, the thickness of the electroplating layer is 1 μm or less.

After the nickel electroplating layer is formed on the separator 38, nickel electroless plating layer is continuously formed on the separator 38. The nickel electroless plating is conducted under the conditions such that the nickel electroless plating layer (nickel film) has a thickness in a range of 1 to 100 μm. Preferably, the nickel film has a thickness of 10 μm or less. More preferably, the nickel film layer has a thickness of 5 μm or less.

At this time, elements chiefly added to the nickel bath used for plating are P (phosphorous), W (tungsten), B (boron), Co (cobalt) or the like. The nickel concentration in the nickel bath is 80 wt % or more. Therefore, the nickel film is not made of pure nickel. The composition ratios of the nickel film are represented by, e.g., 94 wt % Ni-6 wt % (W, B), where 6 wt % (W, B) means that the total amount of W and B is 6 wt %.

Though in general, at the time of applying nickel plating to the separator 38, an intermediate layer of 90 wt % Ni-10 wt % P or the like is formed, and the nickel film is provided on the intermediate layer, in the second embodiment, without forming the intermediate layer, the nickel film is directly stacked on the separator 38.

Further, after the plating process is applied to the separator 38, the separator 38 is washed using water. Then, a firing (baking) process for one hour, at the temperature of 120° C. to 150° C. is applied to the separator 38. This firing process is performed to improve adhesion of the nickel film to the electroplating layer. After the firing process, a composite tissue of amorphous and crystal is obtained.

The separator 38 may be heated at this time. Since heating is intended to prevent deformation or the like of the separator 38, preferably, the separator 38 is heated at a temperature in a range of 550° C. to 850° C., and more preferably, the separator 38 is heated at a temperature in a range of 650° C. to 800° C.

By heating the separator 38, Fe and Cr as elements of the separator 38 (Fe alloy containing Cr) are diffused toward the nickel film. Fe slightly enters the nickel film, to move Ni out of the layer. Thus, the mixture layer 92 where concentration of Ni is increased in a direction away from the separator 38, and concentration of Fe is increased in a direction toward the separator 38 is produced.

Cr passes through the nickel film or the mixture layer 92. As a result, the chromium rich layer 94 is formed on the nickel film or the mixture layer 92. The thickness of the chromium rich layer 94 is more than 0 and 5 μm or less. For example, the thickness of the chromium rich layer 94 is several nanometers to 2 μm.

By the above procedure, the protection layer 90 including the mixture layer 92 and the chromium rich layer 94 is obtained. Fe and Ni in the mixture layer 92 and Cr in the chromium rich layer 94 combine with oxygen to produce oxides eventually.

Then, the electrolyte electrode assembly 36 is placed on each of the sandwiching sections 46 of the separator 38. Thus, the anode 34 and the protection layer 90 formed on the sandwiching section 46 to cover the protrusions 54 tightly contact each other in part, and the space 53 between the anode 34 and the protection layer 90 forms a fuel gas channel 52 (see FIG. 23).

Further, another separator 38 is placed on the cathode 32 of the electrolyte electrode assembly 36 to form the fuel cell 500.

The fuel cell 500 may be assembled without heating the separator 38. In this case, the fuel cell 500 is heated after the separator 38 is assembled to form the fuel cell 500. Also in this case, preferably, the fuel cell 500 is heated at a temperature in a range of 550° C. to 850° C., and more preferably, the fuel cell 500 is heated at a temperature in a range of 650° C. to 800° C.

Next, operation of the fuel cell stack 22 including the fuel cell 500 as produced above will be described below.

Firstly, the temperature of the fuel cell stack 22 is raised to a predetermined operating temperature before starting power generation operation.

The chromium rich layer 94 as formed above is not dense. Therefore, at the time of heating the fuel cell 500, or at the time of raising the temperature of the fuel cell stack 22 for starting operation of the fuel cell stack 22, Ni in the mixture layer 92 is diffused toward the anode 34 through the chromium rich layer 94. In the case where the anode 34 is made of Ni—Zr cermet material, Ni is also present in the anode 34. Ni from the chromium rich layer 94 and Ni in the anode 34 are blended each other. As a result, the anode 34 and the separator 38 further tightly contact each other.

Expansion and contraction between the anode 34 and the separator 38 are suppressed by tight contact between the anode 34 and the separator 38. That is, heat expansion (or heat contraction) of the anode 34 is suppressed by pressure applied from the separator 38, and heat expansion (or heat contraction) of the separator 38 is suppressed by pressure applied from the anode 34. In the structure, it is possible to prevent the damages of the electrolyte electrode assembly 36 due to thermal deformation.

Before the fuel cell stack 22 reaches a predetermined temperature, as shown in FIG. 20, a fuel gas such as a hydrogen-containing gas is supplied to a hole 76 of the end plate 74*a*, and an oxygen-containing gas (hereinafter also referred to as the air) is supplied to the oxygen-containing gas supply channel 68 provided around the fuel cell 500.

As shown in FIG. 24, the fuel gas from the fuel gas supply section 42 flows along the fuel gas supply channel 65 in the bridges 44, and flows into the fuel gas channels 52 formed by the protrusions 54 from the fuel gas inlets 48 of the sandwiching sections 46. The fuel gas inlets 48 are formed at substantially the central positions of the anodes 34 of the electrolyte electrode assemblies 36. Thus, in each of the electrolyte electrode assemblies 36, the fuel gas is supplied from the fuel gas inlet 48 to substantially the central position of the anode 34, and flows outwardly toward the outer circumferential end of the anode 34 along the fuel gas channel 52.

The oxygen-containing gas flows into a space between the outer circumferential edge of the electrolyte electrode assembly 36 and the outer circumferential edge of the sandwiching section 46 in the direction indicated by the arrow B, and flows toward the oxygen-containing gas channel 56. In the oxygen-containing gas channel 56, the oxygen-containing gas flows from the outer circumferential edge (outer circumferential region of the separator 38) to the other outer circumferential edge (central region of the separator 38), i.e., from one end to the other end of the cathode 32 of the electrolyte electrode assembly 36.

Thus, in the electrolyte electrode assembly 36, the fuel gas flows from the center to the outer circumferential end on the electrode surface of the anode 34, and the oxygen-containing gas flows in one direction indicated by the arrow B on the electrode surface of the cathode 32.

When the fuel cell stack 22 is warmed up to the predetermined temperature, a large amount of oxide ions actively flows through the electrolyte 30 toward the anode 34 for generating electricity by electrochemical reactions. As described above, since the separator 38 and the anode 34 tightly contact each other, and the contact resistance between the separator 38 and the anode 34 is small, electricity is collected efficiently during power generation.

The exhaust gas discharged from the outer circumferential end of each of the electrolyte electrode assembly 36 flows through the exhaust gas channel 70 in the stacking direction, and the exhaust gas is discharged from the fuel cell stack 22.

At this time, normally, the oxygen-containing gas, i.e., the air is supplied to the electrolyte electrode assemblies 36 excessively. Before, after, and during combustion of the air and the unconsumed fuel gas, the oxygen remaining in the air is present outside the electrolyte electrode assemblies 36. The air containing the remaining oxygen flows around from the cathode 32 to the anode 34. Further, at the anode 34, water vapor is produced in the power generation reaction. After power generation reaction, the fuel gas still contains some fuel which has not been consumed in the reaction. In the presence of the hot exhaust containing the oxygen, the water vapor, and the fuel gas after power generation reaction, outer ends of the electrolyte electrode assembly 36 and the separator 38 are in a severe environment where oxidation, water vapor oxidation, and reduction occur concurrently. The electrolyte electrode assembly 36, and in particular, the outer circumferential end of the separator 38 are exposed to the oxidant atmosphere, water vapor oxidant atmosphere and reductive atmosphere. Oxidation and water vapor oxidation occur easily, and reduction reaction may occur concurrently at the outer circumferential end of the separator 38.

In the second embodiment, as shown in FIGS. 23 and 24, since the protection layer 90 is formed on the separator 38, even if the oxygen-containing gas in the exhaust gas flows around the outer circumference of the electrolyte electrode assembly 36, and flows into the outer circumferences of the anode 34 and the separator 38, and even in the presence of the water vapor, oxidation or water vapor oxidation does not occur at the separator 38.

Thus, improvement in the anti-oxidation performance is achieved, and sediment is not generated or scattered due to oxidation or water vapor oxidation. Accordingly, the fuel gas flows smoothly along the fuel gas channel 52. In particular, since the chromium rich layer 94 chiefly containing Cr covers the surface of the separator 38, Fe oxides are not produced in the surface of the separator 38. Thus, the contact resistance between the anode 34 and the separator 38 is not increased. Further, increase in pressure loss of the fuel gas due to an Fe oxide is prevented.

Further, since the thickness of the chromium rich layer 94 is extremely small, the contact resistance does not increase significantly due to the presence of the chromium rich layer 94.

Figure 28:
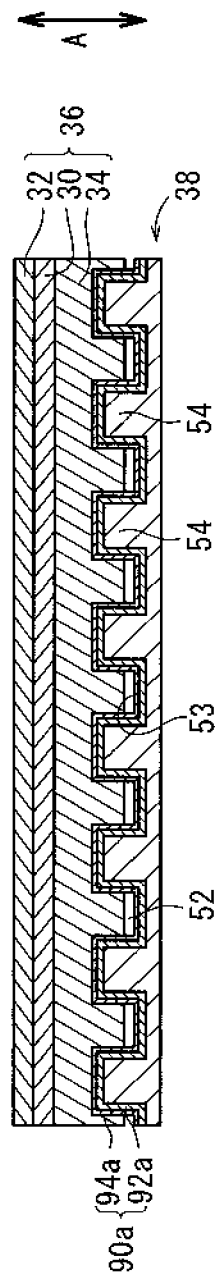
FIG. 28 is a cross sectional view schematically showing a fuel cell according to a first modified example of the second embodiment.

FIG. 28 is a cross sectional view schematically showing a first modified example of the second embodiment. In the first modified example, a protection layer 90a is formed instead of the protection layer 90 of the fuel cell 500 according to the second embodiment.

Specifically, in the first modified example, the first protection layer 90a is formed on the surface of the separator 38 facing the anode 34. At the time of warming up the system (at the initial stage of operation), the protrusions 54 of the separator 38 penetrate into the anode 34.

Thus, in the first modified example, since the protrusions 54 of the separator 38 penetrate into, and contact the anode 34 tightly, relative movement between the protrusions 54 and the anode 34 is suppressed. Accordingly, it becomes possible to reliably prevent damages or the like in the electrolyte electrode assembly 36 advantageously due to deformation by heat.

As in the case of the first protection layer 37 and the second protection layer 67 in the first embodiment, it is difficult to form the protection layers 90, 90a as a thin film having the thickness of less than 1 μm. If the film thickness is too small, the desired effect of suppressing oxidation cannot be obtained. Therefore, preferably, the film thickness is 1 μm or more.

If the film thickness is too large, the electrical resistance and the contact resistance become large. Therefore, losses in electrical conductance and electrical collection become large. Further, the coating layer is peeled off easily at the interface due to the difference between the heat expansion coefficients. It becomes difficult to reliably form the film while preventing formation of pin holes or the like, and the cost becomes high disadvantageously. In particular, it is preferable that the protection layers, 90, 90a have a thickness of 100 μm or less.

Figure 29:
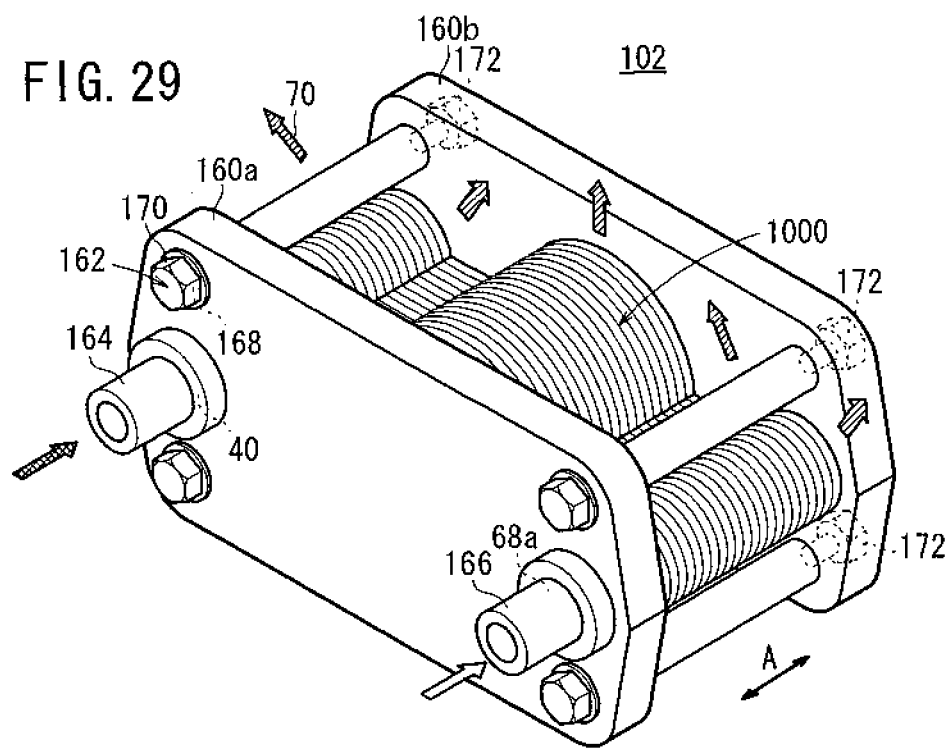
FIG. 29 is a perspective view schematically showing a fuel cell stack formed by stacking a plurality of fuel cells according to a second modified example of the second embodiment.
Figure 30:
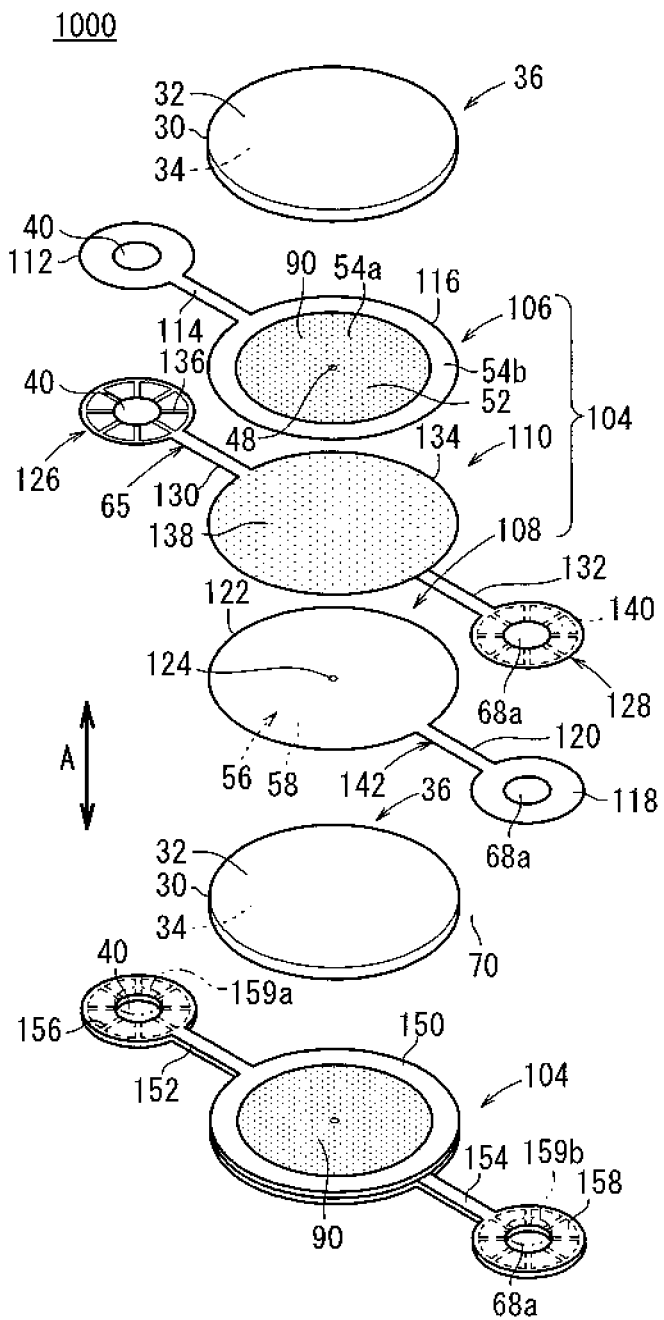
FIG. 30 is an exploded perspective view showing the fuel cell.

FIG. 29 is a perspective view schematically showing a fuel cell stack 102 formed by stacking a plurality of fuel cells 1000 according to a second modified example of the second embodiment in the direction indicated by the arrow A. FIG. 30 is an exploded perspective view showing the fuel cell 1000.

As can be seen from FIG. 30, the fuel cell 1000 is produced by modifying the fuel cell 100 according to the second modified example of the first embodiment by replacing the first protection layer 37 and the second protection layer 67 with the protection layer 90. That is, in this case, in the first plate 106 of the separator 104, the protection layer 90 is formed on a surface of the first sandwiching section 116 facing the anode 34 to cover the protrusions 54a and the substantially ring shaped protrusions 54b.

Figure 31:
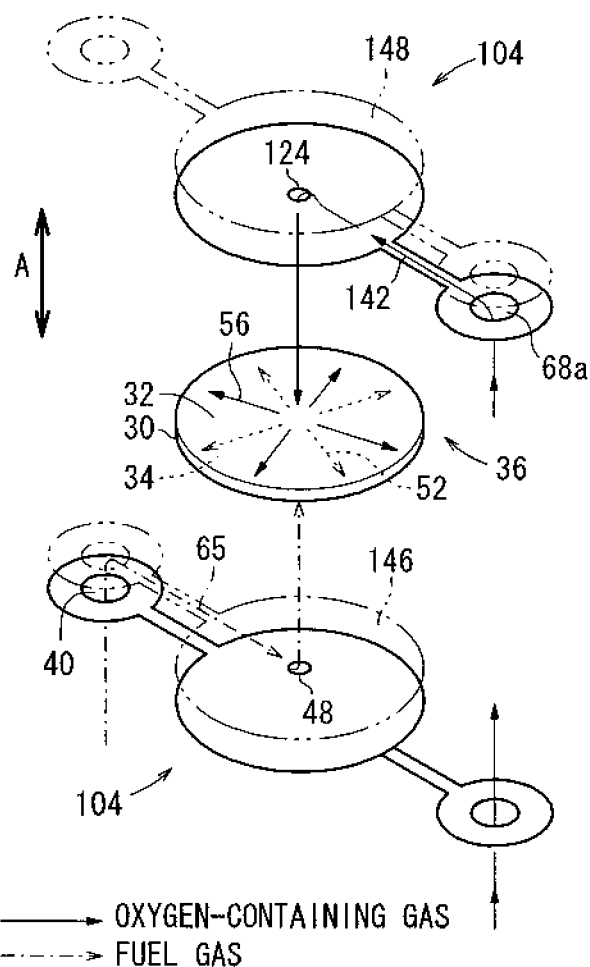
FIG. 31 is a partial exploded perspective view showing gas flows of the fuel cell.
Figure 32:
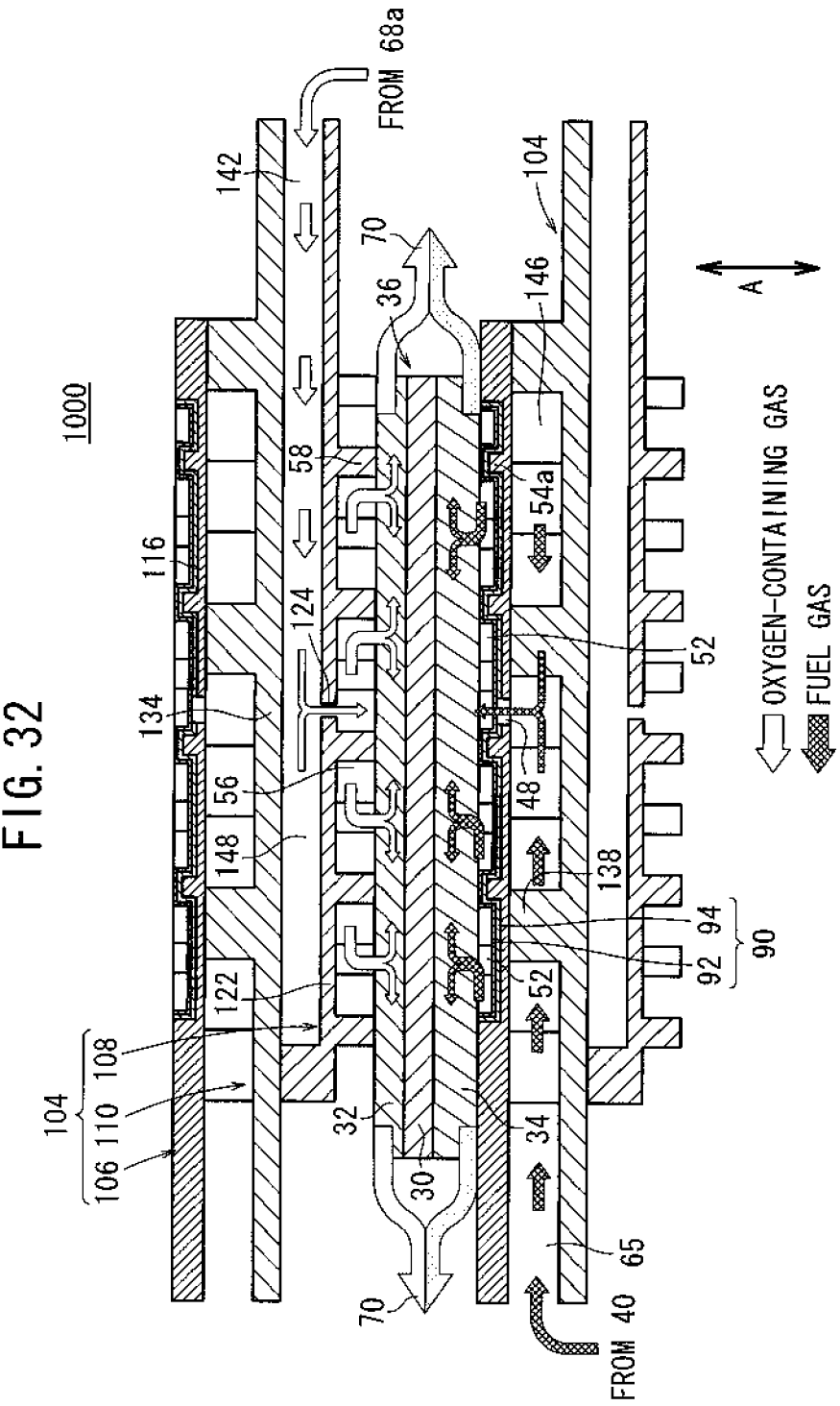
FIG. 32 is a cross sectional view showing an electrolyte electrode assembly and a separator of the fuel cell.

The fuel cell 1000 having the above structure is operated in the same manner as the fuel cell 100. That is, as shown in FIGS. 31 and 32, the fuel gas supplied to the fuel gas supply passage 40 flows in the stacking direction indicated by the arrow A, and the fuel gas is supplied to the fuel gas supply channel 65 in the separator 104 of each fuel cell 100. The fuel gas flows along the fuel gas supply channel 65 into the fuel gas pressure chamber 146 formed between the first and third sandwiching sections 116, 134. The fuel gas moves between the protrusions 138, and flows into the fuel gas inlet 48 formed at the center of the first sandwiching section 116.

The fuel gas inlet 48 is provided at a position corresponding to the central position of the anode 34 in each of the electrolyte electrode assemblies 36. Therefore, the fuel gas from the fuel gas inlet 48 is supplied to the fuel gas channel 52, and flows from the central region of the anode 34 toward the outer circumferential region of the anode 34.

The oxygen-containing gas supplied to the oxygen-containing gas supply passage 68a flows along the oxygen-containing gas supply channel 142 in the separator 104, and the oxygen-containing gas is supplied into the oxygen-containing gas pressure chamber 148 formed between the second and third sandwiching sections 122, 134. Then, the oxygen-containing gas flows into the oxygen-containing gas inlet 124 formed at the center of the second sandwiching section 122.

The oxygen-containing gas inlet 124 is provided at a position corresponding to the central position of the cathode 32 in each of the electrolyte electrode assemblies 36. Therefore, the oxygen-containing gas from the oxygen-containing gas inlet 124 is supplied to the oxygen-containing gas channel 56, and flows from the central region of the cathode 32 toward the outer circumferential region of the cathode 32.

Thus, in each of the electrolyte electrode assemblies 36, the fuel gas is supplied from the central region of the anode 34 to the outer circumferential region of the anode 34, and the oxygen-containing gas is supplied from the central region of the cathode 32 to the outer circumferential region of the cathode 32 for generating electricity. The fuel gas and the oxygen-containing gas used in the power generation are discharged as the exhaust gas from the outer circumferential region of the sandwiching section 150.

In the second modified example of the second embodiment, as shown in FIG. 32, the protection layer 90 is formed on the first sandwiching section 116 of the first plate 106 of the separator 38. In the second modified embodiment, the same advantages as in the case of the second modified example of the first embodiment are obtained.

Figure 33:
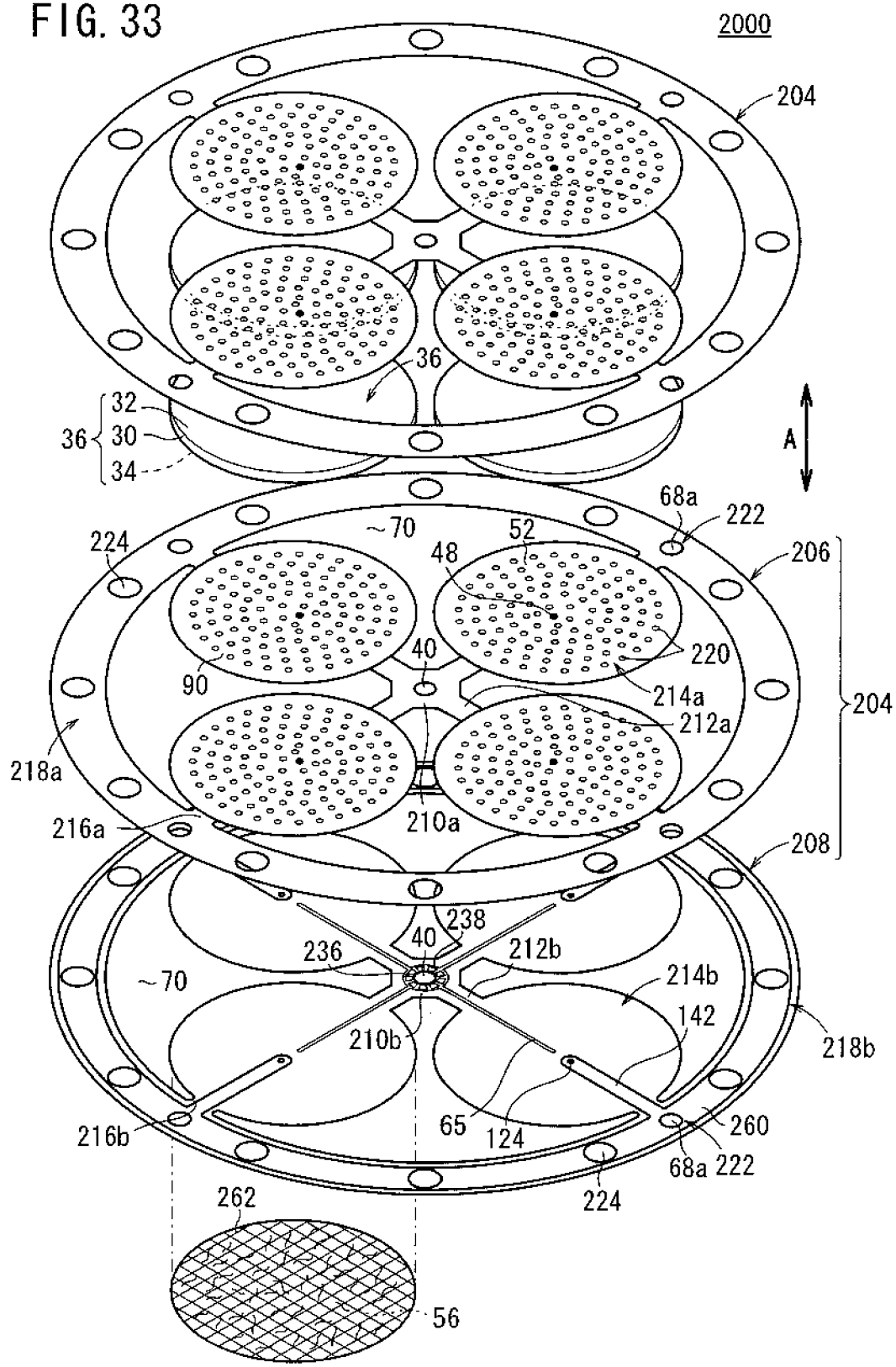
FIG. 33 is an exploded perspective view showing a fuel cell according to a third modified example of the second embodiment.

FIG. 33 is an exploded perspective view showing a fuel cell 2000 according to a third modified example of the second embodiment. The fuel cell 2000 is produced by modifying the fuel cell 200 according to the third modified example of the first embodiment by replacing the first protection layer 37 and the second protection layer 67 in the fuel cell 200 with the protection layer 90. That is, in the third modified example, in the first plate 206 of the separator 204, the protection layer 90 is formed on a surface of the first sandwiching section 214a facing the anode 34 to cover the protrusions 220.

Figure 34:
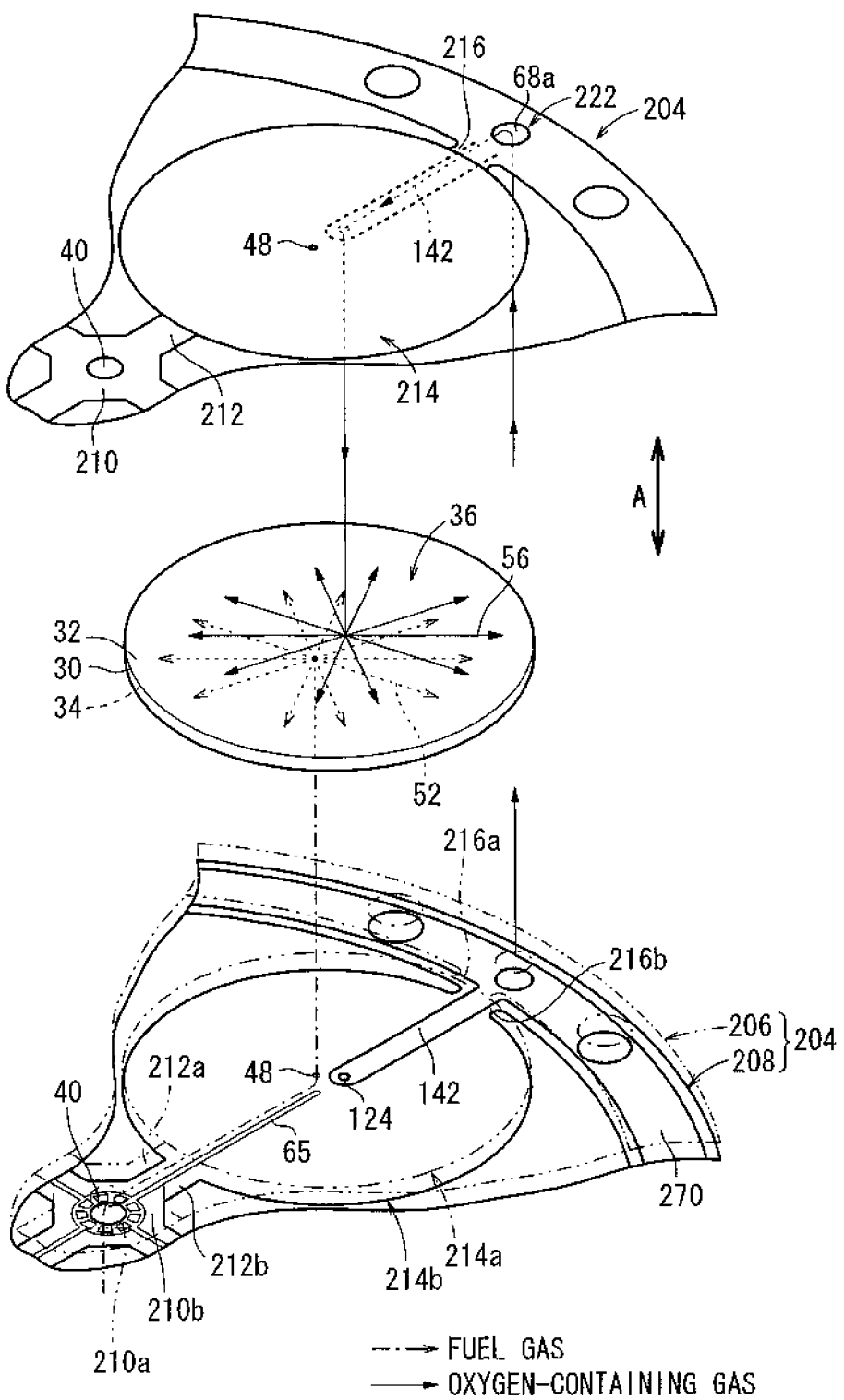
FIG. 34 is a partial exploded perspective view showing gas flows in the fuel cell.
Figure 35:
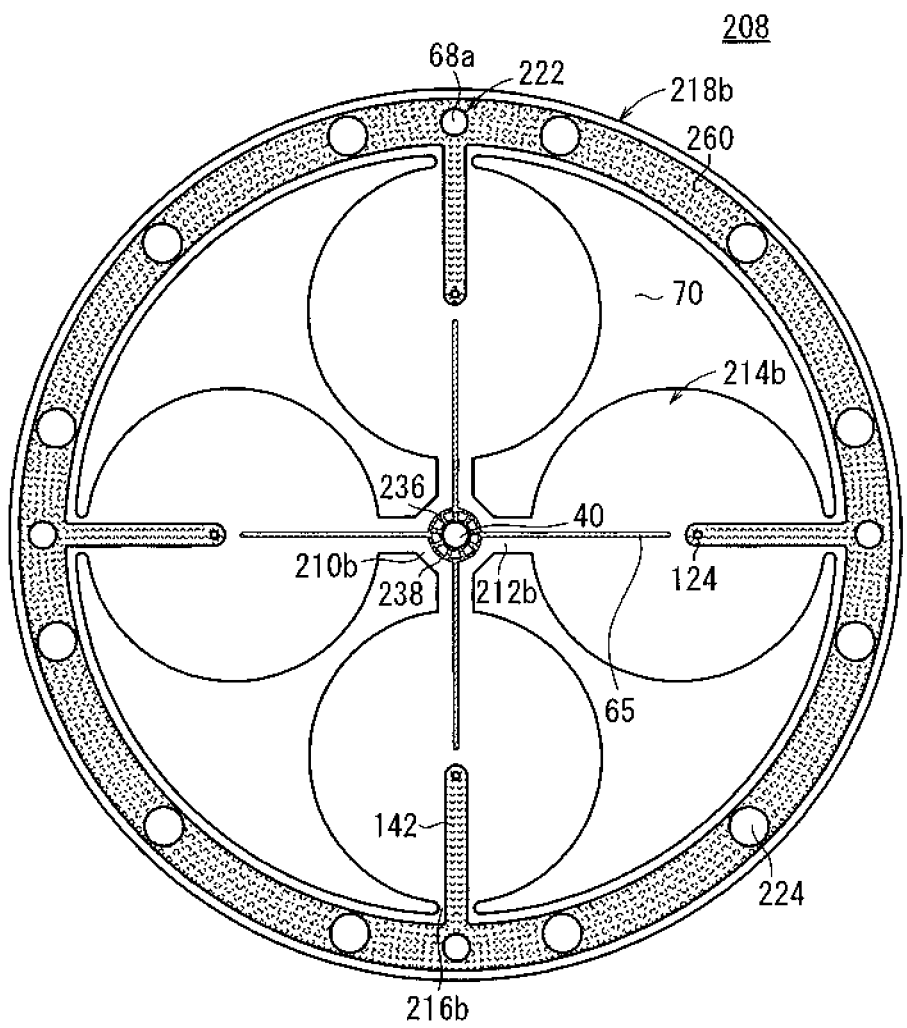
FIG. 35 is a view showing a second plate of a separator.

As can be seen by comparison of FIG. 12 and FIG. 34, it is a matter of course that gas flows in the fuel cell 2000 are the same as the gas flows in the fuel cell 200. Further, as shown in FIGS. 13 and 35, the second plate 108 has substantially the same structure as that of the third modified example of the first embodiment.

Figure 36:
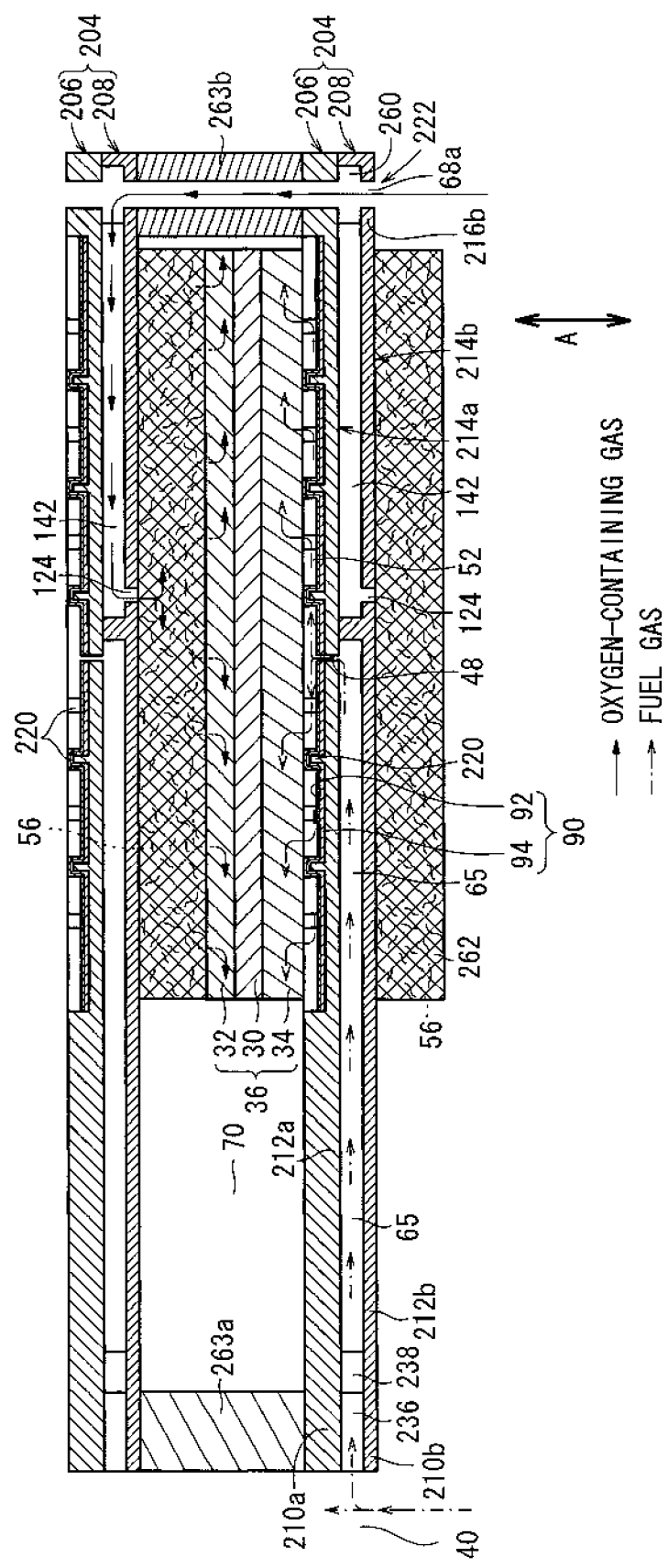
FIG. 36 is a cross sectional view schematically showing operation of the fuel cell.

The fuel cell 2000 having the above structure is operated in the same manner as the fuel cell 200. That is, as shown in FIGS. 34 and 36, the fuel gas supplied to the fuel gas supply passage 40 flows in the stacking direction indicated by the arrow A, and the fuel gas is supplied from the grooves 236 to the fuel gas supply channels 65 through the circular groove 238 formed in the second plate 208 of the separator 204 of each fuel cell 200 (see FIG. 33). After the fuel gas flows along each fuel gas supply channel 65, the fuel gas flows through the fuel gas inlet 48 formed in the first plate 206 to the fuel gas channel 52.

The fuel gas inlet 48 is provided at substantially the central position of the anode 34 of each electrolyte electrode assembly 36. Thus, the fuel gas is supplied from the fuel gas inlet 48 to the anode 34, and flows along the fuel gas channel 52 from the substantially central region to the outer circumferential region of the anode 34.

The air supplied to the oxygen-containing gas supply passage 68a temporarily fills the filling chamber 260 provided between the first case unit 218a of the first plate 206 and the second case unit 218b of the second plate 208. The filling chamber 260 is connected to the oxygen-containing gas supply channel 142. The oxygen-containing gas moves toward the center of the sandwiching section 214 along each of the oxygen-containing gas supply channels 142.

The oxygen-containing containing gas inlet 124 is opened to a position near the center of the second sandwiching section 214b. The oxygen-containing gas inlet 124 is positioned at substantially the center of the cathode 32 of the electrolyte electrode assembly 36. Therefore, as shown in FIG. 36, the air is supplied from the oxygen-containing gas inlet 124 to the cathode 32. The oxygen-containing gas flows from the substantially central region to the outer circumferential region of the cathode 32 along the oxygen-containing gas channel 56 formed in the felt member 262.

Thus, in each of the electrolyte electrode assemblies 36, the fuel gas flows from substantially the central region to the outer circumferential region of the anode 34, and the air flows from the substantially central region to the outer circumferential region of the cathode 32 for generating electricity. The fuel gas and the air consumed in the power generation are discharged from the outer circumferential region of each of the electrolyte electrode assemblies 36, and flows through the exhaust gas channels 70.

Figure 37:
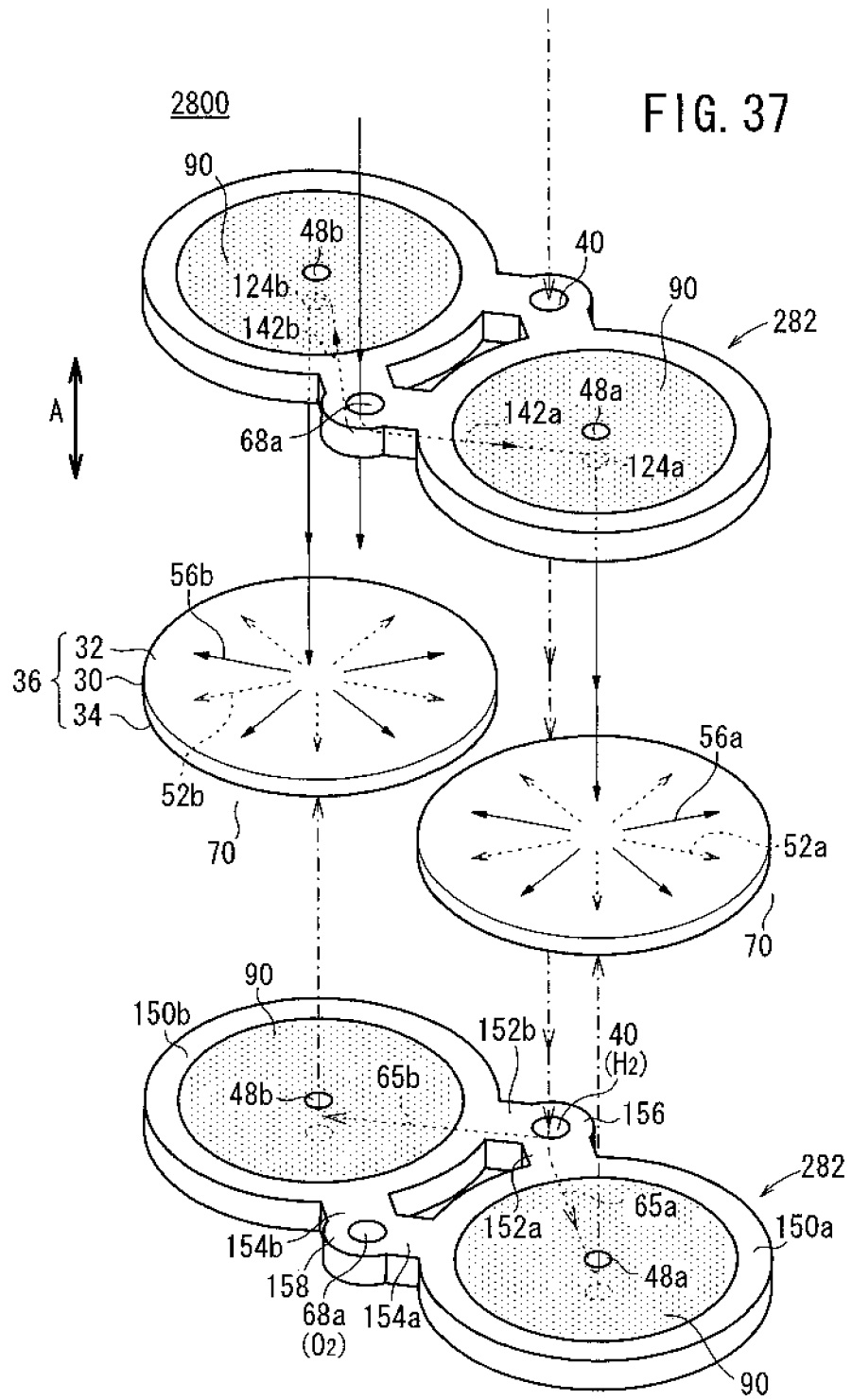
FIG. 37 is an exploded perspective view according to a fourth modified example of the second embodiment.

FIG. 37 is an exploded perspective view showing a fuel cell 2800 according to a fourth modified example of the second embodiment. The fuel cell 2800 is produced by modifying the fuel cell 280 according to the fourth modified example of the first embodiment by replacing the first protection layer 37 and the second protection layer 67 in the fuel cell 280 with the protection layer 90.

That is, in the fourth modified example, in the plate of the separator 282, the protection layers 90 are formed on surfaces of the first and second sandwiching sections 150a, 150b facing the anodes 34. The protection layers 90 tightly contact the anodes 34 in part so as to form the fuel gas channels 52a, 52b.

In the fourth modified example, the same advantages as in the cases of the fourth modified example of the first embodiment are obtained. That is, the separators 282 sandwich the two electrolyte electrode assemblies 36. All of the fuel gas supply channels 65a, 65b for supplying the fuel gas to the electrolyte electrode assemblies 36 and the oxygen-containing gas supply channels 142a, 142b for supplying the oxygen-containing gas to the electrolyte electrode assemblies 36 have the same length. In the structure, the fuel gas and the oxygen-containing gas are distributed equally to each of the electrolyte electrode assemblies 36, and the power generation output is increased in each of the electrolyte electrode assemblies 36.

Figure 38:
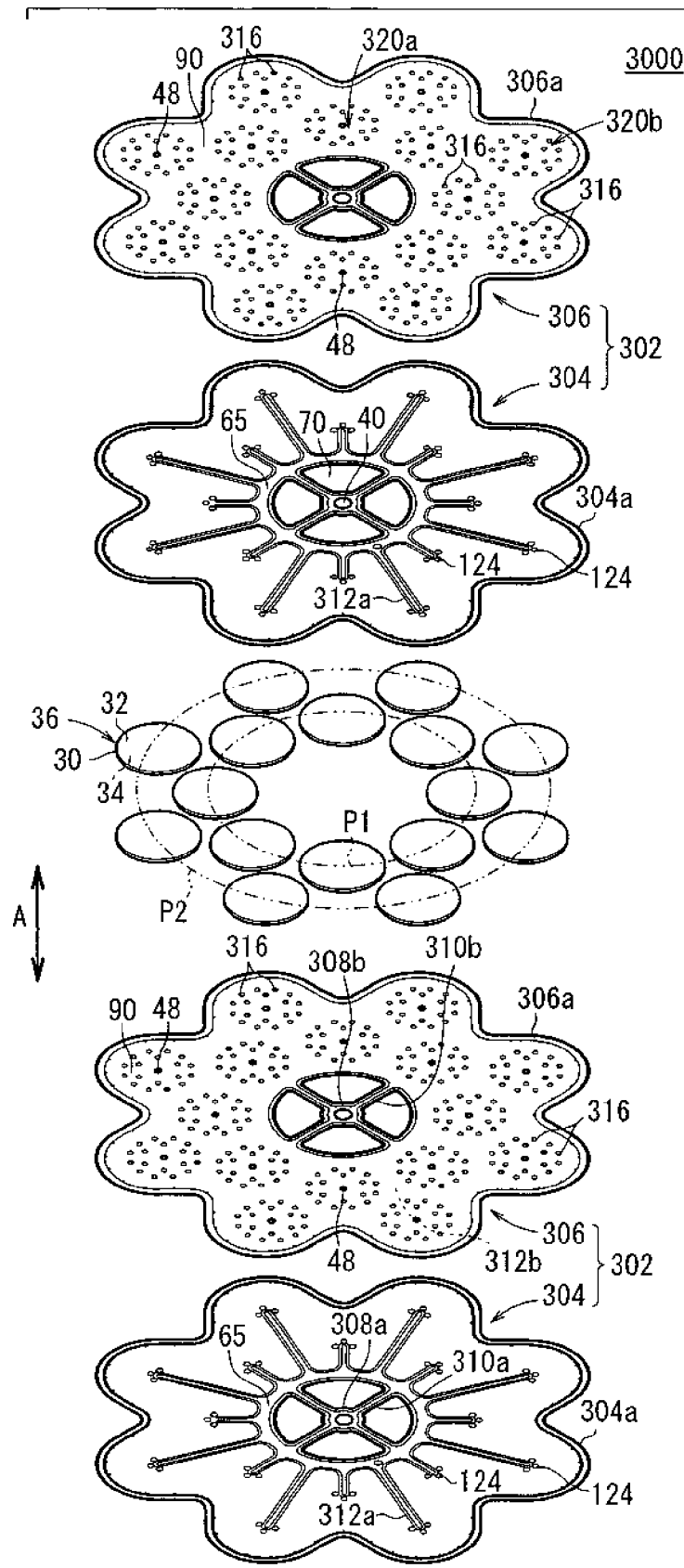
FIG. 38 is an exploded perspective view according to a fifth modified example of the second embodiment.
Figure 39:
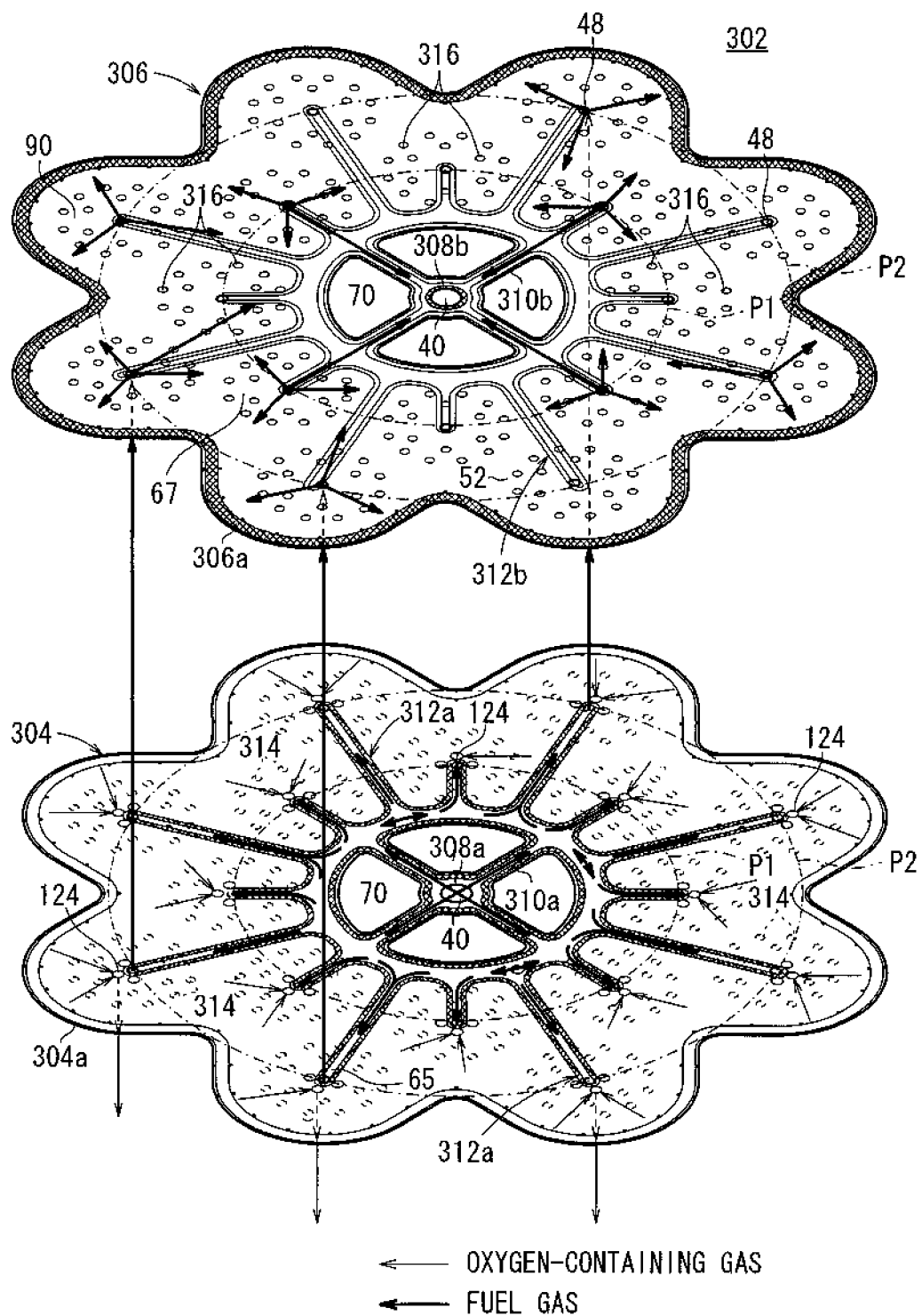
FIG. 39 is an exploded perspective view showing the separator.

FIG. 38 is an exploded perspective view showing a fuel cell 3000 according to a fifth modified example of the second embodiment. The fuel cell 3000 is produced by modifying the fuel cell 300 according to the fifth modified example of the first embodiment by replacing the first protection layer 37 and the second protection layer 67 in the fuel cell 300 with the protection layer 90. That is, in the fifth modified example, as shown in FIG. 39, the protection layers 90 are at least formed on the surfaces of the sandwiching sections 320a, 320b of the separator 302 which contact the anodes 34.

Figure 40:
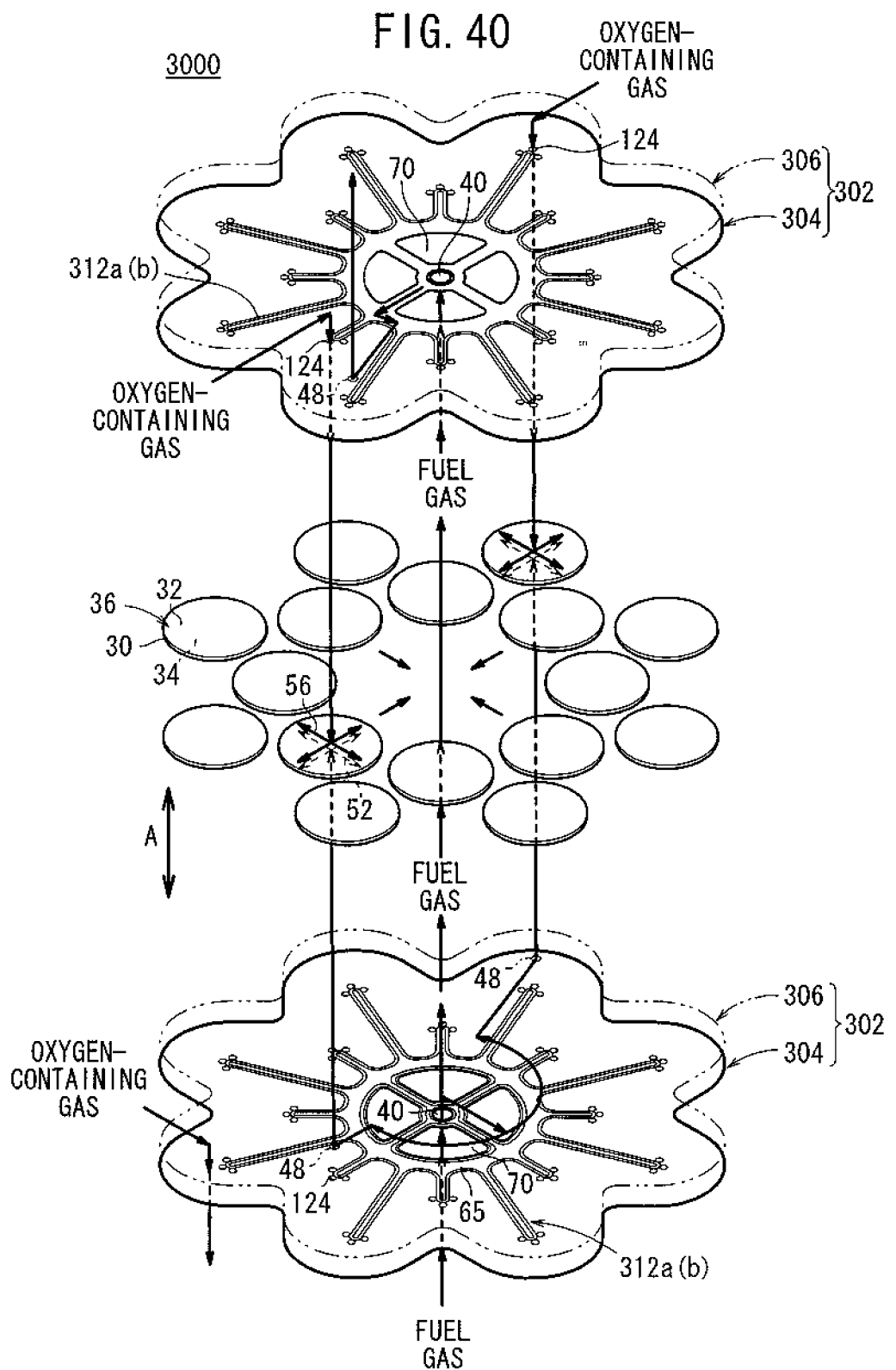
FIG. 40 is a partial exploded perspective view showing gas flows in the fuel cell.
Figure 41:
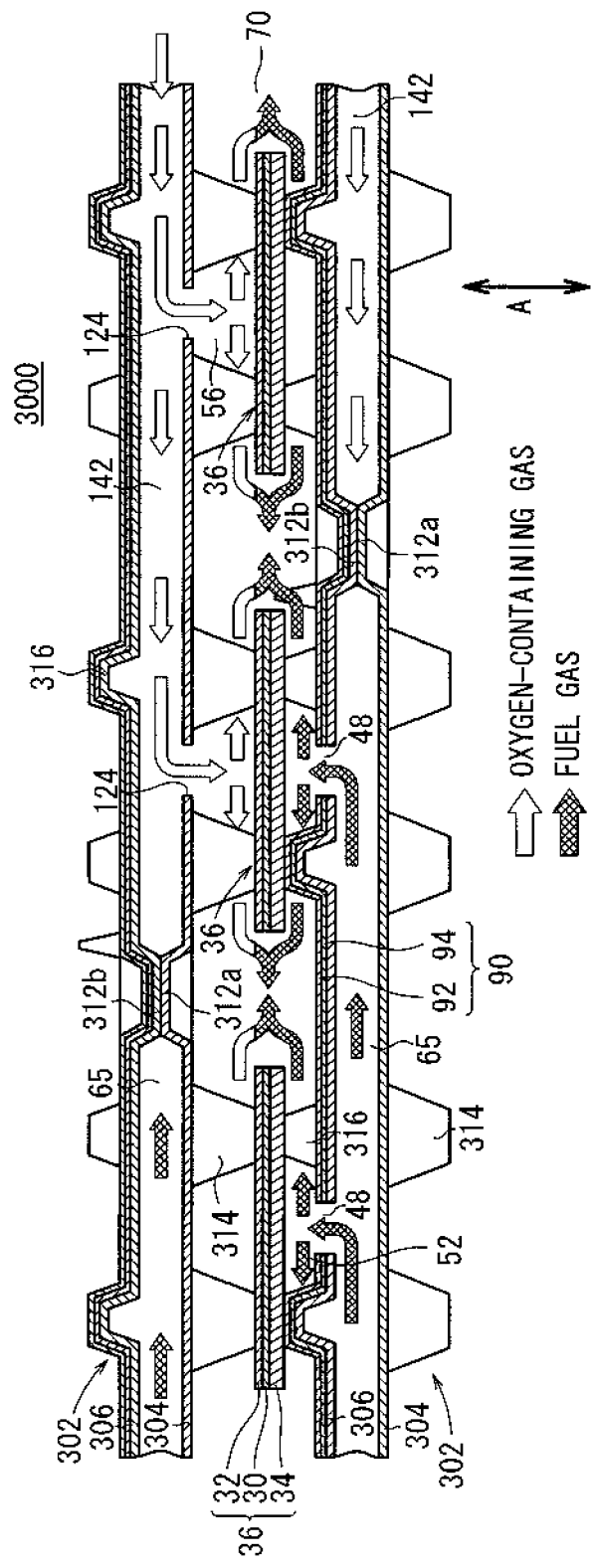
FIG. 41 is a cross sectional view schematically showing operation of the fuel cell.

The fuel cell 3000 having the above structure is operated in the same manner as the fuel cell 300 according to the fifth modified example of the first embodiment. That is, as shown in FIGS. 40 and 41, the fuel gas flows along the fuel gas supply channel 65 formed between the ridges 312a, 312b, and the fuel gas is supplied into the fuel gas channel 52 through the fuel gas inlets 48. The fuel gas inlets 48 are provided at positions corresponding to the centers of the anodes 34 of the respective electrolyte electrode assemblies 36. In the fuel gas channel 52, the fuel gas flows outwardly from the center of the anode 34 of each of the electrolyte electrode assemblies 36.

The oxygen-containing gas supplied to the oxygen-containing gas supply channel 142 flows into the oxygen-containing gas channel 56 through the oxygen-containing gas inlets 124, and flows outwardly from the center of the cathode 32 of each of the electrolyte electrode assemblies 36 (see FIGS. 40 and 41).

Thus, in each of the electrolyte electrode assemblies 36, the fuel gas is supplied outwardly from the center of the anode 34, and the oxygen-containing gas is supplied outwardly from the center of the cathode 32. At this time, oxygen ions flow through the electrolyte 30 toward the anode 34 for generating electricity by electrochemical reactions.

The fuel gas and oxygen-containing gas after consumption in the reaction (exhaust gas) flow toward the outer circumferential region of each of the electrolyte electrode assemblies 36, and then, the exhaust gas moves to the central portion of the separators 302, and is discharged into the four exhaust gas channels 70 of the exhaust gas manifold. The exhaust gas is discharged from the exhaust gas channels 70 to the outside.

In the fifth modified example, the same advantages as in the cases of the fifth modified example of the first embodiment are obtained. Specifically, the fuel gas paths from the first and second fuel gas supply sections 308a, 308b around the center of the separators 302 to the eight electrolyte electrode assemblies 36 arranged along the virtual inner circle P1 have the same length, and the fuel gas paths from the first and second fuel gas supply sections 308a, 308b to the eight electrolyte electrode assemblies 36 arranged along the virtual outer circle P2 have the same length. Therefore, additional advantages over the advantages of the second embodiment and the first to fourth modified examples are obtained. The power generation state is uniform in each of the electrolyte electrode assemblies 36, and the desired power generation output is achieved efficiently.

The first embodiment and the second embodiment have been described in connection with the cases of using a support membrane type electrolyte electrode assembly formed by using the anode 34 as a base plate, stacking the electrolyte 30 on the anode 34, and stacking the cathode 32 on the electrolyte 30 as the electrolyte electrode assembly 36. Alternatively, the electrolyte electrode assembly 36 may be a self-assembled type membrane formed by using the electrolyte 30 as a base plate, and stacking the anode 34 and the cathode 32 on both sides of the electrolyte 30 as the base plate.

Further, intermediate layers may be inserted between the electrolyte 30 and the cathode 32 and/or the anode 34.

Further, the method of forming the protection layers 37, 67, 90 is not limited to electroless plating. It is a matter of course that any of various known film forming methods such as the chemical vapor deposition (CVD) method, the physical vapor deposition (PVD) method, the screen printing method, and the vapor deposition method can be adopted.

Although the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising an electrolyte electrode assembly and separators sandwiching the electrolyte electrode assembly, the electrolyte electrode assembly including an anode, a cathode, and an electrolyte interposed between the anode and the cathode, a fuel gas being supplied from a central region to an outer region of the anode, an oxygen-containing gas being supplied along the cathode, and an exhaust gas as mixture of the fuel gas and the oxygen-containing gas after consumption being discharged to an outside from an outer region of the electrolyte electrode assembly, the fuel cell further comprising:
   a first protection layer formed on a surface of the anode facing the separator for preventing the anode from being exposed to the exhaust gas; and
   a second protection layer formed on a surface of the separator facing the anode for preventing the separator from being exposed to the exhaust gas,
   wherein the first protection layer and the second protection layer tightly contact each other in part so as to form a space as a fuel gas channel for supplying the fuel gas to the anode, between the first protection layer and the second protection layer, and
   wherein the second protection layer is a gradient layer having composition ratios of Ni and Fe, wherein an amount of Ni decreases gradually in a direction from the anode to the separator and an amount of Fe increases gradually in the direction from the anode to the separator.

2. A fuel cell according to claim 1, wherein a plurality of protrusions are formed on the surface of the separator facing the anode, and
   the second protection layer formed on the protrusions tightly contacts the first protection layer formed on the anode to form the space between the second protection layer and the first protection layer, between the protrusions.

3. A fuel cell according to claim 1, wherein a plurality of protrusions are formed on the surface of the separator facing the anode, and
   the protrusions penetrate into the first protection layer formed on the anode to form the space between the second protection layer and the first protection layer, between the protrusions.

4. A fuel cell according to claim 2, wherein the first protection layer formed on the anode has a thickness in a range of 1 to 100 μm.

5. A fuel cell according to claim 3, wherein the first protection layer formed on the anode has a thickness in a range of 1 to 100 μm.

6. A fuel cell according to claim 1, wherein the first protection layer and the second protection layer are made of metal having an electrical conductivity of 1.0 S/cm at 700° C. or cermet compound of the metal, and the thickness of the first protection layer is equal to, or greater than the thickness of the second protection layer.

7. A fuel cell according to claim 6, wherein pores are formed in the first protection layer by reduction reaction.

8. A fuel cell according to claim 6, wherein pore forming material is added to the first protection layer to form pores in the first protection layer.

9. A fuel cell according to claim 1, the separator comprising:
- a sandwiching section for sandwiching the electrolyte electrode assembly;
- a bridge connected to the sandwiching section, a fuel gas supply channel being formed in the bridge for supplying the fuel gas to the central region of the anode; and
- a fuel gas supply section connected to the bridge, a fuel gas supply passage for supplying the fuel gas to the fuel gas supply channel extending through the fuel gas supply section.

10. A fuel cell according to claim 1, wherein the separator comprises a metal plate.

11. A fuel cell comprising an electrolyte electrode assembly and separators sandwiching the electrolyte electrode assembly, the electrolyte electrode assembly including an anode, a cathode, and an electrolyte interposed between the anode and the cathode, a fuel gas being supplied from a central region to an outer region of the anode, an oxygen-containing gas being supplied along the cathode, and an exhaust gas as mixture of the fuel gas and the oxygen-containing gas after consumption being discharged to an outside from an outer region of the electrolyte electrode assembly, wherein
- the separator is made of iron alloy containing Cr, and a protection layer is formed on an end surface of the separator facing the anode for preventing the separator from being exposed to the exhaust gas;
- the protection layer includes a mixture layer containing Ni and Fe on one side facing the separator and a chromium rich layer chiefly containing Cr on the other side facing the anode; and
- the mixture layer is a gradient layer having composition ratios of Ni and Fe, wherein an amount of Ni decreases gradually in a direction from the anode to the separator and an amount of Fe increases gradually in the direction from the anode to the separator.

12. A fuel cell according to claim 11, wherein the mixture layer is a gradient layer chiefly containing nickel and/or nickel oxide on a side facing the chromium rich layer, and chiefly containing iron and/or iron oxide on a side facing the separator.

13. A fuel cell according to claim 11, wherein the protection layer is obtained by heating an Ni-containing film formed on the separator at 550° C. to 850° C.

14. A fuel cell according to claim 11, wherein the protection layer has a thickness in a range of 1 to 100 μm.

15. A fuel cell according to claim 11, wherein the separator contains 12% to 30% by weight of Cr.

16. A fuel cell according to claim 11, wherein the anode is made of Ni—Zr cermet containing nickel and zirconium.

17. A fuel cell according to claim 11, wherein water vapor produced during power generation is mixed with the exhaust gas.

* * * * *